United States Patent
Kurosu et al.

(10) Patent No.: US 11,600,446 B2
(45) Date of Patent: Mar. 7, 2023

(54) MULTILAYER CERAMIC CAPACITOR

(71) Applicant: Murata Manufacturing Co., Ltd., Nagaokakyo (JP)

(72) Inventors: Yuta Kurosu, Nagaokakyo (JP); Yuta Saito, Nagaokakyo (JP); Masahiro Wakashima, Nagaokakyo (JP); Daiki Fukunaga, Nagaokakyo (JP); Yu Tsutsui, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/131,888

(22) Filed: Dec. 23, 2020

(65) Prior Publication Data
US 2021/0202177 A1 Jul. 1, 2021

(30) Foreign Application Priority Data

Dec. 27, 2019 (JP) ............................. JP2019-238184
Nov. 6, 2020 (JP) ............................. JP2020-186017

(51) Int. Cl.
| | |
|---|---|
| *H01G 4/30* | (2006.01) |
| *H01G 4/232* | (2006.01) |
| *H01G 4/248* | (2006.01) |
| *H01G 4/12* | (2006.01) |
| *H01G 4/008* | (2006.01) |

(52) U.S. Cl.
CPC ............... *H01G 4/30* (2013.01); *H01G 4/008* (2013.01); *H01G 4/1218* (2013.01); *H01G 4/2325* (2013.01); *H01G 4/248* (2013.01)

(58) Field of Classification Search
CPC ........ H01G 4/30; H01G 4/008; H01G 4/1218; H01G 4/2325; H01G 4/248
See application file for complete search history.

(56) References Cited

U.S. PATENT DOCUMENTS

| | | | |
|---|---|---|---|
| 6,370,014 B1* | 4/2002 | Yoneda ................ | H01G 4/1209 29/25.41 |
| 6,475,317 B1* | 11/2002 | Baba .................... | H05K 1/0306 156/89.12 |
| 9,818,536 B2* | 11/2017 | Suzuki ................... | H01G 4/232 |

(Continued)

FOREIGN PATENT DOCUMENTS

| | | |
|---|---|---|
| CN | 102640239 A | 8/2012 |
| JP | 2003-209025 A | 7/2003 |

(Continued)

OTHER PUBLICATIONS

Kurosu et al., "Multilayer Ceramic Capacitor", U.S. Appl. No. 17/131,891, filed Dec. 23, 2020.

(Continued)

*Primary Examiner* — Dion R. Ferguson
(74) *Attorney, Agent, or Firm* — Keating & Bennett, LLP

(57) ABSTRACT

A multilayer ceramic capacitor includes a second alloy portion including one metal element provided in a greatest amount among metal elements of an internal electrode layer, and one or more metal elements among a metal group including Sn, In, Ga, Zn, Bi, Pb, Cu, Ag, Pd, Pt, Ph, Ir, Ru, Os, Fe, V, and Y is provided between a second dielectric ceramic layer and a first internal electrode layer, and between a second dielectric ceramic layer and a second internal electrode layer, respectively.

16 Claims, 36 Drawing Sheets

(56) References Cited

U.S. PATENT DOCUMENTS

| | | | |
|---|---|---|---|
| 2003/0016484 A1* | 1/2003 | Iwaida | C04B 35/468 |
| | | | 361/306.3 |
| 2006/0023398 A1 | 2/2006 | Iwanaga | |
| 2006/0214263 A1* | 9/2006 | Kojima | H01G 4/30 |
| | | | 257/532 |
| 2009/0237859 A1* | 9/2009 | Nakamura | H01G 4/30 |
| | | | 361/301.4 |
| 2012/0140377 A1* | 6/2012 | Kim | H01G 4/30 |
| | | | 361/321.2 |
| 2012/0250221 A1 | 10/2012 | Yamashita | |
| 2015/0155098 A1* | 6/2015 | Yamaguchi | H01G 4/30 |
| | | | 361/301.4 |
| 2015/0200055 A1* | 7/2015 | Ishida | H01G 4/012 |
| | | | 361/301.4 |
| 2016/0276102 A1* | 9/2016 | Suzuki | H01G 4/232 |
| 2017/0018363 A1* | 1/2017 | Tanaka | H01G 4/005 |
| 2017/0178812 A1* | 6/2017 | Shimada | H01G 4/1227 |
| 2018/0082785 A1* | 3/2018 | Asano | H01G 4/30 |
| 2019/0006107 A1* | 1/2019 | Kim | H01G 4/12 |
| 2020/0058443 A1* | 2/2020 | Kang | H01G 4/30 |
| 2020/0168401 A1* | 5/2020 | Song | H01G 4/12 |
| 2021/0202177 A1* | 7/2021 | Kurosu | H01G 4/2325 |

FOREIGN PATENT DOCUMENTS

| | | |
|---|---|---|
| JP | 2005101301 A | 4/2005 |
| JP | 2017-147358 A | 8/2017 |
| KR | 1020060048957 A | 5/2006 |
| KR | 101867872 B1 | 6/2018 |

OTHER PUBLICATIONS

Tsutsui et al., "Multilayer Ceramic Capacitor", U.S. Appl. No. 17/131,893, filed Dec. 23, 2020.

Saito et al., "Multilayer Ceramic Capacitor", U.S. Appl. No. 17/131,896, filed Dec. 23, 2020.

Fukunaga et al., "Multilayer Ceramic Capacitor", U.S. Appl. No. 17/131,898, filed Dec. 23, 2020.

Wakashima et al., "Multilayer Ceramic Capacitor", U.S. Appl. No. 17/131,899, filed Dec. 23, 2020.

Official Communication issued in corresponding Chinese Patent Application No. 202011572771.X, dated Mar. 3, 2022.

Office Action in KR 10-2020-0181843, dated Dec. 16, 2022, 5 pages.

* cited by examiner

MULTILAYER CERAMIC CAPACITOR

CROSS REFERENCE TO RELATED APPLICATIONS

This application claims the benefit of priority to Japanese Patent Application No. 2019-238184 filed on Dec. 27, 2019 and Japanese Patent Application No. 2020-186017 filed on Nov. 6, 2020. The entire contents of these applications are hereby incorporated herein by reference.

BACKGROUND OF THE INVENTION

1. Field of the Invention

The present invention relates to a multilayer ceramic capacitor.

2. Description of the Related Art

In recent years, multilayer ceramic electronic components, such as multilayer ceramic capacitors, have been miniaturized and developed to generate higher capacitance. To achieve miniaturization and higher capacitance of the multilayer ceramic capacitors, it is advantageous to reduce the thickness of the side margin with respect to each side surface of a multilayer body in which a plurality of dielectric ceramic layers and a plurality of internal electrode layers are stacked, thereby increasing the area of the internal electrode layers provided opposite to each other.

Japanese Unexamined Patent Application Publication No. 2017-147358 discloses a method for manufacturing an electronic component including a step of preparing a chip in which a plurality of dielectric ceramic layers and a plurality of internal electrode layers are stacked, the plurality of internal electrode layers being exposed on a side surface, a step of pasting a plurality of covering dielectric sheets to each other to form a dielectric laminated sheet, and a step of applying the dielectric laminated sheet on a side surface of the chip.

Furthermore, Japanese Unexamined Patent Application Publication No. 2003-209025 discloses that a plurality of ceramic green sheets each having internal electrodes printed therein are stacked, and ceramic slurry for level difference elimination is applied in an area in which internal electrodes are not printed when pressurizing and firing to produce a multilayer ceramic capacitor, such that it is possible to suppress the level difference generated between a portion in which the internal electrodes overlap with each other and a portion in which the internal electrodes do not overlap with each other.

However, Japanese Unexamined Patent Application Publication No. 2017-147358 does not specifically describe the composition of a ceramic dielectric sheet to be bonded to the side surface of the multilayer body. Japanese Unexamined Patent Application Publication No. 2003-209025 does not specifically describe the composition of a ceramic paste for level difference elimination used in Japanese Unexamined Patent Application Publication No. 2003-209025. Therefore, in Japanese Unexamined Patent Application Publication No. 2017-147358 and Japanese Unexamined Patent Application Publication No. 2003-209025, there is room to improve the reliability of multilayer ceramic capacitors by optimizing the composition of the dielectric laminated sheet and the composition of the ceramic paste for level difference elimination. Furthermore, since the electric field is concentrated at the ends of the internal electrodes in close proximity to the dielectric ceramic layer with the ceramic paste for level difference elimination disclosed in Japanese Unexamined Patent Application Publication No. 2003-209025, the reliability may be degraded.

SUMMARY OF THE INVENTION

Preferred embodiments of the present invention provide multilayer ceramic capacitors that are each capable of reducing or preventing electric field concentration at least at an end of an internal electrode, thus improving the reliability.

A multilayer ceramic capacitor according to a preferred embodiment of the present invention includes a multilayer body including a dielectric ceramic layer and an internal electrode layer stacked in a stacking direction; and an external electrode connected to the internal electrode layer, wherein the multilayer body includes a first main surface and a second main surface on opposite sides in the stacking direction, a first side surface and a second side surface on opposite sides in a width direction orthogonal or substantially orthogonal to the stacking direction, and a first end surface and a second end surface on opposite sides in a length direction orthogonal or substantially orthogonal to the stacking direction and the width direction; the internal electrode layer includes a first internal electrode layer that extends to the first end surface, and a second internal electrode layer that extends to the second end surface; the second internal electrode layer is opposed to the first internal electrode layer with the dielectric ceramic layer interposed therebetween; the external electrode includes a first external electrode that is disposed on the first end surface and is connected to the first internal electrode layer, and a second external electrode that is disposed on the second end surface and is connected to the second internal electrode layer; the dielectric ceramic layer includes a first dielectric ceramic layer and a second dielectric ceramic layer; the first dielectric ceramic layer is disposed between the first internal electrode layer and the second internal electrode layer; the second dielectric ceramic layer is disposed so as to include a region which is provided between the first dielectric ceramic layers opposed to each other with the internal electrode layer interposed therebetween, the internal electrode layer is not disposed, and such that a portion of the second dielectric ceramic layer overlaps the first dielectric ceramic layer in the stacking direction; the multilayer body includes an inner layer portion in which the first internal electrode layer and the second internal electrode layer are alternately stacked with the dielectric ceramic layer interposed therebetween, an outer layer portion sandwiching the inner layer portion in the stacking direction and includes a ceramic material, and a third dielectric ceramic layer sandwiching the inner layer portion and the outer layer portion in the width direction and includes a dielectric ceramic material; and a second alloy portion including one metal element provided in a greatest amount among metal elements of the internal electrode layer, and one or more metal elements among a metal group consisting of Sn, In, Ga, Zn, Bi, Pb, Cu, Ag, Pd, Pt, Ph, Ir, Ru, Os, Fe, V, and Y is provided between the second dielectric ceramic layer and the first internal electrode layer, and between the second dielectric ceramic layer and the second internal electrode layer, respectively.

According to preferred embodiments of the present invention, it is possible to provide multilayer ceramic capacitors that are each capable of reducing or preventing the electric field concentration at least at the end of the internal electrode, thus improving the reliability.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, multilayer ceramic capacitors according to preferred embodiments of the present invention will be described with reference to the drawings. However, the present invention is not limited to the following preferred embodiments, and can be applied by modifying where appropriate within a scope not changing the gist of the present invention. It should be noted that preferred embodiments of the present invention also includes combinations of two or more of the individual preferred embodiments described below.

Multilayer Ceramic Capacitor

Figure 1:
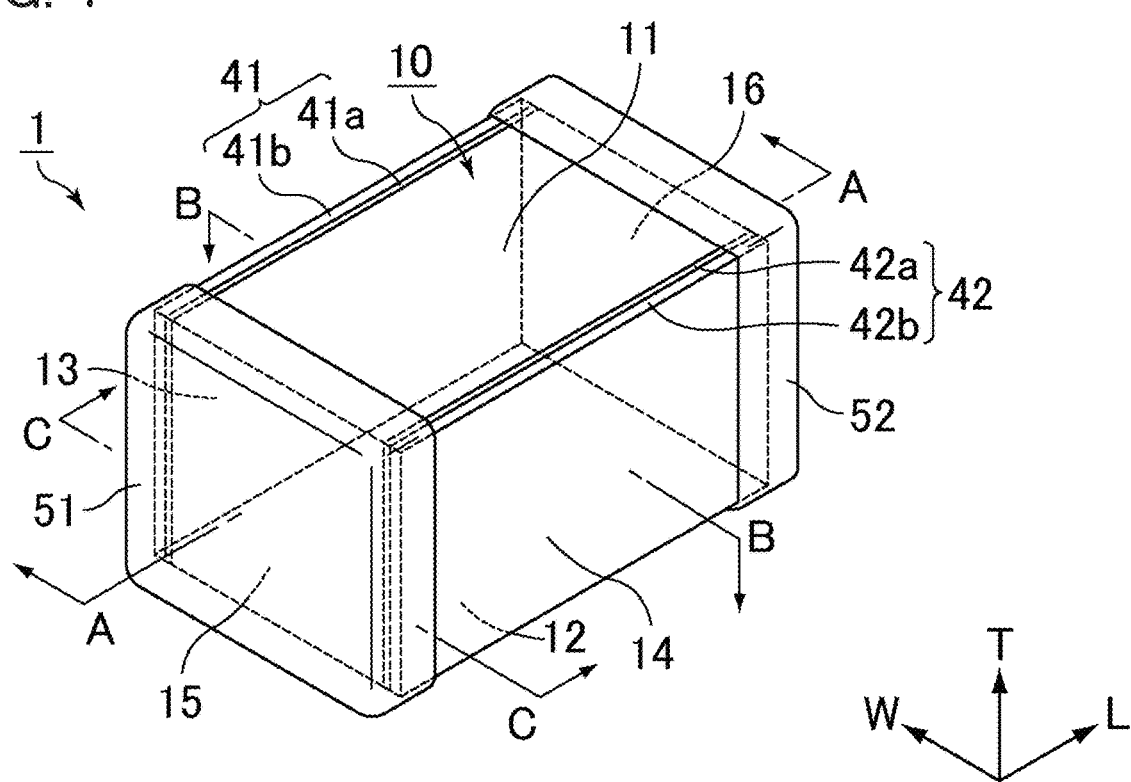
FIG. 1 is a perspective view schematically showing an example of a multilayer ceramic capacitor according to a preferred embodiment of the present invention.
Figure 2:
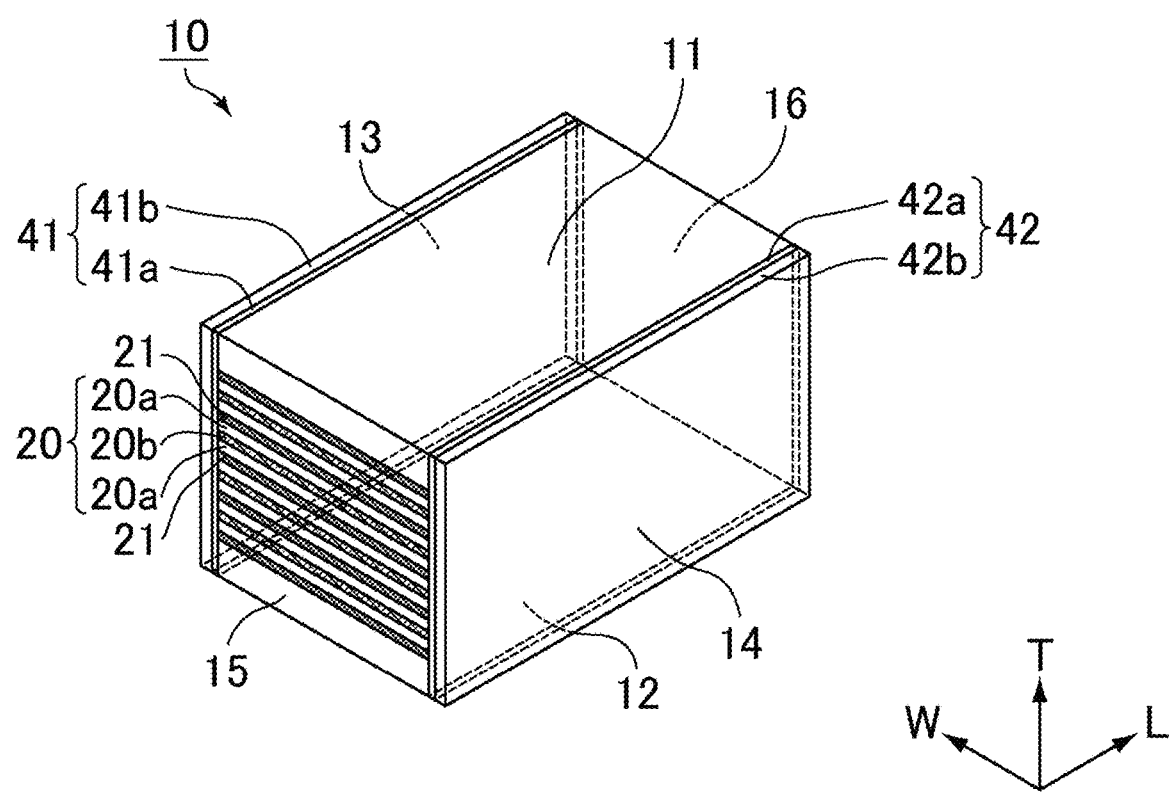
FIG. 2 is a perspective view schematically showing an example of a multilayer body included in the multilayer ceramic capacitor shown in FIG. 1.
Figure 3:
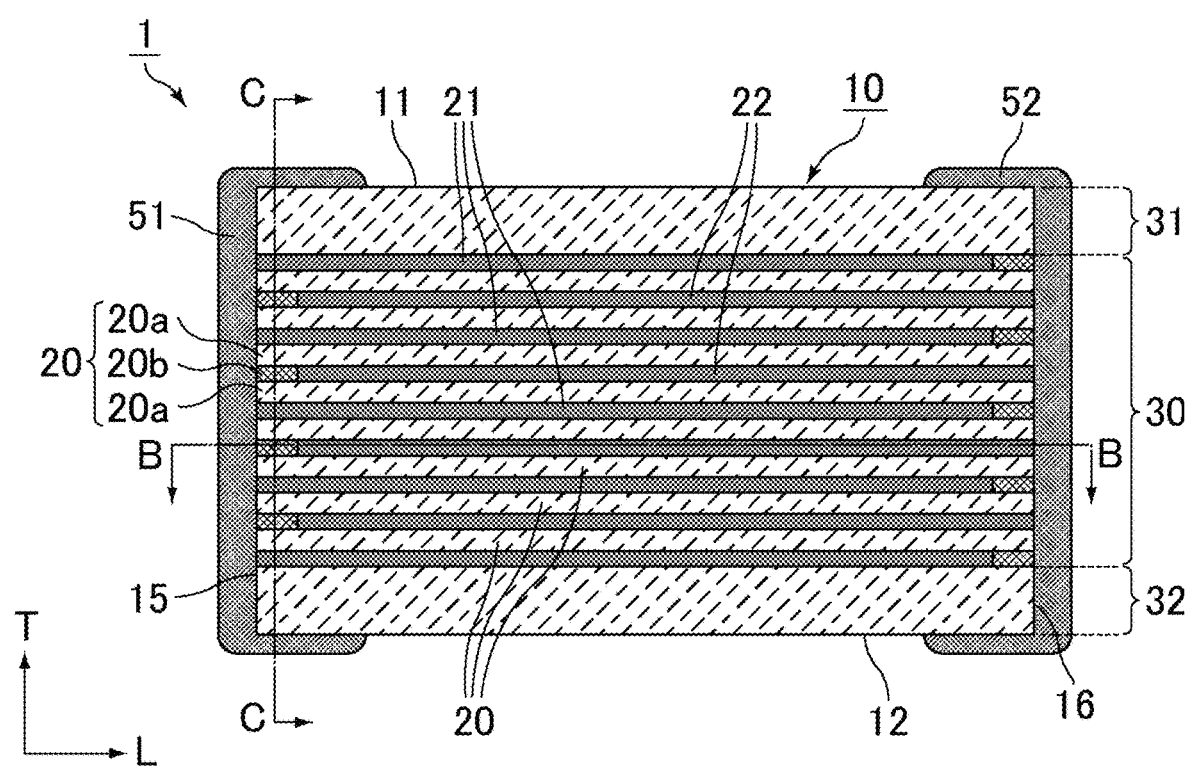
FIG. 3 is a sectional view taken along line A-A of the multilayer ceramic capacitor shown in FIG. 1.
Figure 4:
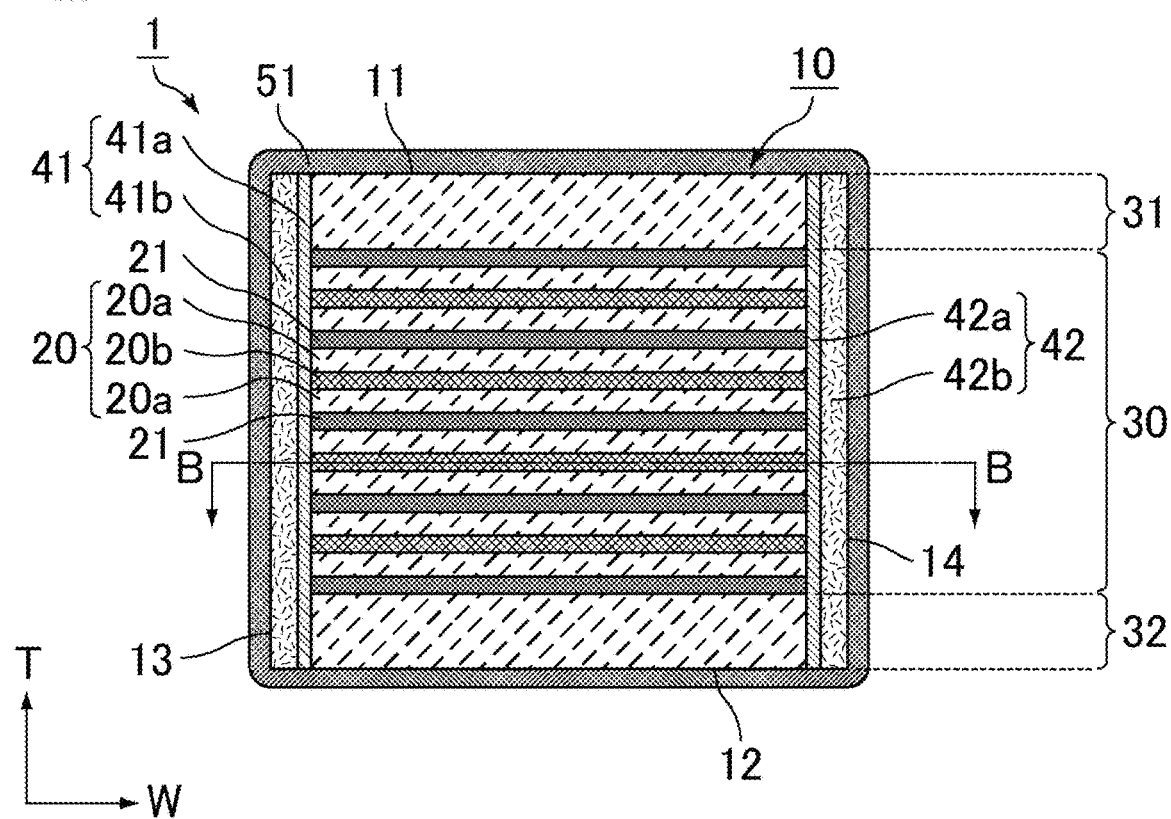
FIG. 4 is a sectional view taken along line C-C of the multilayer ceramic capacitor shown in FIG. 1.

FIG. 1 is a perspective view schematically showing an example of a multilayer ceramic capacitor according to a preferred embodiment of the present invention. FIG. 2 is a perspective view schematically showing an example of a multilayer body (for example, a laminate) included in the multilayer ceramic capacitor shown in FIG. 1. FIG. 3 is a cross-sectional view taken along line A-A of the multilayer ceramic capacitor shown in FIG. 1. FIG. 4 is a cross-sectional view taken along line C-C of the multilayer ceramic capacitor shown in FIG. 1.

In the present disclosure, a stacking direction (for example, lamination direction), a width direction, and a length direction of the multilayer ceramic capacitor and the multilayer body are respectively defined by the arrows T, W, and L in the multilayer ceramic capacitor 1 shown in FIG. 1 and the multilayer body 10 shown in FIG. 2. Herein, the stacking (T) direction, the width (W) direction, and the length (L) direction are orthogonal or substantially orthogonal to one another. The stacking (T) direction refers to a direction in which a plurality of dielectric ceramic layers 20, and a plurality of pairs of a first internal electrode layer 21 and a second internal electrode layer 22 are stacked.

The multilayer ceramic capacitor 1 shown in FIG. 1 includes the multilayer body 10, and a first external electrode 51 and a second external electrode 52 provided on both end surfaces of the multilayer body 10, respectively.

As shown in FIG. 2, the multilayer body 10 has a rectangular shape or a substantially rectangular shape. The multilayer body 10 includes a first main surface 11 and a second main surface 12 on opposite sides in the stacking (T) direction, a first side surface 13 and a second side surface 14 on opposite sides in the width (W) direction which is orthogonal or substantially orthogonal to the stacking (T) direction, and a first end surface 15 and a second end surface 16 on opposite sides in the length (L) direction which is orthogonal or substantially orthogonal to the stacking (T) direction and the width (W) direction.

In the present disclosure, a cross-section of the multilayer ceramic capacitor 1 or the multiplayer body 10 which is orthogonal or substantially orthogonal to the first end surface 15 and the second end surface 16, and parallel or substantially parallel to the stacking (T) direction refers to the LT cross-section, which is a cross-section in the length (L) direction and the stacking (T) direction. Furthermore, a cross-section of the multilayer ceramic capacitor 1 or the multiplayer body 10 which is orthogonal or substantially orthogonal to the first side surface 13 and the second side surface 14, and parallel or substantially parallel to the stacking (T) direction refers to WT cross-section, which is a cross-section in the width (W) direction and the stacking (T) direction. Furthermore, a cross-section of the multilayer ceramic capacitor 1 or the multiplayer body 10 which is orthogonal or substantially orthogonal to the first side surface 13, the second side surface 14, the first end surface 15, and the second end surface 16, and orthogonal or substantially orthogonal to the stacking (T) direction refers to LW cross-section, which is a cross-section in the length (L) direction and the width (W) direction. Therefore, FIG. 3 is an LT cross-section of the multilayer ceramic capacitor 1, and FIG. 4 is a WT cross-section of the multilayer ceramic capacitor 1.

The multilayer body 10 preferably has rounded corners and ridges. The corners are portions where the three surfaces of the multilayer body intersect, and the ridges are portions where the two surfaces of the multilayer body intersect.

As shown in FIGS. 2, 3 and 4, the multilayer body 10 has a multilayer structure including a plurality of dielectric ceramic layers 20 stacked in the stacking (T) direction, and a plurality of pairs of the first internal electrode layer 21 and the second internal electrode layer 22 provided along the interface between the dielectric ceramic layers 20. The dielectric ceramic layer 20 extends along the width (W) direction and the length (L) direction, and each of the first internal electrode layer 21 and the second internal electrode layer 22 extends in a flat plate shape along the dielectric ceramic layer 20.

The first internal electrode layer 21 extends to the first end surface 15 of the multilayer body 10. On the other hand, the second internal electrode layer 22 extends to the second end surface 16 of the multilayer body 10.

The first internal electrode layer 21 and the second internal electrode layer 22 are provided opposite to each other with the dielectric ceramic layer 20 interposed therebetween in the stacking (T) direction. Capacitance is generated by a portion where the first internal electrode layer 21 and the second internal electrode layer 22 are provided opposite to each other with the dielectric ceramic layer 20 interposed therebetween.

Each of the first internal electrode layer 21 and the second internal electrode layer 22 preferably includes a metal such as Ni, Cu, Ag, Pd, or Au, or Ag—Pd alloy, for example. Each of the first internal electrode layer 21 and the second internal electrode layer 22 may include the same dielectric ceramic material as that of the dielectric ceramic layer 20, in addition to the metal.

The dielectric ceramic layer 20 includes a first dielectric ceramic layer 20a, and a second dielectric ceramic layer 20b. The first dielectric ceramic layer 20a is disposed between the first internal electrode layer 21 and the second internal electrode layer 22. The second dielectric ceramic layer 20b is disposed in a region where the internal electrode layers (21 and 22) are not disposed, between the first dielectric ceramic layers 20a provided opposite to each other with the internal electrode layer (21 and 22) interposed therebetween.

The first external electrode 51 is provided on the first end surface 15 of the multilayer body 10 and, in FIG. 1, includes a portion which extends over a portion of each of the first main surface 11, the second main surface 12, the first side surface 13 and the second side surface 14. The first external electrode 51 is connected to the first internal electrode layer 21 at the first end surface 15.

The second external electrode 52 is provided on the second end surface 16 of the multilayer body 10 and, in FIG. 1, includes a portion which extends over a portion of each of the first main surface 11, the second main surface 12, the first side surface 13, and the second side surface 14. The second external electrode 52 is connected to the second internal electrode layer 22 at the second end surface 16.

Each of the first external electrode 51 and the second external electrode 52 preferably includes a Ni layer including Ni and a ceramic material, for example. The Ni layer is a foundation electrode layer (for example, base electrode layer). Such a Ni layer can be formed by a cofiring method in which firing is performed simultaneously with the first internal electrode layer 21 and the second internal electrode layer 22. The Ni layer is preferably disposed directly on the multilayer body 10.

The first external electrode 51 preferably includes the Ni layer, a first plated layer, and a second plated layer in order from a side of the first end surface 15 of the multilayer body 10. Similarly, the second external electrode 52 preferably includes the Ni layer, the first plated layer, and the second plated layer in order from a side of the second end surface 16 of the multilayer body 10. The first plated layer is preferably formed by Ni plating, and the second plated layer is preferably formed by Sn plating, for example. Each of the first external electrode 51 and the second external electrode 52 may include a conductive resin layer including conductive particles and a resin between the Ni layer and the first plated layer. Examples of the conductive particles in the conductive resin layer include metal particles of Cu, Ag, and Ni.

It should be noted that the Ni layer may be formed by a so-called post-firing method which applies a conductive paste to the end surface of the multilayer body, and then performs firing. In this case, it may be unnecessary for the Ni layer to contain a ceramic material.

Alternatively, each of the first external electrode 51 and the second external electrode 52 may include a foundation electrode layer including a metal such as Cu. The foundation electrode layer may be formed by a cofiring method or a post-firing method. Furthermore, the foundation electrode layer may include a plurality of layers.

For example, the first external electrode 51 may have a four-layer structure including a Cu layer as a foundation electrode layer, a conductive resin layer including conductive particles and a resin, the first plated layer, and the second plated layer in order from a side of the first end surface 15 of the multilayer body 10. Similarly, the second external electrode 52 may have, for example, a four-layer structure including a Cu layer as a foundation electrode layer, a conductive resin layer including conductive particles and resin, the first plated layer, and the second plated layer in order from a side of the second end surface 16 of the multilayer body 10.

As shown in FIGS. 3 and 4, the dielectric ceramic layer 20 includes the first dielectric ceramic layer 20a and the second dielectric ceramic layer 20b. The first dielectric ceramic layer 20a is disposed between the first internal electrode layer 21 and the second internal electrode layer 22. The second dielectric ceramic layer 20b is disposed in a region where the internal electrode layer is not disposed, between the first dielectric ceramic layers 20a provided opposite to each other with the internal electrode layer interposed therebetween.

As shown in FIGS. 2, 3 and 4, the multilayer body 10 includes an inner layer portion 30 in which the first internal electrode layer 21 and the second internal electrode layer 22 are provided opposite to each other with the dielectric ceramic layer interposed therebetween, outer layer portions 31 and 32 sandwiching the inner layer portion 30 in the stacking (T) direction, and a third dielectric ceramic layers 41 and 42 sandwiching the inner layer portion 30, the outer layer portion 31, and the outer layer portion 32 in the width (W) direction. Third dielectric ceramic layers 41 and 42 are also referred to as side margin portions. In FIGS. 3 and 4, the inner layer portion is a region sandwiched between the first internal electrode layer 21 closest to the first main surface 11 and the first internal electrode layer 21 closest to the second main surface 12 along the stacking (T) direction. Although not shown, each of the outer layer portion 31 and the outer layer portion 32 preferably includes a plurality of dielectric ceramic layers 20 stacked in the stacking (T) direction, and more preferably includes the first dielectric ceramic layer 20a.

The thickness of each of the outer layer portions 31 and 32 is preferably about 15 µm or more and about 40 µm or less, for example. It should be noted that each of the outer layer portions 31 and 32 may have a single layer structure rather than a multi-layered structure.

As shown in FIG. 4, each of the third dielectric ceramic layer 41 and the third dielectric ceramic layer 42 may include a plurality of dielectric ceramic layers stacked in the width (W) direction. Among the plurality of dielectric ceramic layers of the third dielectric ceramic layers, the innermost layer in the width direction is referred to as an inner layer, and the outermost layer is referred to as an outer layer. The inner layer and the outer layer have an interface therebetween. In FIG. 4, the third dielectric ceramic layer 41 preferably has, as the dielectric ceramic layer, a two-layer structure including an inner layer 41a disposed innermost of the multilayer body 10, and an outer layer 41b disposed outermost of the multilayer body 10. Similarly, the third dielectric ceramic layer 42 preferably has, as the dielectric ceramic layer, a two-layer structure including an inner layer 42a disposed innermost of the multilayer body 10, and an outer layer 42b disposed outermost of the multilayer body 10. It should be noted that the third dielectric ceramic layer is not limited to a two-layer structure, and may have a structure including three or more layers. In a case in which the third dielectric ceramic layer includes three or more dielectric ceramic layers, the dielectric ceramic layer disposed innermost in the width direction is the inner layer, and the dielectric ceramic layer disposed outermost in the width direction is the outer layer. Furthermore, the number of layers of the third dielectric ceramic layer of the first side surface side of the multilayer body may be different from that of the third dielectric ceramic layer of the second side surface side of the multilayer body.

In a case in which the third dielectric ceramic layer is a two-layer structure including an inner layer and an outer layer, due to the difference in sinterability in the inner layer and the outer layer, it is possible to confirm the two-layer structure and the interface between the layers by observing with an optical microscope in a dark field. The same applies to a case where the third dielectric ceramic layer has a structure including three or more layers.

The first dielectric ceramic layer 20a, the second dielectric ceramic layer 20b, and the third dielectric ceramic layers 41 and 42 are, for example, made of a dielectric ceramic material mainly including $BaTiO_3$ or the like. The dielectric ceramic layer 20 of the inner layer portion 30 may further include a sintering aid element.

The dielectric ceramic layer of the first dielectric ceramic layer, the second dielectric ceramic layer, and the third dielectric ceramic layer may include ceramic grains. Details of the diameter of the ceramic grains will be described later.

In the multilayer ceramic capacitor according to the present preferred embodiment, the composition of at least one dielectric ceramic layer among the first dielectric ceramic layer, the second dielectric ceramic layer, and the third dielectric ceramic layer is different from the composition of the other dielectric ceramic layers. The first dielectric ceramic layer, the second dielectric ceramic layer, and the third dielectric ceramic layer each have a different arrangement purpose or different characteristics required for the manufacturing method. Therefore, by setting the composition of at least one dielectric ceramic layer among the first dielectric ceramic layer, the second dielectric ceramic layer, and the third dielectric ceramic layer to be different from the composition of the other dielectric ceramic layers, it is possible to achieve an optimum composition according to the location where the dielectric ceramic layer is disposed, making it possible to increase the reliability.

In the multilayer ceramic capacitor according to the present preferred embodiment, the composition of the first dielectric ceramic layer may be different from the compositions of the second dielectric ceramic layer and the third dielectric ceramic layer, the composition of the second dielectric ceramic layer may be different from the compositions of the first dielectric ceramic layer and the third dielectric ceramic layer, the composition of the third dielectric ceramic layer may be different from the compositions of the first dielectric ceramic layer and the second dielectric ceramic layer, and the composition of the first dielectric ceramic layer, the composition of the second dielectric ceramic layer, and the composition of the third dielectric ceramic layer may be different from one another.

In the multilayer ceramic capacitor of the present preferred embodiment, the composition of the second dielectric ceramic layer and the composition of the third dielectric ceramic layer are preferably different from each other, and the composition of the first dielectric ceramic layer, the composition of the second dielectric ceramic layer, and the composition of the third dielectric ceramic layer are preferably different from one another.

It should be noted that, in a case in which the third dielectric ceramic layer includes a plurality of dielectric ceramic layers, the plurality of dielectric ceramic layers of the third dielectric ceramic layer may be the same composition relative to each other, or may be different compositions from each other. In a case in which any one composition of the plurality of dielectric ceramic layers of the third dielectric ceramic layer is different from that of the first dielectric ceramic layer, it can be recognized that the composition of the third dielectric ceramic layer is different from the composition of the first dielectric ceramic layer. Furthermore, in a case in which any one composition of the plurality of dielectric ceramic layers of the third dielectric ceramic layer is different from that of the second dielectric ceramic layer, it can be recognized that the composition of the third dielectric ceramic layer is different from the composition of the second dielectric ceramic layer.

Among the first dielectric ceramic layer, the second dielectric ceramic layer, and the third dielectric ceramic layer, it is preferable for the dielectric ceramic layers having different compositions to have common main components and different types of additives. Examples of the main component include $BaTiO_3$, $CaTiO_3$, and $SrTiO_3$. The additives preferably include elements such as Si, Mg, Mn, Sn, Cu, rare earth, Ni and Al, for example. The first dielectric ceramic layer, the second dielectric ceramic layer, and the third dielectric ceramic layer may include two or more of the above elements.

It should be noted that "the same composition" means that the types of elements included in the dielectric ceramics included in each dielectric ceramic layer are the same, and the content (molar ratio) of all other elements based on Ti is within ±about 0.5%. It should be noted that the difference in diameter of the ceramic grains included in each dielectric ceramic layer, and the difference in porosity shall not be included in the difference in the composition of the dielectric ceramic layer.

The composition of each of the dielectric ceramic layers can be determined by performing an elemental analysis by wavelength dispersive X-ray analysis (WDX) or transmission electron microscopy-energy dispersive X-ray analysis (TEM-EDX) on an exposed cut surface of a dielectric ceramic layer made by cutting a multilayer ceramic capacitor. At this time, the composition of each dielectric ceramic layer is measured at five locations to determine the average value. The composition of the second dielectric ceramic layer is measured at five locations from the second dielectric ceramic layer exposed on the first end surface of the multilayer body, and at five locations from the second dielectric ceramic layer exposed on the second end surface of the multilayer body to determine the average value. In a case in which the third dielectric ceramic layer has a multi-layered structure, the composition thereof is the sum of the compositions obtained by multiplying the compositions obtained by measuring the composition of each of the layers at five locations with the ratio of the thickness of each of the layers occupied in the third dielectric ceramic layer. It should be noted that, when segregation of elements is observed in the vicinity of the interface with the other dielectric ceramic layer or the internal electrode layer, the portion where segregation of elements is observed shall not be the measurement target of WDX.

The element to be added to the first dielectric ceramic layer is preferably Mg, for example. The content of Mg in the first dielectric ceramic layer is preferably about 0.05 mol % or more and about 3.0 mol % or less, for example, with respect to 100 moles of Ti. The content of Mg in the first dielectric ceramic layer is more preferably less than the content of Mg in the second dielectric ceramic layer and the third dielectric ceramic layer. When the content of Mg in the first dielectric ceramic layer is small, since the relative dielectric constant of the first dielectric ceramic layer is increased, it is possible to improve the capacitance of the multilayer ceramic capacitor. It should be noted that the content of Mg in the first dielectric ceramic layer may preferably be as low as possible.

The element to be added to the second dielectric ceramic layer is preferably Sn, for example. The content of Sn in the second dielectric ceramic layer is preferably about 0.05 mol % or more, and about 3.0 mol % or less, for example, with respect to 100 moles of Ti. The content of Sn in the second dielectric ceramic layer is preferably greater than the content of Sn in the first dielectric ceramic layer and the third dielectric ceramic layer.

The element to be added to the third dielectric ceramic layer is preferably Si, for example. The content of Si in the third dielectric ceramic layer is preferably about 0.05 mol % or more, and about 5.0 mol % or less, for example, with respect to 100 moles of Ti. The content of Si in the third dielectric ceramic layer is preferably greater than the content of Si in the first dielectric ceramic layer and the second dielectric ceramic layer. When the content of Si in the third dielectric ceramic layer is large, since the sinterability of the dielectric ceramic layer is increased, it is possible to reduce or prevent the internal electrode layer from being deteriorated due to the intrusion of water or the like from the first side surface and the second side surface of the multilayer body.

The element to be added to the third dielectric ceramic layer is preferably Mg, for example. The content of Mg in the third dielectric ceramic layer is preferably about 0.05 mol % or more and about 5.0 mol % or less, for example with respect to 100 moles of Ti. The content of Mg in the third dielectric ceramic layer is preferably greater than the content of Mg in the first dielectric ceramic layer and the second dielectric ceramic layer. When the content of Mg in the third dielectric ceramic layer is large, it is possible to reduce or prevent the grain growth of the ceramic grains included in the third dielectric ceramic layer, and it is possible to reduce or prevent a short circuit between the internal electrode layers.

The element to be added to the third dielectric ceramic layer is preferably Mn, for example. The content of Mn in the third dielectric ceramic layer is preferably about 0.01 mol % or more, and about 3.0 mol % or less, for example, with respect to 100 moles of Ti. The content of Mn in the third dielectric ceramic layer is preferably greater than the content of Mn in the first dielectric ceramic layer and the second dielectric ceramic layer. When the content of Mn in the third dielectric ceramic layer is large, it is possible to reduce or prevent the grain growth of the ceramic grains included in the third dielectric ceramic layer, and it is possible to reduce or prevent a short circuit between the internal electrode layers.

In the first dielectric ceramic layer, the second dielectric ceramic layer, and the third dielectric ceramic layer, elements other than the main component included in each dielectric ceramic layer are preferably diffused into the other dielectric ceramic layers. Furthermore, a portion of the elements included as an additive in the first dielectric ceramic layer, the second dielectric ceramic layer, and the third dielectric ceramic layer is preferably diffused into the adjacent other dielectric ceramic layers and the internal electrode layers.

Figure 5:
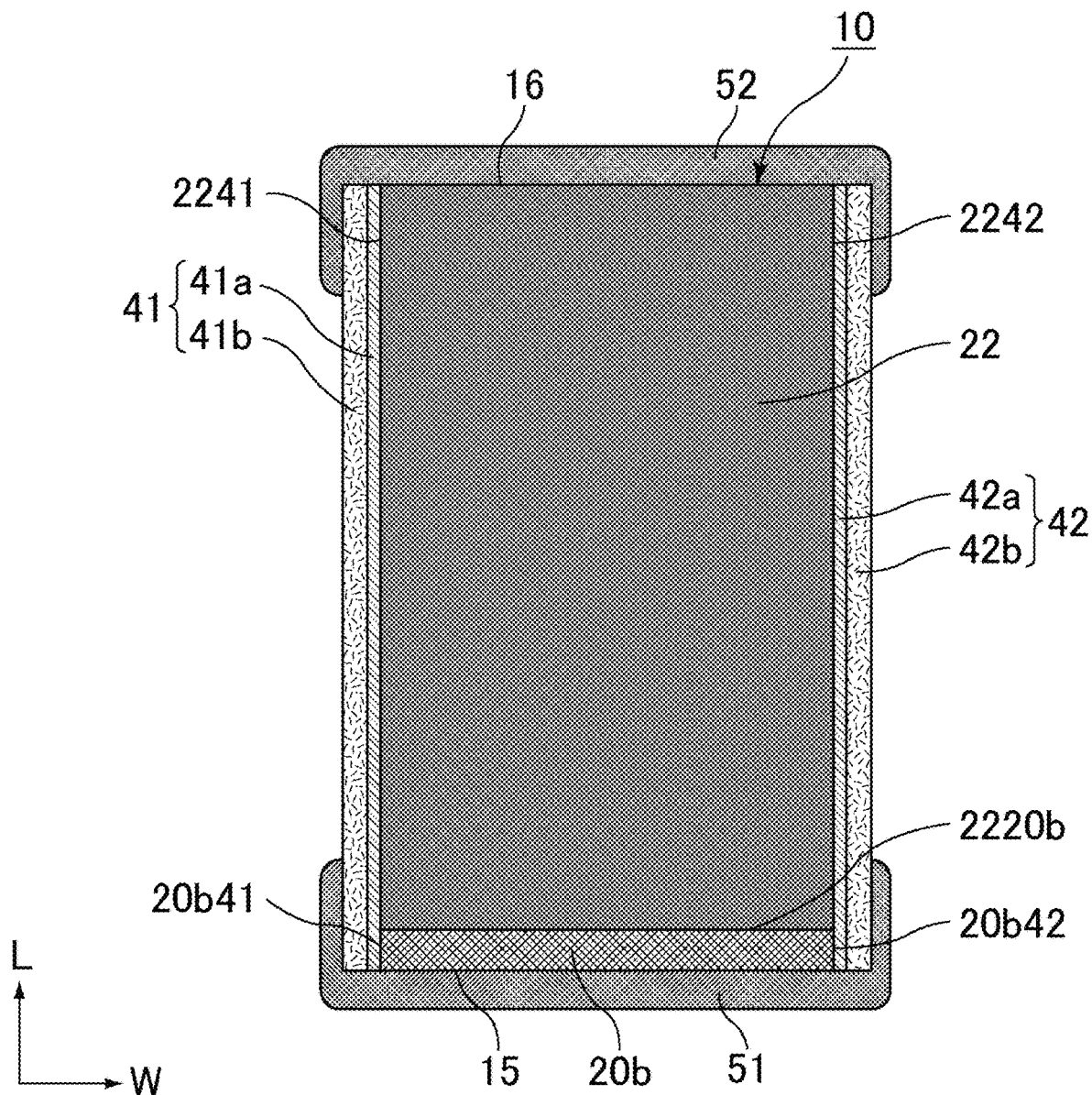
FIG. 5 is a sectional view taken along line B-B of the multilayer ceramic capacitor shown in FIG. 1.

FIG. 5 is a cross-sectional view taken along line B-B of the multilayer ceramic capacitor shown in FIG. 1. It should be noted that FIG. 5 is an LW cross-section of the multilayer ceramic capacitor 1. As shown in FIG. 5, the second internal electrode layer 22 is exposed on the second end surface 16 of the multilayer body 10, and the second dielectric ceramic layer 20b is exposed on the first end surface 15 of the multilayer body 10. Furthermore, the third dielectric ceramic layer 41 and the third dielectric ceramic layer 42 are respectively disposed on the first side surface 13 side and the second side surface 14 side of the multilayer body 10.

As shown in FIG. 5, there is an interface 2220b between the second internal electrode layer 22 and the second dielectric ceramic layer 20b. Furthermore, there are interfaces 2241 and 2242 between the second internal electrode layer 22 and the third dielectric ceramic layers 41 and 42. Furthermore, there are interfaces 20b41 and 20b42 between the second dielectric ceramic layer 20b and the third dielectric ceramic layers 41 and 42.

In addition, although not shown in FIG. 5, the first dielectric ceramic layer 20a is disposed on both sides in the thickness direction of the second internal electrode layer 22 and the second dielectric ceramic layer 20b. Therefore, it can be recognized that the first dielectric ceramic layer 20a includes an interface in direct contact with the second dielectric ceramic layer 20b, the third dielectric ceramic layers 41 and 42, and the internal electrode layers 21 and 22.

Furthermore, similarly to the second internal electrode layer 22 shown in FIG. 5, the first internal electrode layer 21 also includes an interface in direct contact with the first dielectric ceramic layer 20a, the second dielectric ceramic layer 20b, and the third dielectric ceramic layers 41 and 42.

In the first dielectric ceramic layer 20a, elements derived from the second dielectric ceramic layer 20b may be segregated in the vicinity of the interface with the second dielectric ceramic layer 20b. Furthermore, in the first dielectric ceramic layer 20a, elements originating from the third dielectric ceramic layer 41 or 42 may be segregated in the vicinity of the interface with the third dielectric ceramic layer 41 or 42.

In the second dielectric ceramic layer 20b, elements originating from the first dielectric ceramic layer 20a may be segregated in the vicinity of the interface with the first dielectric ceramic layers 20a. Furthermore, in the second dielectric ceramic layer 20b, elements originating from the third dielectric ceramic layer 41 or 42 may be segregated in the vicinity of the interfaces 20b41 or 20b42 with the third dielectric ceramic layer 41 or 42.

In the third dielectric ceramic layers 41 and 42, elements originating from the first dielectric ceramic layer 20a may be segregated in the vicinity of the interface with the first dielectric ceramic layer 20a. Furthermore, in the third dielectric ceramic layers 41 and 42, elements originating from the second dielectric ceramic layer 20b may be segregated in the vicinity of the interfaces 20b41 and 20b42 with the second dielectric ceramic layer 20b.

In the first internal electrode layer 21 and the second internal electrode layer 22, elements originating from the first dielectric ceramic layer 20a may be segregated in the vicinity of the interface with the first dielectric ceramic layer 20a. In addition, in the first internal electrode layer 21 and the second internal electrode layer 22, elements originating from the second dielectric ceramic layer 20b may be segregated in the vicinity of the interface 2220b with the second dielectric ceramic layer 20b. Furthermore, in the first internal electrode layer 21 and the second internal electrode layer 22, elements originating from the third dielectric ceramic layers 41 and 42 may be segregated in the vicinity of the interfaces 2241 and 2242 with the third dielectric ceramic layers 41 and 42. In addition, both the element originating from the second dielectric ceramic layer 20b and the element originating from the third dielectric ceramic layer 41 or 42 may be segregated in the vicinity of the portion where the interface 2220b between the second internal electrode layer 22 and the second dielectric ceramic layer 20b, and the interface 2241 or 2242 between the second internal electrode layer 22, and the third dielectric ceramic layer 41 or 42 are in contact with each other (the corner of the second internal electrode layer 22 on the first end surface 15 side).

The porosity of the first dielectric ceramic layer, the second dielectric ceramic layer, and the third dielectric ceramic layer may be the same as, or may be different from one another. A multilayer ceramic capacitor is cut, and the cut surface, which exposes each dielectric ceramic layer, is observed by a scanning electron microscope (SEM) at 20,000 times magnification. An area having a visual field size of about 6.3 μm×about 4.4 μm is photographed at five locations so that the areas do not overlap each other, and the ratio of the area occupied by the voids to the entire visual field is calculated as the porosity by image analysis from each of the obtained SEM images, and an average value in the five visual fields is obtained. However, in a case in which the third dielectric ceramic layer includes a plurality of layers, the porosity of the third dielectric ceramic layer is calculated as the sum of the product of porosity of each layer and the value obtained by dividing the thickness of the layer by the thickness of the third dielectric ceramic layer after obtaining the porosity of each layer individually.

The first dielectric ceramic layer, the second dielectric ceramic layer, and the third dielectric ceramic layer preferably include ceramic grains. When the dielectric ceramic layer includes ceramic grains, interfacial resistance occurs at the interface between the ceramic grains, a result of which the insulation resistance between the internal electrode layers increases, making it possible to reduce or prevent the occurrence of a short circuit.

A rare earth element is preferably present at the interface of the ceramic grains. The presence of a rare earth element at the interface of the ceramic grains can be confirmed by elemental analyses with TEM-EDX. Examples of the rare earth elements include La, Ce, Pr, Nd, Sm, Eu, Gd, Tb, Dy, Ho, Er, Tm, Yb, Lu, and Y. The presence of a rare earth element at the interface of the ceramic grains allows for further increase of the interfacial resistance of the dielectric ceramic layer, as a result of which it is possible to further improve the reliability of the multilayer ceramic capacitor. It should be noted that Mg, Mn, Si or the like may also be present.

The rare earth element is preferably present in an amount of about 0.2 mol % or more and about 5 mol % or less, for example, with respect to 100 moles of Ti. Herein, 100 moles of Ti defines the amount of rare earth element with respect to 100 moles of Ti on the assumption that the dielectric ceramic material of the dielectric ceramic layers has a compound having a perovskite structure (structure represented by $ABO_3$, B=Ti) as a main component. The amount of rare earth element can be confirmed by TEM-EDX.

In the multilayer ceramic capacitor, the thickness of each of the first internal electrode layer and the second internal electrode layer is preferably about 0.4 μm or less, for example. Furthermore, the thickness of each of the first internal electrode layer and the second internal electrode layer is preferably about 0.38 μm or less, for example. Furthermore, the thickness of each of the first internal electrode layer and the second internal electrode layer is preferably about 0.25 μm or more, for example.

The thickness of the first dielectric ceramic layer is preferably about 0.55 μm or less, for example. Furthermore, the thickness of the first dielectric ceramic layer is preferably about 0.4 μm or more, for example.

The thickness of the second dielectric ceramic layer is preferably the same or substantially the same as the thickness of the internal electrode layer.

The thickness of each of the third dielectric ceramic layers 41 and 42 is preferably about 5 μm or more and about 40 μm or less, and more preferably about 5 μm or more and about 20 μm or less, for example. The thicknesses of the third dielectric ceramic layers 41 and 42 are preferably the same or substantially the same. However, the outer layer 41b is preferably thicker than the inner layer 41a, while the inner layer 41a and the outer layer 41b satisfy the above range. Similarly, the outer layer 42b is preferably thicker than the inner layer 42a, while the inner layer 42a and the outer layer 42b satisfy the above range.

From the viewpoint of maintaining the shape and performance of the multilayer ceramic capacitor 1, the inner layer 41a is preferably thinner than the outer layer 41b. Similarly, the inner layer 42a is preferably thinner than the outer layer 42b.

The thickness of each of the inner layers 41a and 42a is preferably about 0.1 μm or more and about 20 μm or less, for example. The inner layers 41a and 42a preferably have the same or substantially the same thickness.

The thickness of each of the outer layers 41b and 42b is preferably about 5 μm or more and about 20 μm or less, for example. The outer layers 41b and 42b have preferably the same or substantially the same thickness.

The thickness of each ceramic layer of the side margin portion indicates an average value when the thickness of the third dielectric ceramic layer along the stacking (T) direction is measured at a plurality of locations.

Method for Manufacturing a Multilayer Ceramic Capacitor

A method for manufacturing a multilayer ceramic capacitor according to a preferred embodiment of the present invention includes preparing a green chip, the green chip including a multilayer structure including a plurality of first dielectric ceramic layers, a plurality of second dielectric ceramic layers, and a plurality of pairs of first internal electrode layers and second internal electrode layers in an unfired state, the first internal electrode layers and the second internal electrode layers being exposed on a first side surface and a second side surface on opposite sides in a width direction orthogonal or substantially orthogonal to a stacking direction; forming an unfired third dielectric ceramic layer on the first side surface and the second side surface of the green chip, and thus fabricating an unfired multilayer body; and firing the unfired multilayer body, in which the preparing of the green chip further includes stacking a ceramic green sheet obtained by forming an unfired first internal electrode layer or an unfired second internal electrode layer on a surface of the unfired first dielectric ceramic layer and forming an unfired second dielectric ceramic layer in a region where the first internal electrode layer and the second internal electrode layer are not provided, in which the fabricating the unfired multilayer body further includes forming an unfired side margin portion by forming an unfired inner layer on the first side surface and the second side surface and forming an unfired outer layer on an outermost side, and in which a composition of at least one dielectric ceramic layer among the first dielectric ceramic layer, the second dielectric ceramic layer, and the third dielectric ceramic layer is different from that of the other dielectric ceramic layers.

A non-limiting example of a method for manufacturing the multilayer ceramic capacitor 1 shown in FIG. 1 will be described below.

First, a ceramic green sheet is prepared which is to be provided with the first dielectric ceramic layer 20a, the second dielectric ceramic layer 20b, and the third dielectric ceramic layers 41 and 42. The ceramic green sheet includes a binder, a solvent, and the like, in addition to a ceramic raw material including the dielectric ceramic material described above. Furthermore, an additive including a rare earth element may be added to the ceramic raw material. By changing the element included in the additive, the compositions of the first dielectric ceramic layer, the second dielectric ceramic layer, and the third dielectric ceramic layer can be changed. The ceramic raw materials as a main component are preferably the same or substantially the same. The ceramic green sheet is molded using, for example, a die coater, a gravure coater, a micro gravure coater, or the like, on a carrier film.

Figure 6:
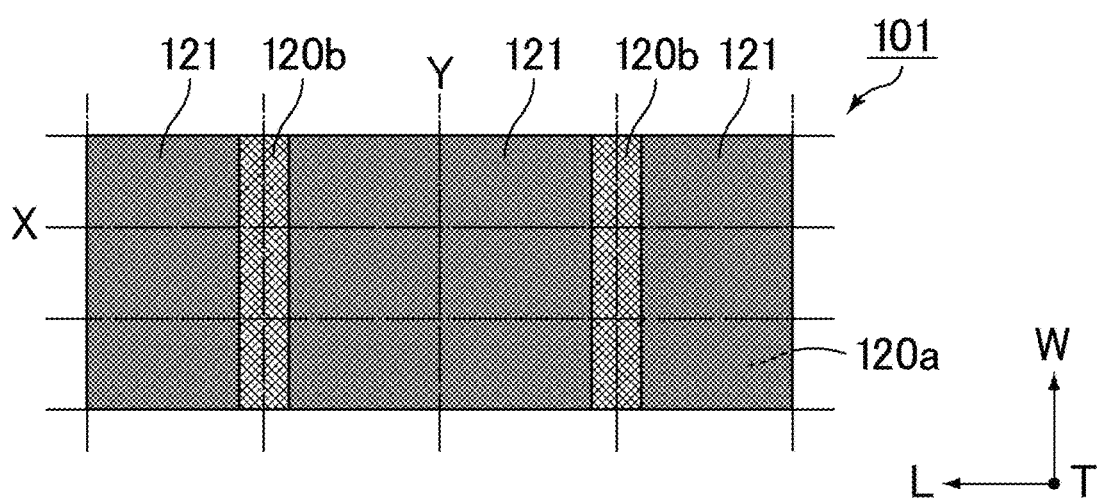
FIG. 6 is a plan view schematically showing an example of a ceramic green sheet.
Figure 7:
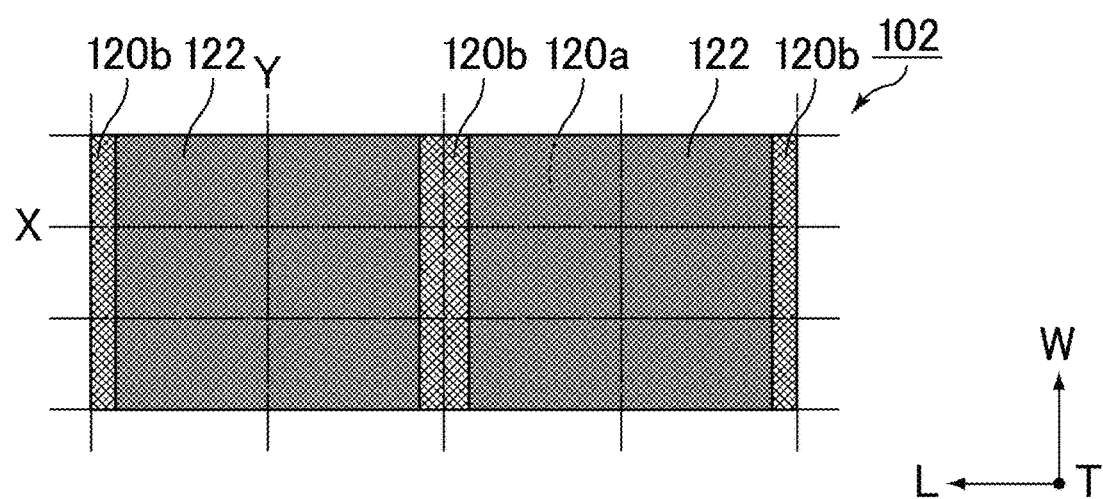
FIG. 7 is a plan view schematically showing an example of a ceramic green sheet.
Figure 8:
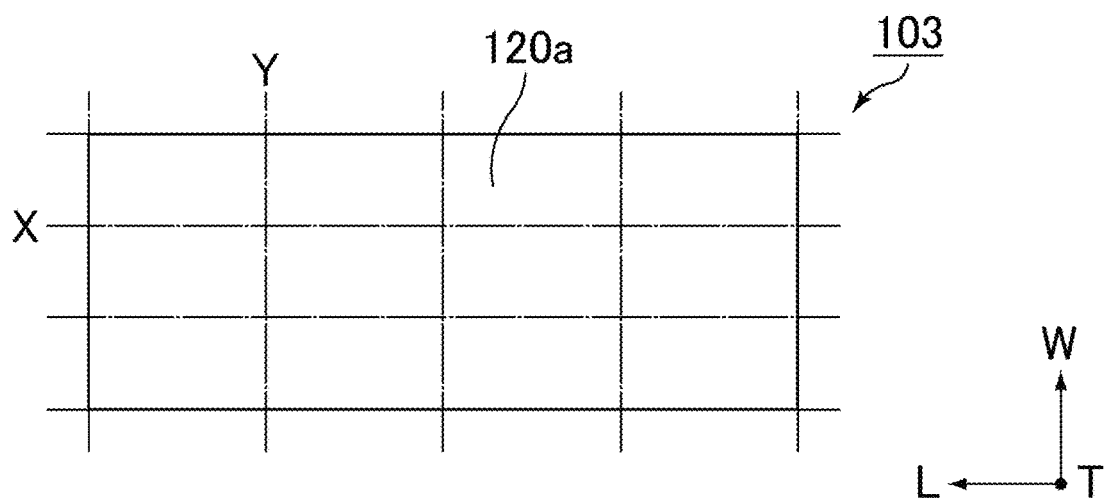
FIG. 8 is a plan view schematically showing an example of a ceramic green sheet.

FIGS. 6, 7, and 8 are plan views schematically showing an example of a ceramic green sheet. FIGS. 6, 7, and 8 respectively show a first ceramic green sheet 101 for forming the inner layer portion 30, a second ceramic green sheet 102 for forming the inner layer portion 30, and a third ceramic green sheet 103 for forming the outer layer portion 31 or 32.

In FIGS. 6, 7, and 8, the first ceramic green sheet 101, the second ceramic green sheet 102, and the third ceramic green sheet 103 are not separated into each multilayer ceramic capacitor 1. In FIGS. 6, 7, and 8, the cutting lines X and Y at the time of separating into each multilayer ceramic capacitor 1 are shown. The cutting line X is parallel or substantially parallel to the length (L) direction, and the cutting line Y is parallel or substantially parallel to the width (W) direction.

As shown in FIG. 6, in the first ceramic green sheet 101, an unfired first internal electrode layer 121 corresponding to the first internal electrode layer 21 is formed on an unfired first dielectric ceramic layer 120a corresponding to the first dielectric ceramic layer 20a. Furthermore, an unfired second dielectric ceramic layer 120b corresponding to the second dielectric ceramic layer 20b is formed in a region where the unfired first internal electrode layer 121 is not formed. The unfired first dielectric ceramic layer 120a and the unfired second dielectric ceramic layer 120b also refer to an unfired dielectric ceramic layer 120 corresponding to the dielectric ceramic layer 20.

As shown in FIG. 7, in the second ceramic green sheet 102, an unfired second internal electrode layer 122 corresponding to the second internal electrode layer 22 is formed on the unfired first dielectric ceramic layer 120a corresponding to the first dielectric ceramic layer 20a. Furthermore, the unfired second dielectric ceramic layer 120b corresponding to the second dielectric ceramic layer 20b is formed in a region where the unfired second internal electrode layer 122 is not formed. The unfired first dielectric ceramic layer 120a and the unfired second dielectric ceramic layer 120b also refer to the unfired dielectric ceramic layer 120 corresponding to the dielectric ceramic layer 20.

The method for fabricating the first ceramic green sheet 101 shown in FIG. 6 and the second ceramic green sheet shown in FIG. 7 is not particularly limited. However, examples thereof include a method for applying a dielectric paste as the mixture of a dielectric ceramic and a solvent, which becomes the second dielectric ceramic layer 20b by firing, and a conductive paste, which becomes the internal electrode layer 21 or 22 by firing, respectively to predetermined regions of the surface of the unfired first dielectric ceramic layer 120a. The order in which the dielectric paste and the conductive paste are applied is not particularly limited, and the conductive paste may be applied after the dielectric paste is applied first, or the dielectric paste may be applied after the conductive paste is applied first. In addition, the dielectric paste and the conductive paste may be applied so that a portion of the surface of the paste applied previously is covered with a portion of the paste applied later.

As shown in FIG. 8, the third ceramic green sheet 103 corresponding to the outer layer portion 31 or 32 includes the unfired first dielectric ceramic layer 120a corresponding to the first dielectric ceramic layer, and neither the unfired internal electrode layer 121 or 122 nor the unfired second dielectric ceramic layer 120b is formed.

The first internal electrode layer 121 and the second internal electrode layer 122 can be formed using any conductive paste. For example, a screen-printing method, a gravure printing method, or the like can be used for forming the first internal electrode layer 121 and the second internal electrode layer 122 using the conductive paste.

The first internal electrode layer 121 and the second internal electrode layer 122 are disposed over two regions which are partitioned by the cutting line Y and are adjacent to each other in the length (L) direction, and extend in a strip shape in the width (W) direction. The regions partitioned by the cutting line Y of the first internal electrode layer 121 and the second internal electrode layer 122 are shifted from each other in the length (L) direction by one row. That is, the cutting line Y passing through the center of the first internal electrode layer 121 passes through a region between the second internal electrode layers 122 (i.e., the center of the second dielectric ceramic layer 120b), and the cutting line Y passing through the center of the second internal electrode layer 122 passes through the region between the first internal electrode layers 121 (i.e., the center of the second dielectric ceramic layer 120b).

Thereafter, the first ceramic green sheet 101, the second ceramic green sheet 102, and the third ceramic green sheet 103 are stacked, thus fabricating a mother block.

Figure 9:
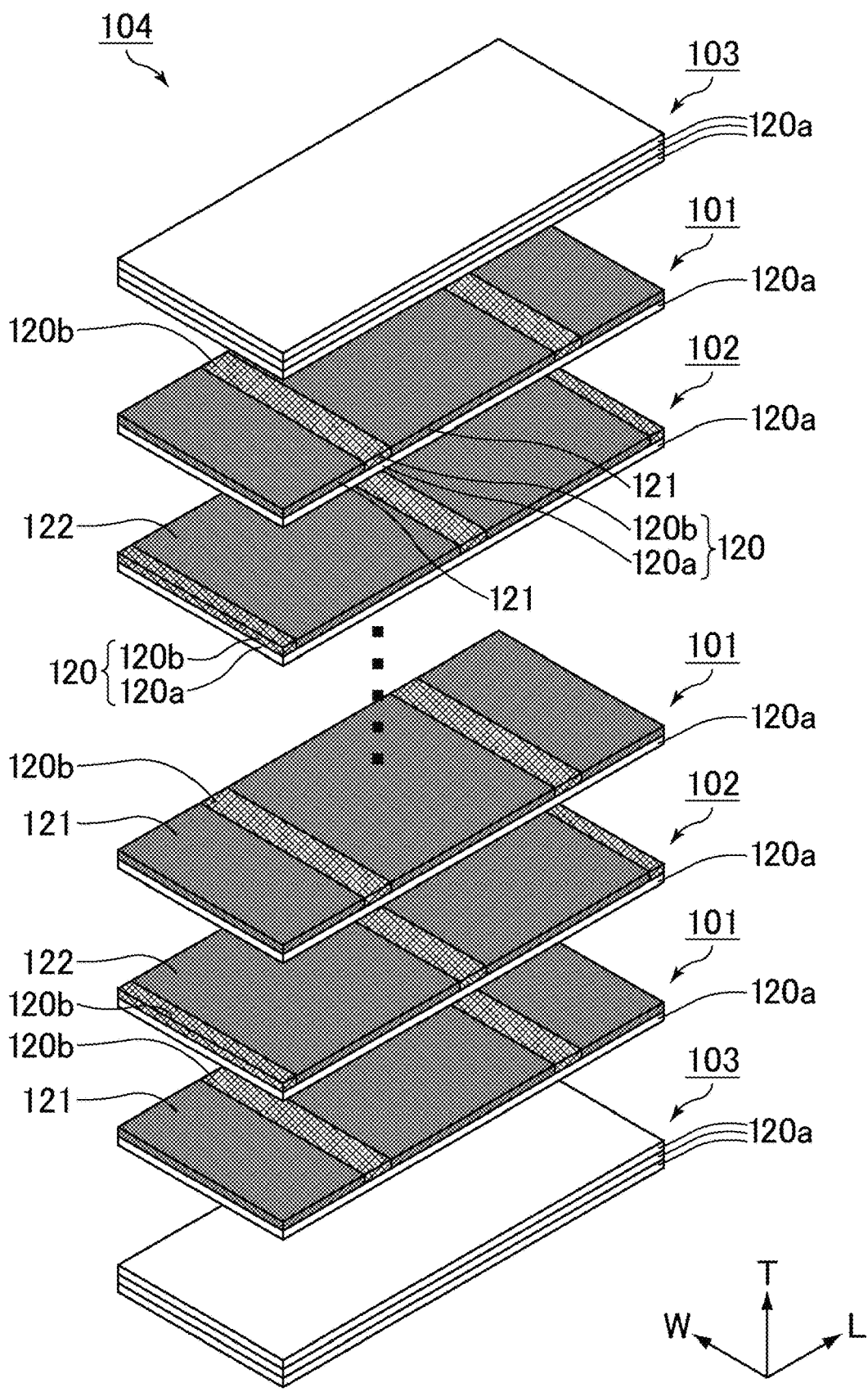
FIG. 9 is an exploded perspective view schematically showing an example of a mother block.

FIG. 9 is an exploded perspective view schematically showing an example of the mother block. In FIG. 9, for convenience of explanation, the first ceramic green sheet 101, the second ceramic green sheet 102, and the third ceramic green sheet 103 are shown in an exploded manner. However, in an actual mother block 104, the first ceramic green sheet 101, the second ceramic green sheet 102, and the third ceramic green sheet 103 are integrally crimped by hydrostatic pressing, or the like, for example.

In the mother block 104 shown in FIG. 9, the first ceramic green sheet 101 and the second ceramic green sheet 102 corresponding to the inner layer portion 30 are alternately stacked in the stacking (T) direction. Furthermore, the third ceramic green sheets 103 corresponding to the outer layer portions 31 and 32 are stacked on the upper and lower surfaces in the stacking (T) direction of the first ceramic green sheets 101 and the second ceramic green sheets 102 which are alternately stacked. It should be noted that, although the third ceramic green sheet 103 is configured such that three pieces of the first dielectric ceramic layer 120a are stacked in FIG. 9, the number of first dielectric ceramic layers 120a to be stacked can be changed as appropriate.

By cutting the resulting mother block 104 along the cutting lines X and Y (refer to FIGS. 6, 7, and 8), a plurality of green chips are fabricated. For this cutting, a method such as dicing, push cutting, or laser cutting is applied, for example.

Figure 10:
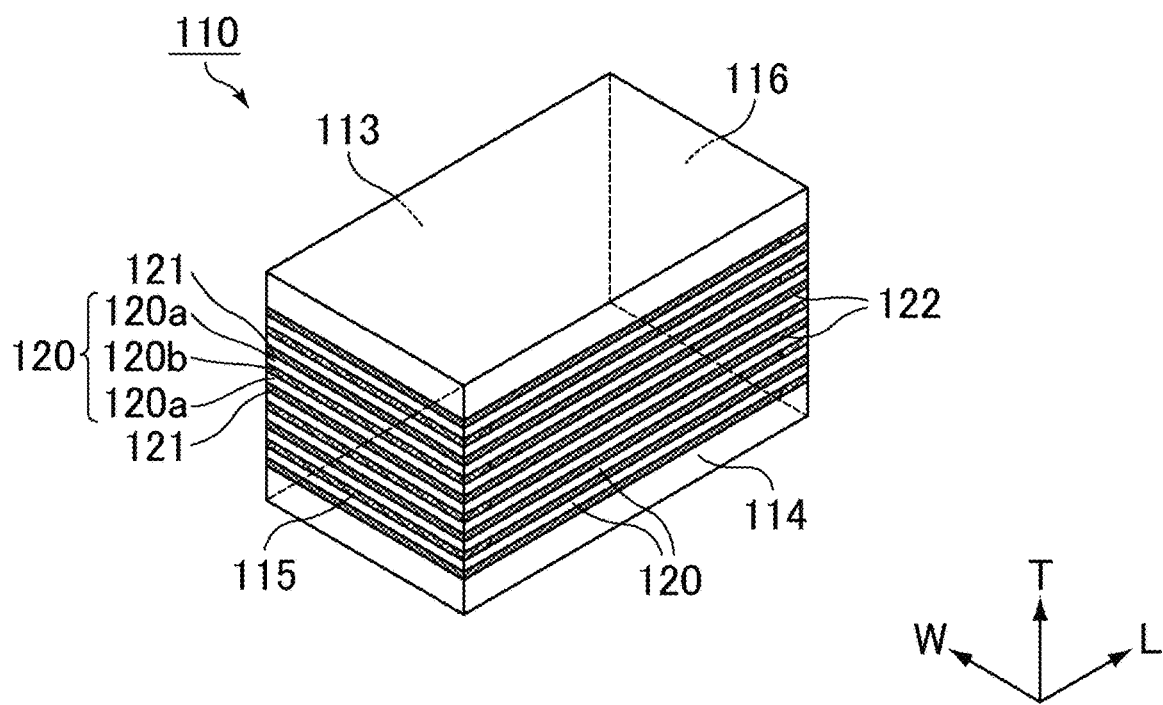
FIG. 10 is a perspective view schematically showing an example of a green chip.

FIG. 10 is a perspective view schematically showing an example of a green chip. The green chip 110 shown in FIG. 10 has a multilayer structure including the plurality of first dielectric ceramic layers 120a and the plurality of second dielectric ceramic layers 120b, and the plurality of pairs of first internal electrode layers 121 and second internal electrode layers 122 in an unfired state. A first side surface 113 and a second side surface 114 of the green chip 110 are planes provided by cutting along the cutting line X, and a first end surface 115 and a second end surface 116 are planes provided by cutting along the cutting line Y. The first internal electrode layer 121 and the second internal electrode layer 122 are exposed on the first side surface 113 and the second side surface 114. Furthermore, only the first internal electrode layers 121 and the second dielectric ceramic layer 120b are exposed on the first end surface 115, and only the second internal electrode layer 122 and the second dielectric ceramic layer 120b are exposed on the second end surface 116. The first dielectric ceramic layer 120a is exposed on the first side surface 113, the second side surface 114, the first end surface 115, and the second end surface 116. However, the locations of the second dielectric ceramic layers that are exposed in a region to be disposed differ. In other words, the second dielectric ceramic layers 120b disposed at a side of the first end surface 115 is not exposed on the second end surface 116, and the second dielectric ceramic layer 120b disposed at a side of the second end surface 116 is not exposed on the first end surface 115.

An unfired third dielectric ceramic layer is formed on the first side surface 113 and the second side surface 114 of the resulting green chip 110, as a result of which an unfired multilayer body is fabricated. The unfired third dielectric ceramic layer is formed, for example, by pasting a ceramic green sheet made of a dielectric ceramic on the first side surface and the second side surface of the green chip.

For example, in a case in which the third dielectric ceramic layer includes two layers of the inner layer and the outer layer, first, in order to fabricate a ceramic green sheet for the inner layer, a ceramic slurry is produced which includes a binder, a solvent, and the like, in addition to the ceramic raw material including a dielectric ceramic material mainly including $BaTiO_3$ or the like. Si as a sintering aid may be added to the ceramic slurry for the inner layer. The inner layer has a function of adhering to the green chip 110. In addition, a liquid phase metal may be added to the ceramic slurry for the inner layer, and more rare earth elements, Mg, and Mn may be added to the ceramic slurry for the inner layer than to the ceramic green sheet for forming the inner layer portion. Thus, it is possible to reduce or prevent the grain growth of the ceramic grains included in the dielectric ceramic layer sandwiched by the width direction ends of the internal electrode layers.

Next, in order to fabricate a ceramic green sheet for the outer layer, a ceramic slurry including a binder, a solvent, and the like in addition to a ceramic raw material including a dielectric ceramic material including $BaTiO_3$ or the like as a main component is produced. In addition, Si as a sintering aid may be added to the ceramic slurry for the outer layer. Furthermore, Si included in the ceramic green sheet for the inner layer is preferably larger than Si included in the ceramic green sheet for the outer layer. The degree of the content is determined based on the size of the area of a region where Si is detected, by imaging the cross-section by WDX.

The ceramic slurry for the outer layer is applied to the surface of a resin film and dried, such that the ceramic green sheet for the outer layer is formed. The ceramic slurry for the inner layer is applied to the surface of the ceramic green sheet for the outer layer on the resin film and dried, such that the ceramic green sheet for the inner layer is formed. As described above, a ceramic green sheet having a two-layer structure is obtained.

It should be noted that the ceramic green sheet having the two-layer structure can also be obtained, for example, by forming the ceramic green sheet for the outer layer and the ceramic green sheet for the inner layer in advance, and then bonding them to each other. Furthermore, the ceramic green sheet is not limited to the two-layer structure, and may have a structure with three or more layers.

Thereafter, the ceramic green sheet is peeled from the resin film.

Subsequently, the ceramic green sheet for the inner layer of the ceramic green sheet and the first side surface 113 of the green chip 110 are made to face each other, and pressed and punched, thus forming the unfired side margin portion 41. Furthermore, the ceramic green sheets for the inner layer of the ceramic green sheet and the second side surface 114 of the green chip 110 are also made to face each other, and pressed and punched, thus forming the unfired side margin portion 42. At this time, an organic solvent defining and functioning as an adhesive is preferably applied to the side surface of the green chip in advance. As described above, an unfired multilayer body is obtained.

It is preferable to perform barrel polishing or the like, for example, on the unfired multilayer body obtained by the above method. By polishing the unfired multilayer body, the corners and ridges of a fired multilayer body 10 are rounded.

Thereafter, in the unfired multilayer body, a conductive paste for an external electrode including Ni and a ceramic material is applied on each end surface of the first end surface 115 and the second end surface 116 of the green chip 110.

The conductive paste for the external electrode preferably includes, as a ceramic material, the same or substantially the same dielectric ceramic material as the first dielectric ceramic layer, the second dielectric ceramic layer, or the outer layer. The content of the ceramic material in the conductive paste for the external electrodes is preferably about 15% by weight or more, for example. Furthermore, the content of the ceramic material in the conductive paste for the external electrode is preferably about 25% by weight or less, for example.

Next, the unfired multilayer body to which the conductive paste for the external electrode is subjected to, for example, a degreasing treatment in a nitrogen atmosphere under a predetermined condition, and then the resulting multilayer body is fired at a predetermined temperature in a nitrogen-hydrogen-water vapor mixed atmosphere. Thus, the unfired multilayer body and the conductive paste for the external electrode are fired simultaneously, and the multilayer body 10, the Ni layer connected to the first internal electrode layer 21, and the Ni layer connected to the second internal electrode layer 22 are formed at the same time by a cofiring method. Thereafter, the first plated layer including Ni plating and the second plated layer including Sn plating are stacked in this order on the surface of each of the Ni layer. Thus, the first external electrode 51 and the second external electrode 52 are formed.

It should be noted that on the multilayer body 10, the first external electrode 51 and the second external electrode 52 may be formed at separate timings by a post-firing method. Specifically, first, a multilayer body 10 is formed by performing a degreasing treatment on an unfired laminate under a predetermined condition in a nitrogen atmosphere, for example, and then firing the multilayer body at a predetermined temperature in a nitrogen-hydrogen-water vapor mixed atmosphere. Then, on each end surface of the first end surface 15 and the second end surface 16 of the multilayer body 10, a conductive paste including Cu powder is applied and baked. Thus, a foundation electrode layer connected to the first internal electrode layer 21 and a foundation electrode layer connected to the second internal electrode layer 22 are formed. Then, on the surface of each of the underlying electrode layer, conductive particles (e.g., Cu, Ag, Ni, metal particles such as) and a conductive resin layer including a resin, a first plated layer including Ni plating, and a second plated layer including Sn plating are laminated in this order. Thus, the first external electrode 51 and the second external electrode 52 are formed.

Thus, the multilayer ceramic capacitor 1 is manufactured.

In the preferred embodiment described above, the unfired third dielectric ceramic layer preferably is formed on both sides of the green chip after obtaining the plurality of green chips by cutting the mother block 104 along the cutting lines X and Y, for example. However, the following modifications are also possible.

That is, it may be configured such that a plurality of rod-shaped green block bodies are obtained which are provided by cutting the mother block along only the cutting line X and in which the first internal electrode layer and the second internal electrode layer are exposed on the side surface provided by cutting along the cutting line X, and thereafter, the unfired third dielectric ceramic layer is formed on both sides of the green block bodies to obtain a plurality of unfired multilayer bodies by cutting along the cutting line Y, followed by the unfired multilayer bodies being fired. By performing the same steps as in the above-described preferred embodiment after firing, a multilayer ceramic capacitor can be manufactured.

Preferred embodiments of the present invention further include the following configurations of (1) to (7).

Figure 11:
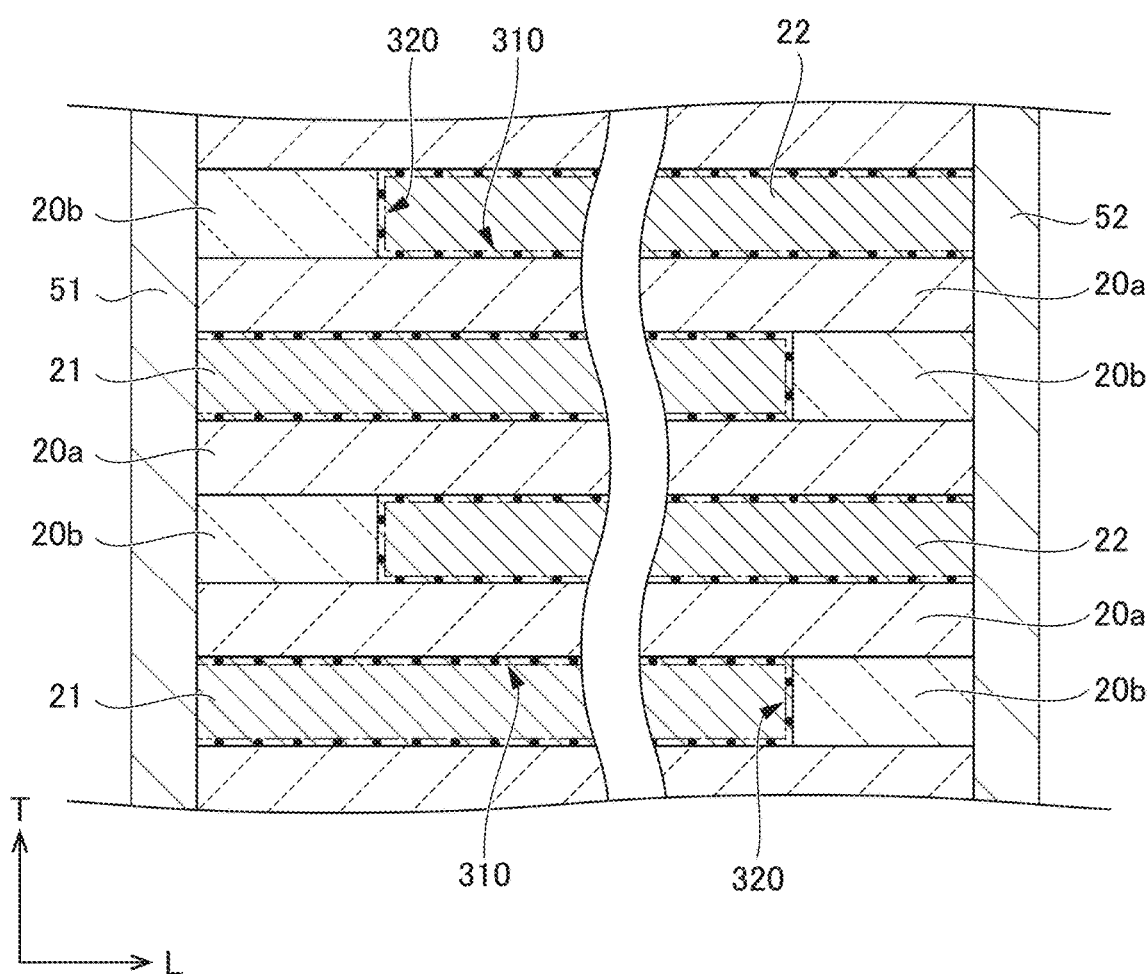
FIG. 11 shows a portion of an LT cross-section of a multilayer ceramic capacitor according to a preferred embodiment of the present invention, and is a diagram schematically showing a first alloy portion and a second alloy portion.

(1) Alloy Portion Between the Dielectric Ceramic Layer and the Internal Electrode Layer and the External Electrode In a multilayer ceramic capacitor 1 according to a preferred embodiment of the present invention, as shown in FIG. 11, a second alloy portion 320 is provided between the second dielectric ceramic layer 20b and the first internal electrode layer 21, and between the second dielectric ceramic layer 20b and the second internal electrode layer 22, respectively. Furthermore, in the multilayer ceramic capacitor 1, a first alloy portion 310 is provided between the first dielectric ceramic layer 20a and the first internal electrode layer 21, and between the first dielectric ceramic layer 20a and the second internal electrode layer 22, respectively.

Figure 12:
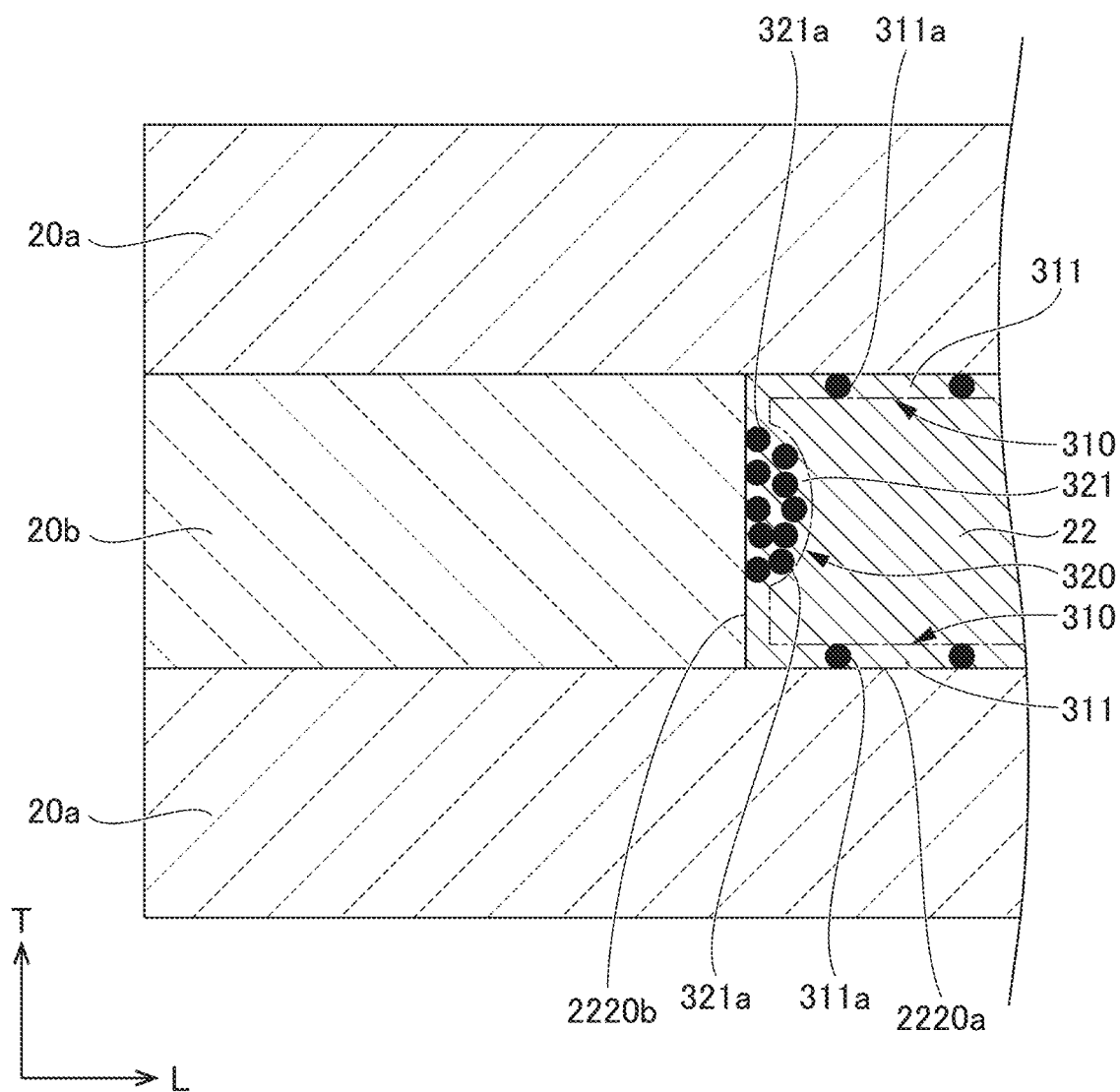
FIG. 12 is a partially enlarged view of FIG. 11.

As shown in FIG. 12, metal elements 321a are segregated at the interface 2220b with the second dielectric ceramic layer 20b in the second internal electrode layer 22. The second alloy portion 320 includes a segregation layer 321 which is a layer segregation by the metal elements 321a. Similarly to this, the metal elements 321a are segregated to provide the segregation layer 321 also at the interface 2220b with the second dielectric ceramic layer 20b in the first internal electrode layer 21, and the second alloy portion 320 by the segregation layer 321 is provided. The second alloy portion 320 is provided on the surfaces of the first internal electrode layer 21 and the second internal electrode layer 22 closer to the second dielectric ceramic layer 20b, respectively. The second alloy portion 320 is provided between the first internal electrode layer 21 and the second dielectric ceramic layer 20b, and between the second internal electrode layer 22 and the second dielectric ceramic layer 20b.

Furthermore, as shown in FIG. 12, metal elements 311a are segregated at an interface 2220a with the first dielectric ceramic layer 20a in the second internal electrode layer 22. The first alloy portion 310 includes a segregation layer 311 which is a layer segregation by the metal element 311a. Similarly to this, the metal elements 311a are segregated to provide the segregation layer 311 at the interface 2220a with the first dielectric ceramic layer 20a in the first internal electrode layer 21, and the first alloy portion 310 by the segregation layer 311 is provided. The first alloy portion 310 is provided on the surfaces of the first internal electrode layer 21 and the second internal electrode layer 22 closer to the first dielectric ceramic layer 20a, respectively. The first alloy portion 310 is provided between the first internal electrode layer 21 and the first dielectric ceramic layer 20a, and between the second internal electrode layer 22 and the first dielectric ceramic layer 20a.

There are a plurality of types of segregated metal elements 321a in the second alloy portion 320. The plurality of types of metal elements 321a in the segregation layer 321 includes a metal element provided in a greatest amount among the metal elements of the first internal electrode layer 21 and the second internal electrode layer 22, and an element derived from the second dielectric ceramic layer 20b. Furthermore, the same applies to the segregated metal element 311a of the first alloy portion 310. That is, the metal element 311a includes a metal element provided in a greatest amount among the metal elements of the first internal electrode layer 21 and the second internal electrode layer 22, and an element derived from the first dielectric ceramic layer 20a.

Examples of the metal element provided in a greatest amount among the metal elements of the first internal electrode layer 21 and the second internal electrode layer 22 include one of Ni, Cu, Ag, Pd, Au, and Pt. On the other hand, examples of the element derived from the second dielectric ceramic layer 20b and the first dielectric ceramic layer 20a include a metal element as an additive. More specifically, examples thereof include any one or more metal elements among the metal group of Sn, In, Ga, Zn, Bi, Pb, Cu, Ag, Pd, Pt, Ph, Ir, Ru, Os, Fe, V, Y, and Ge, among which, Sn, Ga, and Ge is particularly preferred. Hereinafter, this metal group may be referred to as a metal group M.

The segregation of the metal element 321a occurs when the metal element included in the second dielectric ceramic layer 20b migrates to the first internal electrode layer 21 and the second internal electrode layer 22 during firing of the second dielectric ceramic layer 20b. Furthermore, the segregation of the metal element 311a occurs when the metal element included in the first dielectric ceramic layer 20a migrates to the first internal electrode layer 21 and the second internal electrode layer 22 during firing of the first dielectric ceramic layer 20a.

In a case in which the first dielectric ceramic layer 20a includes $BaTiO_3$ as a main component, the second alloy portion 320 has a higher content of metal elements included in the second dielectric ceramic layer 20b, i.e. any one or more of the above metal group M in terms of molar ratio relative to 100 moles of Ti, than the first alloy portion 310.

Figure 13:
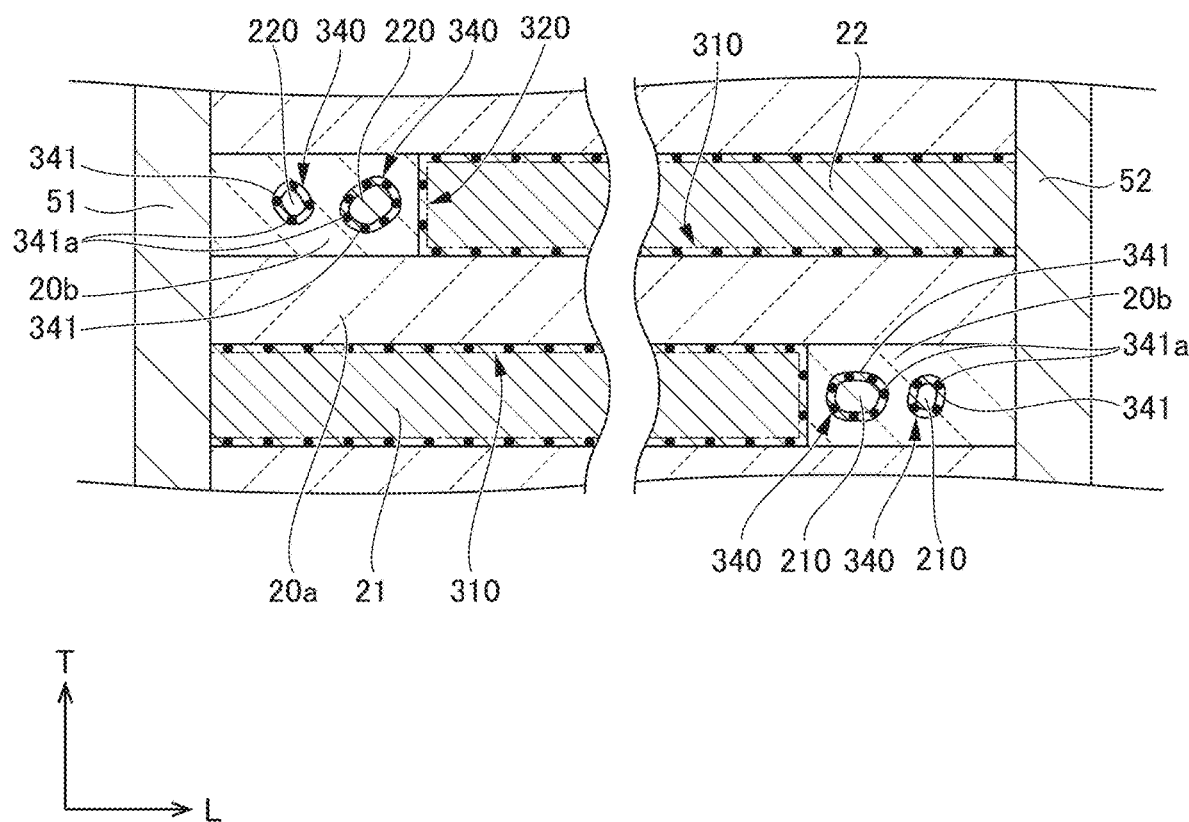
FIG. 13 shows a portion of an LT cross-section of a multilayer ceramic capacitor according to a preferred embodiment of the present invention, and is a diagram schematically showing a first interspersed internal electrode, a second interspersed internal electrode, and a fourth alloy portion.

FIG. 13 shows a plane of the multilayer body 10 including a central portion in the width (W) direction, and the length (L) direction and the stacking (T) direction. In the multilayer ceramic capacitor 1, in the plane shown in FIG. 13, the first internal electrode layer 21 includes a plurality of first interspersed internal electrodes 210 interspersed discontinuously in the length (L) direction at the end in the length (L) direction that is not connected to the second external electrode 52. Furthermore, the second internal electrode layer 22 includes a plurality of second interspersed internal electrodes 220 interspersed discontinuously in the length (L) direction at the end in the length (L) direction that is not connected to the first external electrode 51. Each of the first interspersed internal electrodes 210 and the second interspersed internal electrodes 220 is provided within the second dielectric ceramic layer 20b. The plurality of first interspersed internal electrodes 210 may be connected to the first internal electrode layer 21 while extending in the width (W) direction. Furthermore, the plurality of second interspersed internal electrodes 220 may also be connected to the second internal electrode layer 22 while extending in the width (W) direction.

A fourth alloy portion 340 is provided around each of the first interspersed internal electrode 210 and the second interspersed internal electrode 220. The fourth alloy portion 340 is defined by a segregation layer 341 which is a layer segregation by the metal element 341a. The metal element 341a includes a metal element provided in a greatest amount among the metal elements of the first internal electrode layer 21 and the second internal electrode layer 22, and one or more kinds of metal elements among the metal group M originating from the second dielectric ceramic layer 20b.

The segregation of the metal element 341a occurs when the metal element included in the second dielectric ceramic layer 20b migrates to the first interspersed internal electrode 210 and the second interspersed internal electrode 220 during firing of the second dielectric ceramic layer 20b. It should be noted that the segregation of the metal element 341a occurs around one or a plurality of the first interspersed internal electrodes 210 and one or a plurality of the second interspersed internal electrodes 220. Alternatively, the segregation of the metal element 341a may occur around the entire or substantially the entire periphery of the first interspersed internal electrode 210 and around the entire or substantially the entire periphery of the second interspersed internal electrode 220.

Figure 14:
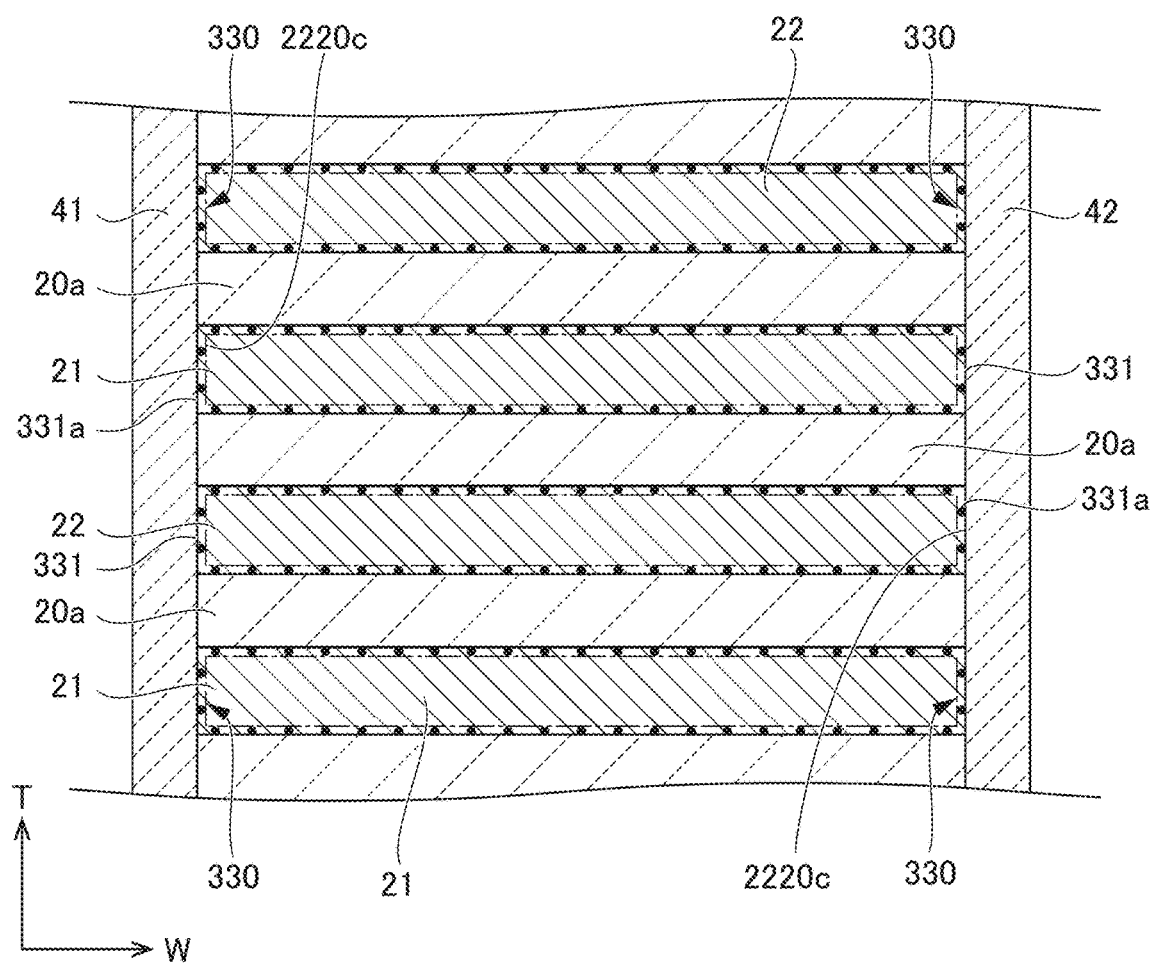
FIG. 14 shows a portion of a WT cross-section of a multilayer ceramic capacitor according to a preferred embodiment of the present invention, and is a diagram schematically showing a first alloy portion and a third alloy portion.

As shown in FIG. 14, in the multilayer ceramic capacitor 1, a third alloy portion 330 is provided between the third dielectric ceramic layers 41 and 42 and the first internal electrode layer 21, and between the third dielectric ceramic layers 41 and 42 and the second internal electrode layer 22, respectively.

As shown in FIG. 14, a metal element 331a is segregated at an interface 2220c between the first internal electrode layer 21 and the third dielectric ceramic layers 41 and 42. Furthermore, the metal element 331a is also segregated at the interface 2220c with the third dielectric ceramic layers 41 and 42 in the second internal electrode layer 22. The third alloy portion 330 provided by a layer segregation by the metal element 331a, i.e. a segregation layer 331. The third alloy portions 330 are provided on the surfaces of the first internal electrode layer 21 and the second internal electrode layer 22, closer to the third dielectric ceramic layer 41 and 42, respectively. The third alloy portions 330 are provided between the first internal electrode layer 21 and the third dielectric ceramic layers 41 and 42, and between the second internal electrode layer 22 and the third dielectric ceramic layers 41 and 42, respectively.

The metal element 331a includes a metal element provided in a greatest amount among the metal elements of the first internal electrode layer 21 and the second internal electrode layer 22, and one or more kinds of metal elements among the metal group M originating from the third dielectric ceramic layers 41 and 42. Examples of the elements originating from the third dielectric ceramic layers 41 and 42 include a metal element as an additive. More specifically, examples thereof include any one or more of metal elements among the above metal group M.

The segregation of the metal element 331a occurs when the metal element included in the third dielectric ceramic layers 41 and 42 migrates to the first internal electrode layer 21 and the second internal electrode layer 22 during firing of the third dielectric ceramic layers 41 and 42.

Figure 15:
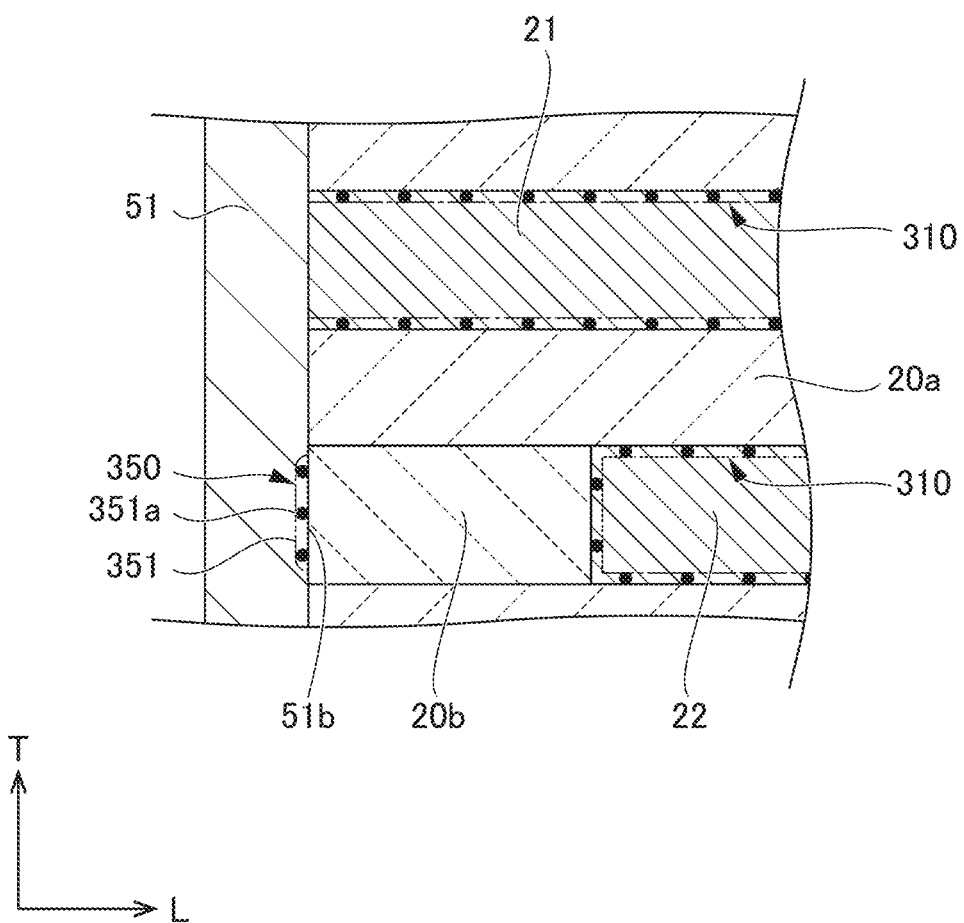
FIG. 15 is a partially enlarged view of FIG. 14, and schematically shows a fifth alloy portion.

In the multilayer ceramic capacitor 1, the first external electrode 51 and the second external electrode 52 each include a Ni layer as a foundation electrode layer, and, when formed by a cofiring method, as shown in FIG. 15, a fifth alloy portion 350 is formed in the Ni layer.

FIG. 15 shows a state in which the fifth alloy portion 350 is provided at an interface 51b with the second dielectric ceramic layer 20b in the first external electrode 51. The fifth alloy portion 350 is a segregation layer 351 which is a layer segregation by a metal element 351a. Similarly to this, the fifth alloy portion 350 due to the segregation of the metal element 351a is also provided at the interface 51b with the second dielectric ceramic layer 20b in the second external electrode 52. The segregation of the metal element 351a occurs when the metal element included in the second dielectric ceramic layer 20b migrates to the first external electrode 51 and the second external electrode 52 during firing of the second dielectric ceramic layer 20b.

Figure 16:
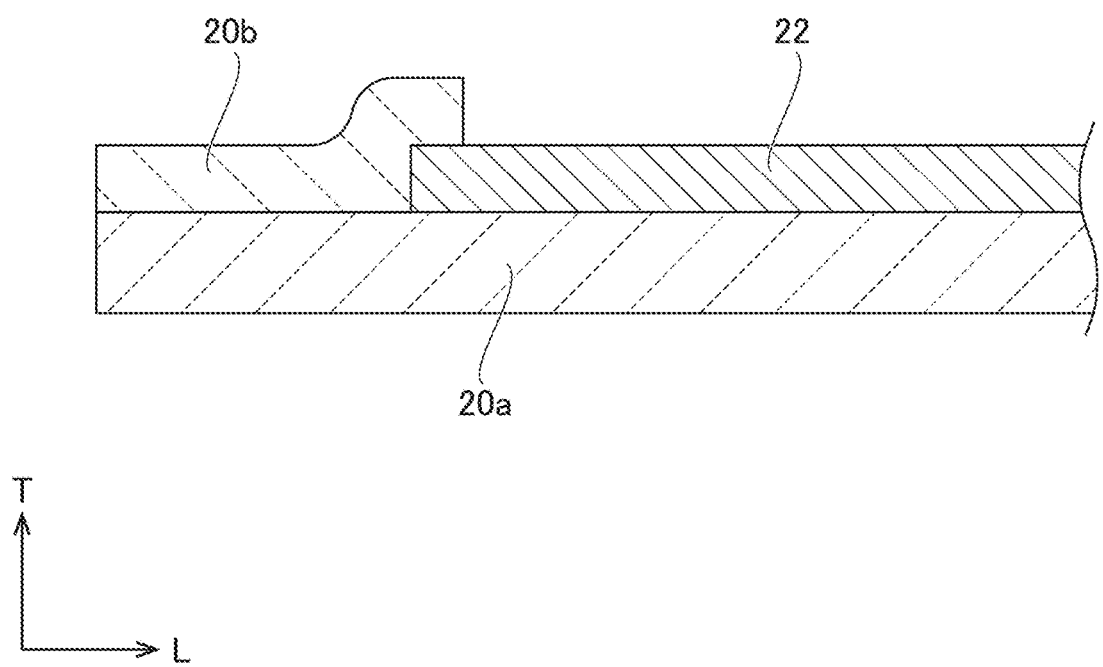
FIG. 16 shows a cross-sectional view schematically showing a mode in which an end of a second dielectric ceramic layer is superimposed on an end of an internal electrode layer in a multilayer ceramic capacitor according to a preferred embodiment of the present invention.
Figure 17:
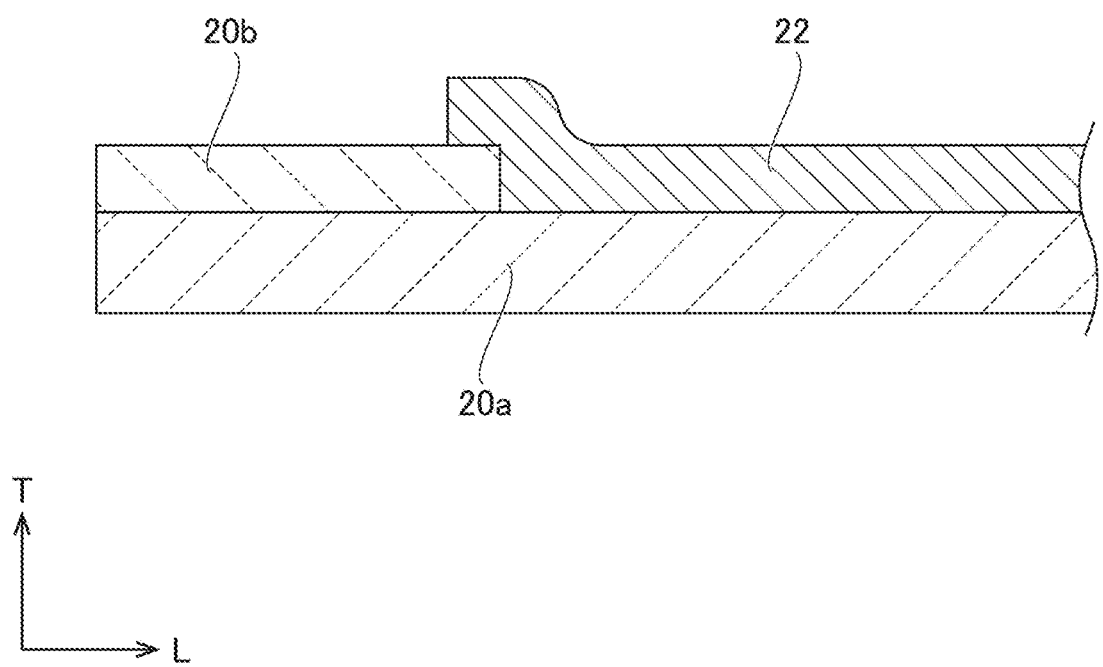
FIG. 17 shows a cross-sectional view schematically showing a mode in which the end of the second dielectric ceramic layer is superimposed on the end of the internal electrode layer in a multilayer ceramic capacitor according to a preferred embodiment of the present invention.

It should be noted that, in the multilayer body 10 of the multilayer ceramic capacitor 1 of the present preferred embodiment, the ends of the first internal electrode layer 21, the second internal electrode layer 22, and the second dielectric ceramic layer 20b which are adjacent to each other may overlap with each other. For example, as shown in FIG. 16, the end of the second dielectric ceramic layer 20b may be superimposed on the end of the second internal electrode layer 22. Furthermore, as shown in FIG. 17, the end of the second dielectric ceramic layer 20b may overlap the end of the first internal electrode layer 21. In such a configuration in which the ends overlap with each other, the first internal electrode layer 21 and the second internal electrode layer 22 may be superimposed on the second dielectric ceramic layer 20b.

In the multilayer ceramic capacitor 1 of the present preferred embodiment, the second alloy portion 320, which includes one metal element provided in a greatest amount among the metal elements of the internal electrode layer, and any one or more metal elements among the metal group M including Sn, In, Ga, Zn, Bi, Pb, Cu, Ag, Pd, Pt, Ph, Ir, Ru, Os, Fe, V, and Y, is provided between the second dielectric ceramic layer 20b and the first internal electrode layer 21, and between the second dielectric ceramic layer 20b and the second internal electrode layer 22, respectively.

The electric field is likely to be concentrated at the respective ends of the first internal electrode layer 21 and the second internal electrode layer 22 in contact with the second dielectric ceramic layer 20b. For this reason, there is a possibility of lowering the reliability of a multilayer ceramic capacitor. However, according to the multilayer ceramic capacitor 1 of the present preferred embodiment, the second alloy portion 320 is provided between the second dielectric ceramic layer 20b, and the first internal electrode layer 21 and the second internal electrode layer 22, such that it is possible to reduce or prevent the electric field concentration, thus improving the reliability.

In the multilayer ceramic capacitor 1 of the present preferred embodiment, in a case in which the first dielectric ceramic layer 20a includes Ba and Ti, the first alloy portion 310, which includes a metal element provided in a greatest amount among the metal elements of the internal electrode layer, and any one or more of metal elements among the above metal group M, is provided between the first dielectric ceramic layer 20a and the first internal electrode layer 21, and between the first dielectric ceramic layer 20a and the second internal electrode layer 22, respectively. The second alloy portion 320 has a higher content of the above metal group M in terms of molar ratio relative to 100 moles of Ti than the first alloy portion 310.

Thus, it is possible for the second alloy portion 320 to reduce or prevent the electric field concentration occurring at a portion in the vicinity of the interfaces with the second dielectric ceramic layer 20b in the first internal electrode layer 21 and the second internal electrode layer 22, thus improving the reliability. Furthermore, by increasing the content of the metal group M of the second alloy portion 320, which is provided at the ends of the first internal electrode layer 21 and the second internal electrode layer 22 in contact with the second dielectric ceramic layer 20b where electric field concentration is likely to occur, in terms of molar ratio relative to 100 moles of Ti, more than the first alloy portion 310 provided closer to the first dielectric ceramic layer 20a, it is possible to effectively reduce the electric field concentration on the second dielectric ceramic layer 20b side, thus further improving the reliability.

By the amount of metal of the metal group M added to each of the first dielectric ceramic layer 20a and the second dielectric ceramic layer 20b being controlled, the thickness of the first alloy portion 310 and the second alloy portion 320, and the concentration of the metal group M included therein can be controlled. For example, when the concentration of the metal group M added to the second dielectric ceramic layer 20b is higher than that of the first dielectric ceramic layer 20a, as shown in FIG. 12, the thickness of the second alloy portion 320 increases, or the concentration of the metal group M increases as it approaches the second dielectric ceramic layer 20b, or in some cases, the thickness of the second alloy portion 320 increases, and the concentration of the metal group M increases as it approaches the second dielectric ceramic layer 20b.

In the multilayer ceramic capacitor 1 of the present preferred embodiment, in the plane of the multilayer body 10 including the central portion in the width (W) direction, the length (L) direction, and the stacking (T) direction, the first internal electrode layer 21 includes the first interspersed internal electrodes 210 that are discontinuously interspersed in the length (L) direction at the end in the length (L) direction that is not connected to the second external electrode 52, the second internal electrode layer 22 includes the second interspersed internal electrodes 220 that are discontinuously interspersed in the length (L) direction at the end in the length (L) direction that is not connected to the first external electrode 51, and the fourth alloy portion 340, which includes a metal element provided in a greatest amount among the metal elements of the internal electrode layer, and any one or more of metal elements among the metal group M, is provided around each of the first interspersed internal electrodes 210 and the second interspersed internal electrodes 220.

When the first intersecting internal electrode 210 and the second intersecting internal electrode 220 are respectively connected to the first internal electrode layer 21 and the second internal electrode layer 22 while extending in the width (W) direction, if the electric field is concentrated in the connecting portion, breakdown may occur which reduces reliability. However, according to the multilayer ceramic capacitor 1 of the present preferred embodiment, it is possible for the fourth alloy portion 340 provided around each of the first interspersed internal electrodes 210 and the second interspersed internal electrodes 220 to reduce or prevent breakdown due to electric field concentration, such that it is possible to improve the reliability.

In the multilayer ceramic capacitor 1 of the present preferred embodiment, the third alloy portion 330, which includes a metal element provided in a greatest amount among the metal elements of the internal electrode layer, and any one or more of metal elements among the above metal group M, is provided between the third dielectric ceramic layer 41 and 42 and the first internal electrode layer 21, and between the third dielectric ceramic layer 41 and 42 and the second internal electrode layer 22, respectively.

Thus, the electric field concentration is reduced or prevented at the portion in the vicinity of the interfaces with the third dielectric ceramic layers 41 and 42 in the first internal electrode layer 21 and the second internal electrode layer 22 by the third alloy portion 330, thus making it possible to improve the reliability.

In the multilayer ceramic capacitor 1 of the present preferred embodiment, the first external electrode 51 and the second external electrode 52 include Ni, and the fifth alloy portion 350 in which any one or more of metal elements among the metal group M is segregated in Ni is provided between the second dielectric ceramic layer 20b, and the first external electrode 51 and the second external electrode 52.

Thus, even when the interval between the first internal electrode layer 21 and the second external electrode 52, and the interval between the second internal electrode layer 22 and the first external electrode 51, i.e. the distance of the second dielectric ceramic layer 20b in the length (L) direction is, for example, as narrow as less than about 15 μm, since the fifth alloy portion 350 is present, which causes breakdown due to electric field concentration to be less likely to occur between the internal electrode layer and the external electrode, reliability is improved.

Test Example 1

Next, Test Example 1 will be described which verifies the advantageous effects of the first alloy portion 310, the second alloy portion 320, and the third alloy portion 330 in the multilayer ceramic capacitor 1 of the present preferred embodiment.

Regarding TEM Analysis

Figure 18:
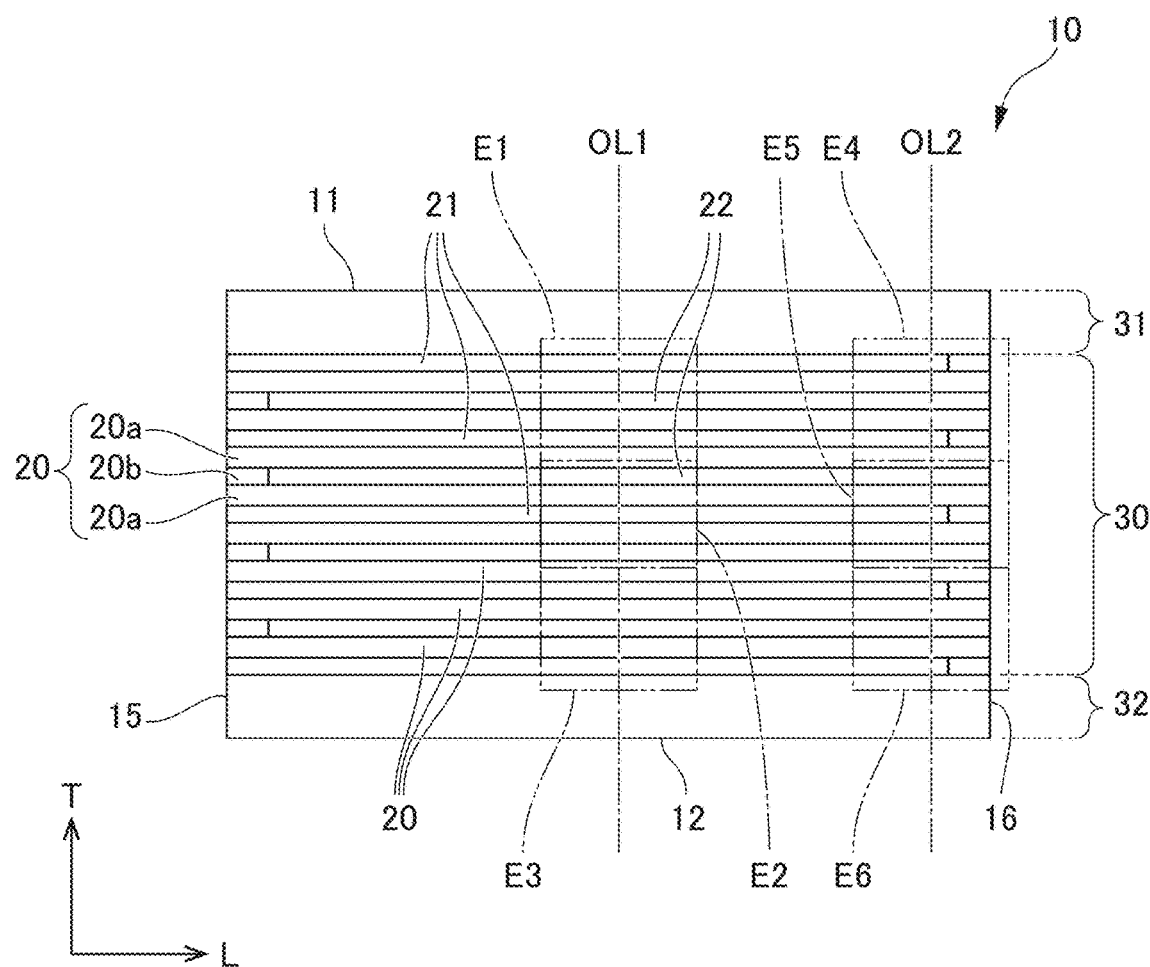
FIG. 18 is a diagram for explaining a TEM analysis method for analyzing the amount of a metal element included in the internal electrode layer of a multilayer ceramic capacitor according to a preferred embodiment of the present invention.

In the manufacturing method for the multilayer ceramic capacitor of the present preferred embodiment described above, the multilayer body 10 obtained by firing the green chip 110 without cofiring the first external electrode 51 and the second external electrode 52 is polished from the first side surface 13 side and the second side surface 14 side, to obtain a polished body leaving the central portion in the width (W) direction as a test body, as shown in FIG. 18. The type and the amount of metal (metal concentration) of the metal elements included in the first alloy portion 310 were analyzed as follows. As shown in FIG. 18, in the central portion of the length (L) direction, an imaginary line OL1 orthogonal or substantially orthogonal to the length (L) direction was assumed. Furthermore, the region in which the first dielectric ceramic layer 20a in relation to the acquisition of the capacitance of the polished body, and the first internal electrode layer 21 and the second internal electrode layer 22 are stacked is equally divided into three regions along the imaginary line OL1 in the stacking direction. The three regions include an upper region E1, a center region E2, and a lower region E3. The upper region E1, the center region E2, and the lower region E3 are cut out from the polished body, and each of the upper region E1, the center region E2, and the lower region E3 is thinned by Ar ion milling or the like, for example, to obtain three thin film samples from each region.

The three thin film samples of the upper region E1, the center region E2, and the lower region E3 of the test body obtained as described above were subjected to TEM observation and elemental mapping by EDX attached to the TEM. As a result, since there was no significant difference between the upper region E1 and the lower region E3, and the center region E2, the result obtained from the center region E2 is regarded as the microstructure including the dielectric ceramic layer and the internal electrode layer. As a result, the type and the amount of metal (metal concentration) of the metal elements included in the first alloy portion 310 are known. In addition, the type and the amount of metal (metal concentration) of the metal elements included in the second alloy portion 320 can be analyzed by obtaining a thin film sample in the same or substantially the same manner as described above in the region of one end in the length (L) direction in which the second alloy portion 320 exists. That is, in the polished body shown in FIG. 18, an imaginary line OL2 orthogonal or substantially orthogonal to the length (L) direction is assumed at one end in the length (L) direction, to obtain thin film samples of three regions including an upper region E4, a center region E5, and a lower region E6 which are provided by dividing into three equal portions along the imaginary line OL2 in the stacking direction. Furthermore, the three thin film samples of the upper region E4, the center region E5, and the lower region E6 were subjected to TEM observation and element mapping by EDX attached to TEM, to examine the type and the amount of metal (metal concentration) included in the second alloy portion 320.

For the second alloy portion and the first alloy portion, the concentration of Sn was examined by analysis with EDX mapping image by a TEM observation image. The TEM measurement points were measured at intervals of about 5 nm to about 10 nm. At the interface between the internal electrode layer and the dielectric ceramic layer, the region obtained three times or more of the observed values than the other measurement points is regarded as the alloy portion, and the average value is regarded as the metal concentration of the alloy portion.

Eighteen multilayer ceramic capacitors were prepared for each of Test Examples 1-1 to 1-5 shown in Table 1. In Test Example 1-2, in the multilayer ceramic capacitor of the present preferred embodiment, the first internal electrode layer 21 and the second internal electrode layer 22 were made of Ni, and the same amount of Sn as an additive was added to the first dielectric ceramic layer 20a and the second dielectric ceramic layer 20b. In Test Examples 1-3 to 1-5, the amount of Sn added to the second dielectric ceramic layer 20b was gradually larger than that in Test Example 1-2. Furthermore, in Test Example 1-1, multilayer ceramic capacitors of the same conditions as those in Test Examples 1-2 to 1-5 were used, except that no Sn was added to the second dielectric ceramic layer 20b.

For the multilayer ceramic capacitors of Test Examples 1-1 to 1-5, the determination was made by measuring the resistance value (kΩ) in a state in which a voltage of about 6.3 V was applied in an environment with a room temperature of about 150° C., to examine MTTF (mean failure time). MTTF was determined when the resistance value became about 10 kΩ or less, and if MTTF was about 15.3 hours (hr) or less, it was evaluated as fail, if MTTF was up to about 30 hours beyond about 15.3 hours (hr), it is evaluated as good, and if MTTF was beyond about 30 hours, it was evaluated as excellent. The results are listed in Table 1. It should be noted that, when the coverage of the internal electrode layer is less than about 80%, since the capacitance is difficult to be measured, it was evaluated as unmeasurable.

TABLE 1

|  | Sn CONCENTRATION OF FIRST ALLOY PORTION (at %) | Sn CONCENTRATION OF SECOND ALLOY PORTION (at %) | MTTF (hr) | EVALUATION |
| --- | --- | --- | --- | --- |
| TEST EXAMPLE 1-1 | 1 | 0 | 15.3 | FAIL |
| TEST EXAMPLE 1-2 | 1 | 1 | 21 | GOOD |
| TEST EXAMPLE 1-3 | 1 | 1.1 | 21 | GOOD |
| TEST EXAMPLE 1-4 | 1 | 1.3 | 23 | GOOD |
| TEST EXAMPLE 1-5 | 1 | 1.4 | 35 | EXCELLENT |

According to Table 1, it is confirmed that, since the second alloy portion was provided, MTTF was beyond the prescribed time of about 15.3 hours, and thus it was evaluated as good, and it is further found that MTTF was better as the Sn concentration was higher. On the other hand, in Test Example 1-1 in which the second alloy portion including Sn was not provided, MTTF could not exceed the prescribed time. Thus, it was confirmed that the second alloy portion improved the reliability of the multilayer ceramic capacitor.

Next, eighteen multilayer ceramic capacitors were prepared for Test Examples 1-6 to 1-9 shown in Table 2, in addition to Test Example 1-1. In Test Example 1-6, Sn as an additive was further added to the third dielectric ceramic layer in the same amount as that added to the first dielectric ceramic layer and the second dielectric ceramic layer in Test Example 1-2. In Test Examples 1-7 to 1-9, the amount of Sn added to the third dielectric ceramic layer was gradually larger than that in Test Examples 1-6. In Test Example 1-1, Sn was not added to the third dielectric ceramic layer.

For Test Examples 1-1 and 1-6 to 1-9, MTTF was determined in the same manner as in Test Examples 1-1 to 1-5. The results are shown in Table 2.

TABLE 2

| | Sn CONCENTRATION OF FIRST ALLOY PORTION (at %) | Sn CONCENTRATION OF SECOND ALLOY PORTION (at %) | Sn CONCENTRATION OF THIRD ALLOY PORTION (at %) | MTTF (hr) | EVALUATION |
|---|---|---|---|---|---|
| TEST EXAMPLE 1-1 | 1 | 0 | 0 | 15.3 | FAIL |
| TEST EXAMPLE 1-6 | 1 | 1 | 1 | 22 | GOOD |
| TEST EXAMPLE 1-7 | 1 | 1.1 | 1.2 | 25 | GOOD |
| TEST EXAMPLE 1-8 | 1 | 1.3 | 1.3 | 27 | GOOD |
| TEST EXAMPLE-1-9 | 1 | 1.4 | 1.4 | 41 | EXCELLENT |

According to Table 2, it is confirmed that, since the third alloy portion together with the second alloy portion was provided, MTTF is beyond the prescribed time of about 15.3 hours, and thus it was evaluated as good, and it is further found that MTTF was better as the Sn concentration was higher. On the other hand, in Test Example 1-1 in which the second alloy portion and the third alloy portion including Sn were not provided, MTTF could not exceed the prescribed time. Thus, it was confirmed that the second alloy portion and the third alloy portion improved the reliability of the multilayer ceramic capacitor.

Figure 19:
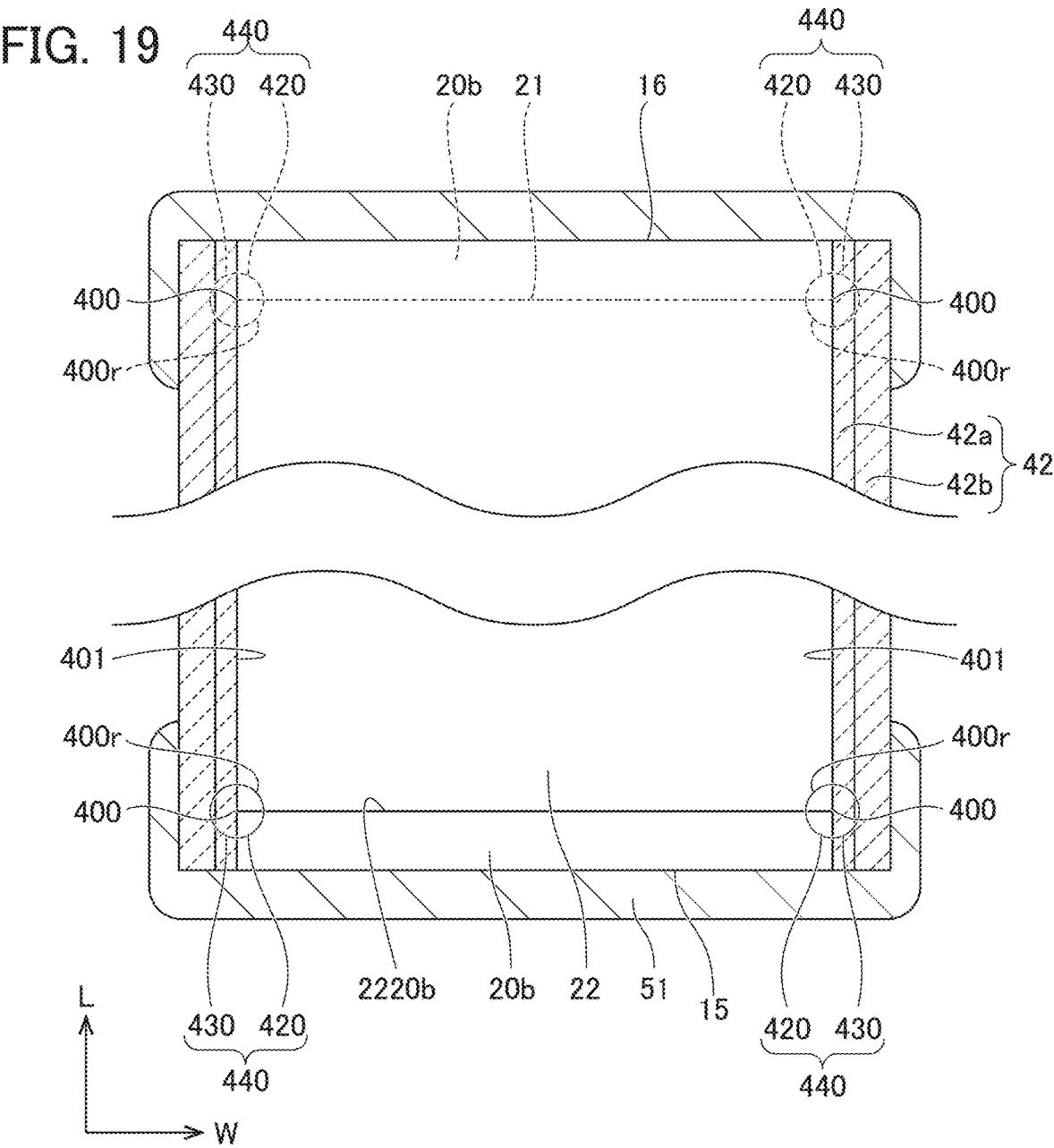
FIG. 19 is a partial view of FIG. 5, and shows a near intersection region according to a preferred embodiment of the present invention.

(2) Average Particle Size of the Dielectric Particles Included Near Intersection Region FIG. 19 shows a plane including the length (L) direction and the width (W) direction of the multilayer ceramic capacitor 1 of the present preferred embodiment, and a plane including the second dielectric ceramic layer 20b and the second internal electrode layer 22. As shown in FIG. 19, both sides of the end closer to the first end surface 15 in the multilayer ceramic capacitor 1 in the width (W) direction each include an intersection 400 of the interface surrounded by the second dielectric ceramic layer 20b, the second internal electrode layer 22, and the third dielectric ceramic layers 41 and 42. This intersection 400 is an intersection of the interface 2220b between the second dielectric ceramic layer 20b and the second internal electrode layer 22, and an inner surface 401 in the width (W) direction in the third dielectric ceramic layers 41 and 42. Furthermore, similarly to this, both sides closer to the second end surface 16 in the width (W) direction each include the intersection 400 of the interface surrounded by the second dielectric ceramic layer 20b, the first internal electrode layer 21, and the third dielectric ceramic layers 41 and 42.

An inner region of a circle 400r having a radius of about 5 μm, for example, around the intersection 400 is defined as a second near intersection region 420. An inner region of the circle 400r having a radius of about 5 μm around the intersection 400 is defined as a third near intersection region 430. The region inside the circle 400r also includes the line of the circle 400r. In the following description, the second near intersection region 420 close to the second dielectric ceramic layer 20b, and a third near intersection region 430 close to the third dielectric ceramic layers 41 and 42 may be collectively referred to as a near intersection region 440. The inner region of the second near intersection region 420 includes a portion of the second dielectric ceramic layer 20b.

The inner region of the third near intersection region 430 includes a portion of the third dielectric ceramic layers 41 and 42.

In the multilayer ceramic capacitor 1 of the present preferred embodiment, (A) the average particle size of the dielectric particles included in each near intersection region 440 is preferably smaller than the average particle size of the dielectric particles included in the first dielectric ceramic layer 20a, the dielectric particles included in the second dielectric ceramic layer 20b, and the dielectric particles included in the third dielectric ceramic layers 41 and 42.

In addition, in the multilayer ceramic capacitor 1 of the present preferred embodiment, (B) it is preferable for the ratio of the average particle size of the dielectric particles included in each near intersection region 440 smaller than the average particle size of the dielectric particles included therein to be about 5% or more smaller, for example.

It should be noted that the average particle size of the dielectric particles included in the second dielectric ceramic layer 20b in this case refers to an average particle size of the dielectric particles included in the second dielectric ceramic layer 20b in a portion other than the second near intersection region 420, and the average particle size of the dielectric particles included in the third dielectric ceramic layers 41 and 42 refers to an average particle size of the dielectric particles included in the third dielectric ceramic layers 41 and 42 in a portion other than the third near intersection region 430.

The multilayer ceramic capacitor 1 of the present preferred embodiment having the above configuration (A) or (B) preferably further has any of the following configurations of (C) to (I).

(C) The difference between the average particle size of the dielectric particles included in the second dielectric ceramic layer 20b and the average particle size of the dielectric particles included in the third dielectric ceramic layers 41 and 42 is within about 5%, for example; the average particle size of the dielectric particles included in the first dielectric ceramic layer 20a is larger than the average particle size of the dielectric particles included in the second dielectric ceramic layer 20b and the average particle size of the dielectric particles included in the third dielectric ceramic layers 41 and 42; and the average particle size of the dielectric particles included in the near intersection region 440 is smaller than the average particle size of the dielectric particles included in the second dielectric ceramic layer 20b and the average particle size of the dielectric particles included in the third dielectric ceramic layers 41 and 42.

(D) The difference between the average particle size of the dielectric particles included in the first dielectric ceramic layer 20*a* and the average particle size of the dielectric particles included in the second dielectric ceramic layer 20*b* is within about 5%, for example; the average particle size of the dielectric particles included in the third dielectric ceramic layer 41 and 42 is smaller than the average particle size of the dielectric particles included in the first dielectric ceramic layer 20*a* and the average particle size of the dielectric particles included in the second dielectric ceramic layer 20*b*; and the average particle size of the dielectric particles included in the near intersection region 440 is smaller than the average particle size of the dielectric particles included in the third dielectric ceramic layers 41 and 42.

(E) The difference between the average particle size of the dielectric particles included in the first dielectric ceramic layer 20*a* and the average particle size of the dielectric particles included in the third dielectric ceramic layer 41 and 42 is within about 5%, for example; the average particle size of the dielectric particles included in the second dielectric ceramic layer 20*b* smaller than the average particle size of the dielectric particles included in the first dielectric ceramic layer 20*a* and the average particle size of the dielectric particles included in the third dielectric ceramic layer 41 and 42; and the average particle size of the dielectric particles included in the near intersection region 440 is smaller than the average particle size of the dielectric particles included in the second dielectric ceramic layer 20*b*.

(F) The difference between the average particle size of the dielectric particles included in the first dielectric ceramic layer 20*a* and the average particle size of the dielectric particles included in the second dielectric ceramic layer 20*b* is within about 5%, for example; the difference between the average particle size of the dielectric particles included in the first dielectric ceramic layer 20*a* and the average particle size of the dielectric particles included in the third dielectric ceramic layers 41 and 42 is within about 5%, for example; and the difference between the average particle size of the dielectric particles included in the second dielectric ceramic layer 20*b* and the average particle size of the dielectric particles included in the third dielectric ceramic layers 41 and 42 is within about 5%, for example, and the average particle size of the dielectric particles included in the near intersection region 440 is smaller than the average particle size of the dielectric particles included in the first dielectric ceramic layer 20*a*, the average particle size of the dielectric particles included in the second dielectric ceramic layer 20*b*, and the average particle size of the dielectric particles included in the third dielectric ceramic layers 41 and 42.

(G) The average particle size of the dielectric particles included in the first dielectric ceramic layer 20*a* is smaller than the average particle size of the dielectric particles included in the second dielectric ceramic layer 20*b*; the average particle size of the dielectric particles included in the third dielectric ceramic layer 41 and 42 is smaller than the average particle size of the dielectric particles included in the first dielectric ceramic layer 20*a*; and the average particle size of the dielectric particles included in the near intersection region 440 is smaller than the average particle size of the dielectric particles included in the third dielectric ceramic layers 41 and 42.

(H) The average particle size of the dielectric particles included in the first dielectric ceramic layer 20*a* is smaller than the average particle size of the dielectric particles included in the third dielectric ceramic layer 41 and 42; the average particle size of the dielectric particles included in the second dielectric ceramic layer 20*b* is smaller than the average particle size of the dielectric particles included in the first dielectric ceramic layer 20*a*; and the average particle size of the dielectric particles included in the near intersection region 440 is smaller than the average particle size of the dielectric particles included in the second dielectric ceramic layer 20*b*.

(I) The average particle size of the dielectric particles included in the near intersection region 440 is smaller than the average particle size of the dielectric particles included in the first dielectric ceramic layer 20*a*; and the average particle size of the dielectric particles included in the third dielectric ceramic layers 41 and 42 or the average particle size of the dielectric particles included in the second dielectric ceramic layer 20*b* is smaller than the average particle size of the dielectric particles included in the near intersection region 440.

It is possible to control the average particle size of the dielectric particles included in the first dielectric ceramic layer 20*a*, the second dielectric ceramic layer 20*b*, and the third dielectric ceramic layer 41 and 42 by adjusting the amount of sintering aid such as Si, Mn, etc., for example, included in the dielectric ceramic slurry forming each dielectric ceramic layer, and further adjusting the firing temperature.

As described above, in the multilayer ceramic capacitor 1 of the present preferred embodiment, the average particle size of the dielectric particles included in the near intersection region 440 is smaller than the average particle size of the dielectric particles included in the first dielectric ceramic layer 20*a* and the dielectric particles included in the second dielectric ceramic layer 20*b* around the near intersection region 440, and the average particle size of the dielectric particles included in the third dielectric ceramic layer 41 and 42.

The electric field is likely to be concentrated in the near intersection region 440, and the occurrence of the electric field concentration may degrade the reliability of a multilayer ceramic capacitor. However, in the multilayer ceramic capacitor 1 of the present preferred embodiment, the average particle size of the dielectric particles included in the near intersection region 440 is smaller than the average particle size of the dielectric particles included in each of the first dielectric ceramic layer 20*a*, the second dielectric ceramic layer 20*b*, and the third dielectric ceramic layers 41 and 42 therearound. Thus, since the average particle size is small, electric field concentration is reduced or prevented by the presence of many grain boundaries. As a result, it is possible to improve the reliability of a multilayer ceramic capacitor.

Test Example 2

Next, Test Example 2 will be described which verifies that it is superior in that the multilayer ceramic capacitor 1 of the present preferred embodiment having the average particle size of the dielectric particles included in the near intersection region 440 which is smaller than the average particle size of the dielectric particles included in each of the first dielectric ceramic layer 20*a* and the third dielectric ceramic layers 41 and 42 therearound.

The average particle sizes of the dielectric particles included in each of the first dielectric ceramic layer, the second dielectric ceramic layer, and the third dielectric ceramic layer are measured as follows.

Figure 20:
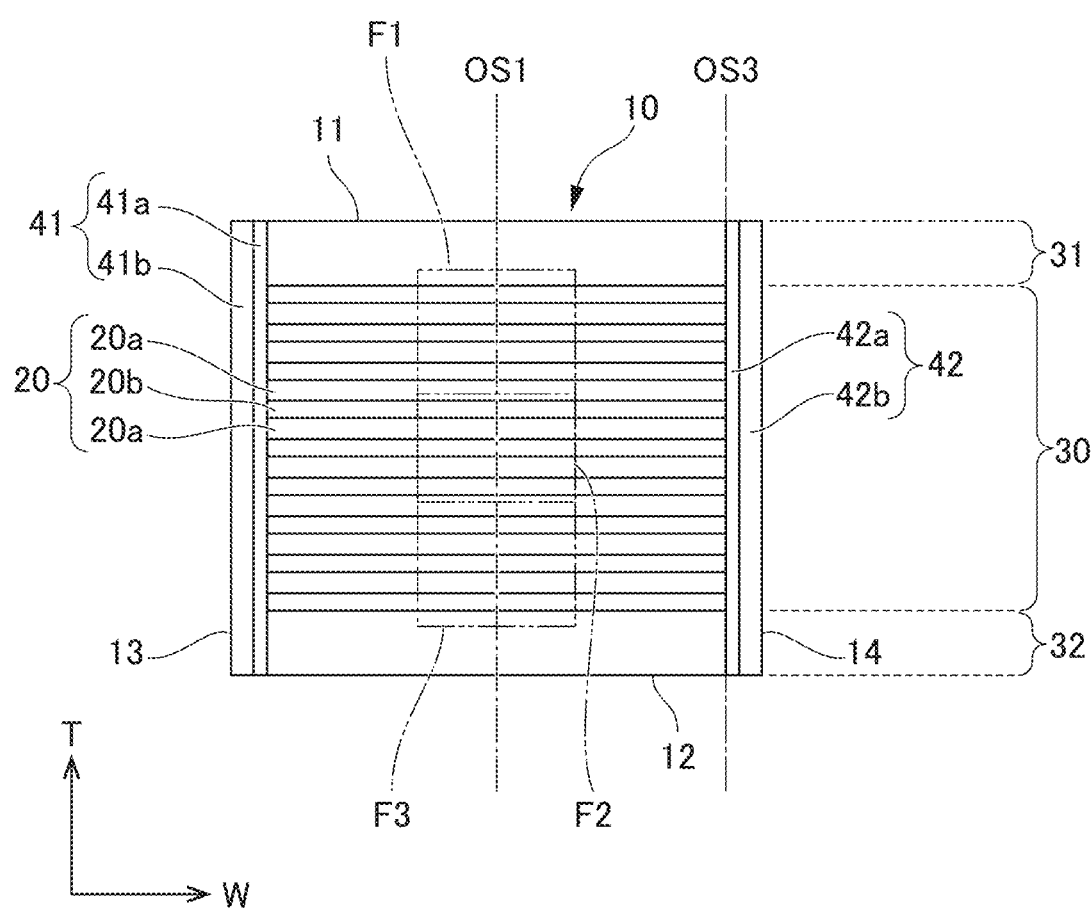
FIG. 20 is a diagram for explaining a method for measuring the average particle size of dielectric particles included in a first dielectric ceramic layer and a third dielectric ceramic layer.

Average Particle Size of the Dielectric Particles Included in the First Dielectric Ceramic Layer In the non-limiting example of a manufacturing method for the multilayer ceramic capacitor of the present preferred embodiment described above, the multilayer body 10 obtained by firing the green chip 110 without cofiring the first external electrode 51 and the second external electrode 52 is polished from the first end surface 15 side or the second end surface 16 side, to obtain a polished body leaving the central portion in the length (L) direction as a test body, as shown in FIG. 20. As shown in FIG. 20, in the central portion of the width (W) direction, an imaginary line OS1 orthogonal or substantially orthogonal to the width (W) direction was assumed. Furthermore, the region in which the first dielectric ceramic layer 20*a* in relation to the acquisition of the capacitance of the polished body, and the first internal electrode layer 21 and the second internal electrode layer 22 are stacked was equally divided into three regions along the imaginary line OS1 in the stacking direction. The three regions include an upper region F1, a center region F2, and a lower region F3. For each of the regions F1, F2, and F3, the first dielectric ceramic layer 20*a* was imaged with a field size of about 4.3 μm×about 3.2 μm, and for each of the regions F1, F2, and F3, the area was measured by image processing for 20 pieces of dielectric particles. Then, the equivalent circle diameter was calculated from the measured area and averaged to obtain the average particle size. The average particle size was measured in each of the upper region F1, the center region F2, and the lower region F3, and no significant difference was found in the measured values. Therefore, the average particle size of the center region F2 is regarded as the average particle size of the first dielectric ceramic layer.

Figure 21:
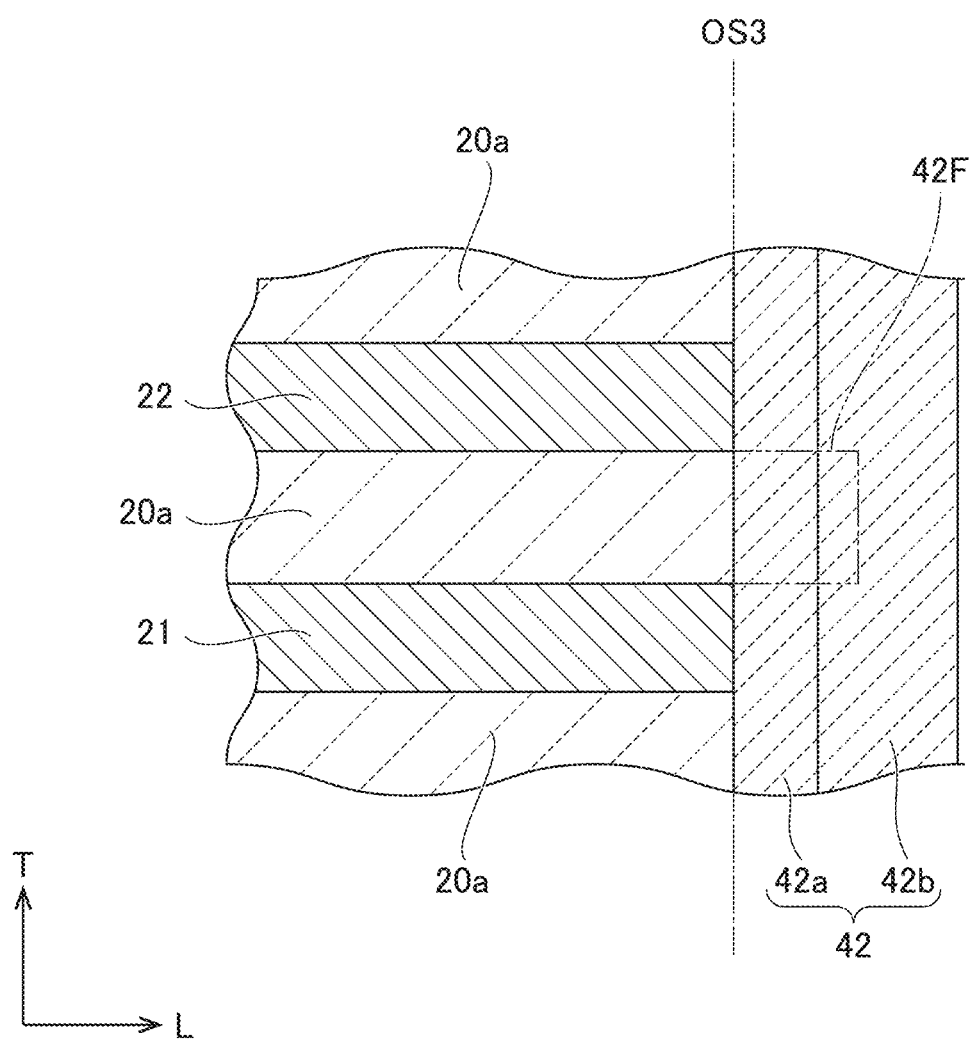
FIG. 21 is a diagram for explaining a method for measuring the average particle size of the dielectric particles included in the third dielectric ceramic layer.

Average Particle Size of the Dielectric Particles Included in the Third Dielectric Ceramic Layer In the test body shown in FIG. 20, an imaginary line is assumed which connects the ends of the plurality of first internal electrode layers 21 and the plurality of second internal electrode layers 22 closer to the first side surface 13 or the second side surface 14 in the stacking (T) direction. FIG. 20 shows an imaginary line OS3 which connects the ends of the plurality of first internal electrode layers 21 and the plurality of second internal electrode layers 22 close to the second side surface 14 in the stacking (T) direction. As shown in FIG. 21, the third dielectric ceramic layer 42 was imaged from the virtual line OS3 at a field size about 4.3 μm×about 3.2 μm in the range of about 5 μm on the third dielectric ceramic layer 42 side, and for each of the regions F1, F2, and F3, the area was measured by image processing for 20 pieces of dielectric particles. The reference numeral 42F in FIG. 21 indicates an imaging region. Then, the equivalent circle diameter was calculated from the measured area and averaged to obtain the average particle size. The average particle size was measured in each of the upper region F1, the center region F2, and the lower region F3, and no significant difference was found in the measured values. Therefore, the average particle size of the center region F2 is regarded as the average particle size of the third dielectric ceramic layer.

Figure 22:
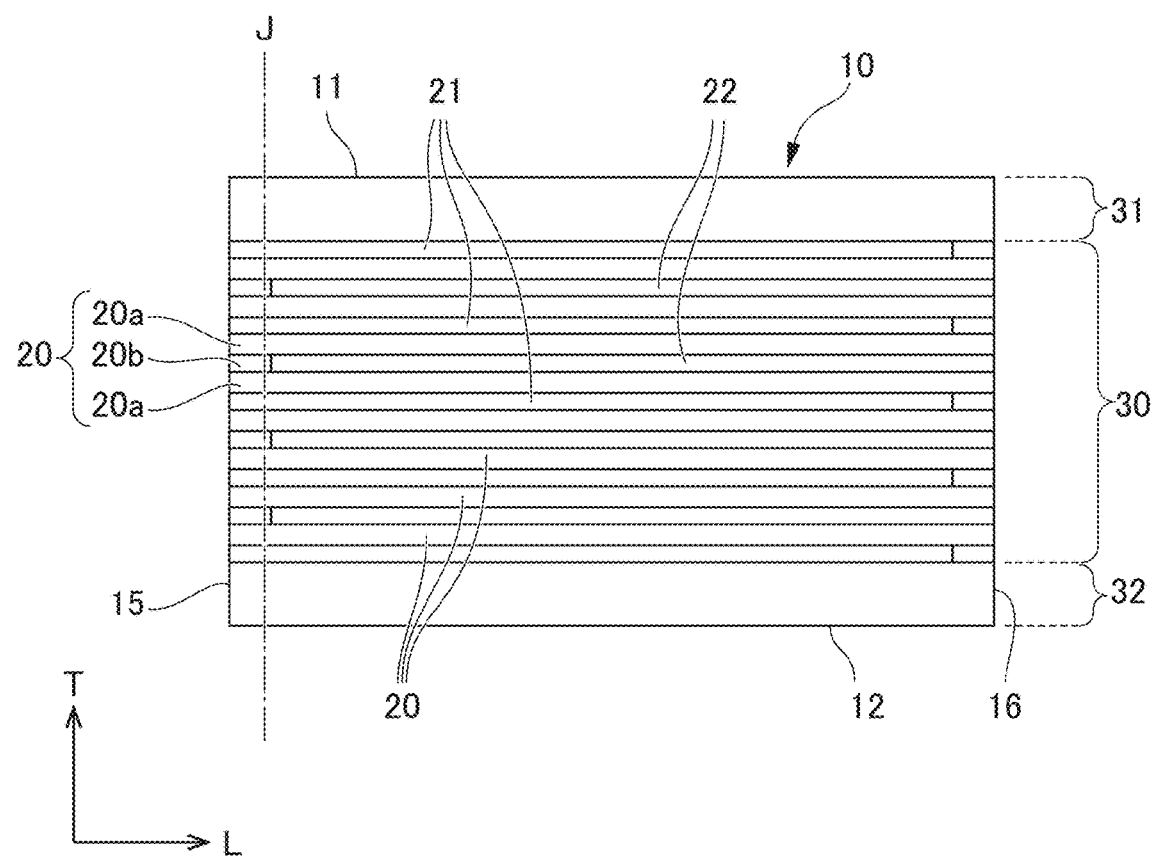
FIG. 22 is a diagram for explaining a first stage of a method for measuring the average particle size of the dielectric particles included in the second dielectric ceramic layer and the near intersection region.
Figure 23:
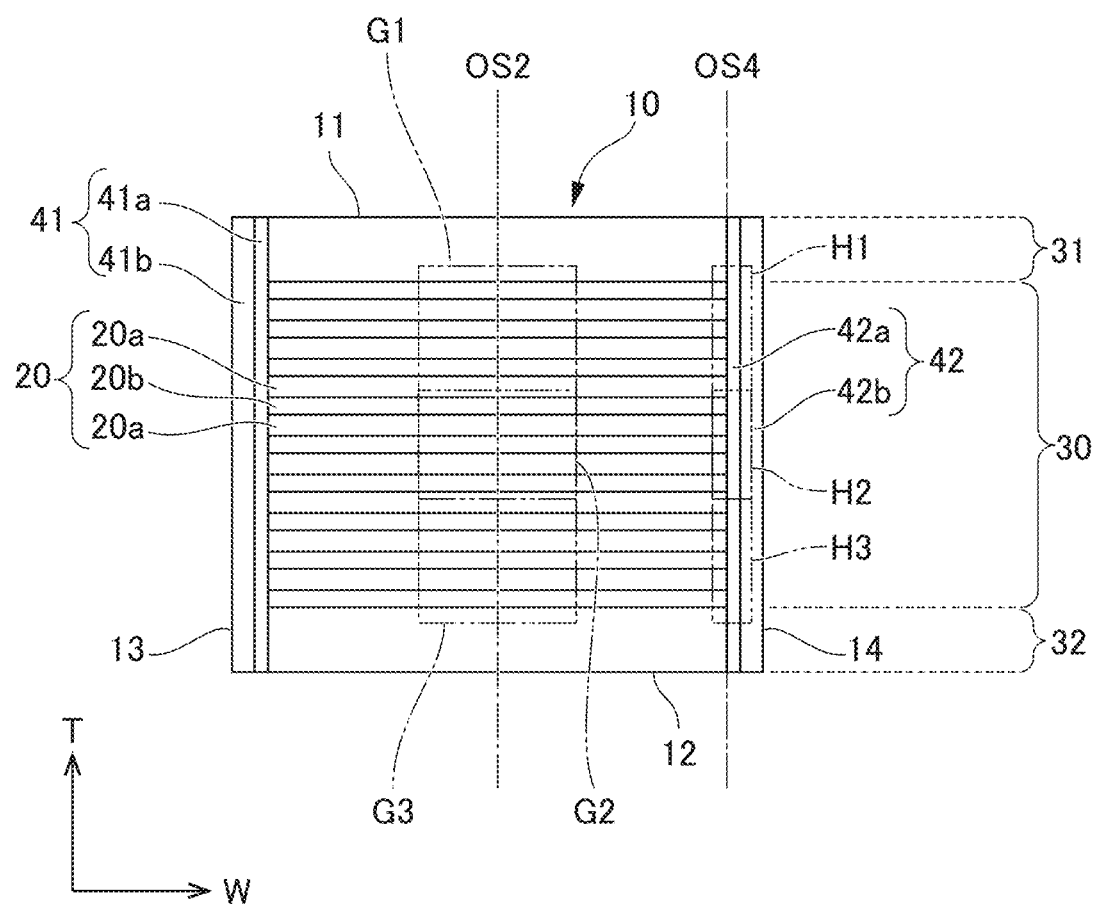
FIG. 23 is a diagram for explaining a second stage of a method for measuring the average particle size of the dielectric particles included in the second dielectric ceramic layer and the near intersection region.

Average Particle Size of the Dielectric Particles Included in the Second Dielectric Ceramic Layer The multilayer body 10 is polished from the first end surface 15 side or the second end surface 16 side, until just before at least one internal electrode layer is exposed. For example, as shown in FIG. 22, polishing is performed from the second end surface 16 side to a surface J immediately before the second internal electrode layer 22 appears. As shown in FIG. 23, in the central portion in the width (W) direction, an imaginary line OS2 perpendicular or substantially perpendicular to the width (W) direction was assumed. Then, along the imaginary line OS2, the second dielectric ceramic layer 20*b* was divided into three equal portions of an upper region G1, a center region G2, and a lower region G3 in the stacking direction. For each of the regions G1, G2, and G3, the second dielectric ceramic layer was imaged with a field size of about 4.3 μm×about 3.2 μm, and for each of the regions G1, G2 and G3, the area was measured by image processing for 20 pieces of dielectric particles. Then, the equivalent circle diameter was calculated from the measured area and averaged to obtain the average particle size. The average particle size was measured in each of the upper region G1, the center region G2, and the lower region G3, and no significant difference was found in the measured values. Therefore, the average particle size of the center region G2 is regarded as the average particle size of the second dielectric ceramic layer.

Figure 24:
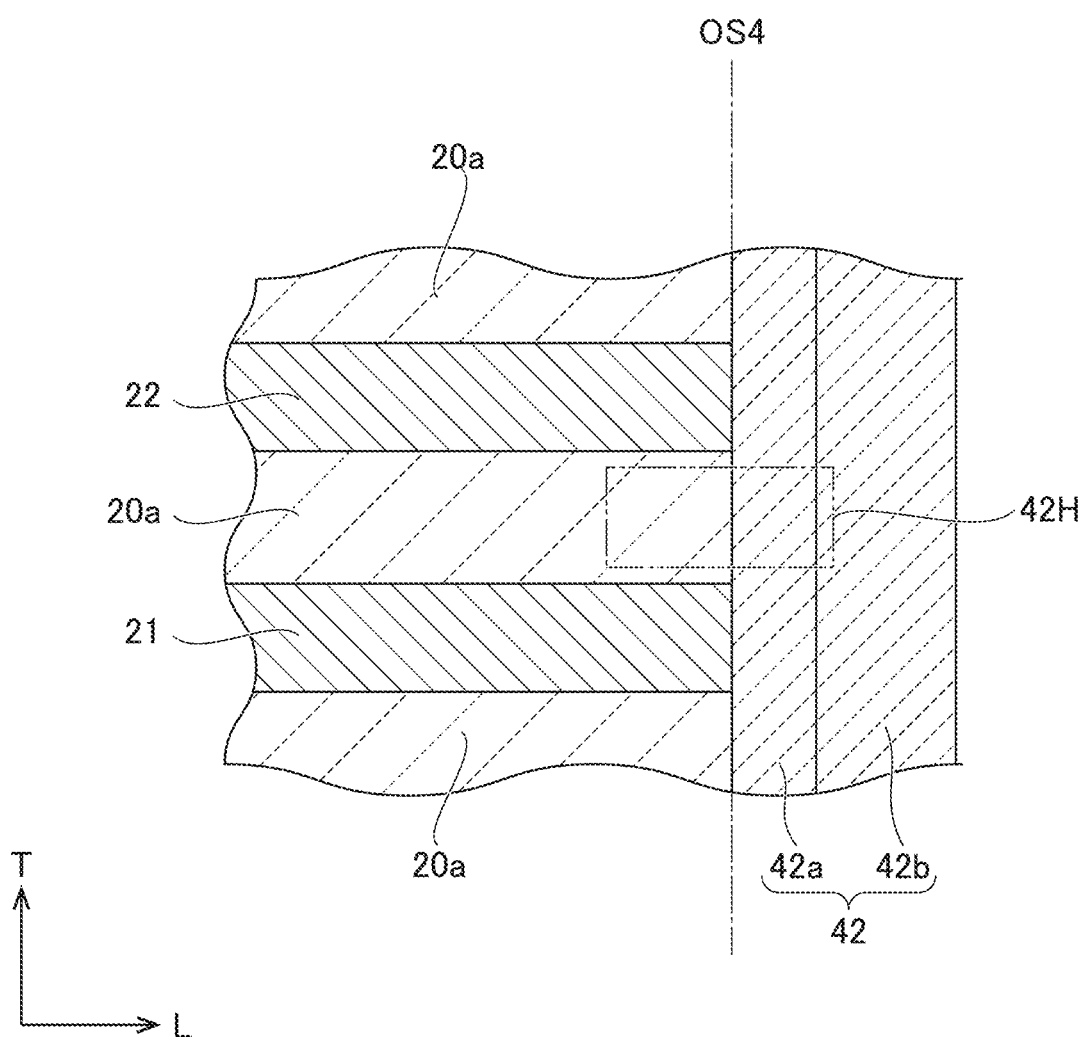
FIG. 24 is a diagram for explaining a method for measuring the average particle size of the dielectric particles included in the near intersection region.

Average Particle Size of Dielectric Particles Included in the Near Intersection Region In the test body shown in FIG. 23, an imaginary line OS4 is assumed which connects the ends of the plurality of first internal electrode layers 21 and the plurality of second internal electrode layers 22 closer to the second side surface 14 in the stacking (T) direction. Then, along the imaginary line OS4, the region on both sides in the width (W) direction of the imaginary line OS4 including the near intersection region 440 was divided into three equal regions in the stacking direction. The three equal region includes an upper region H1, a center region H2, and a lower region H3. As shown in FIG. 24, the second dielectric ceramic layer 20*b* and the third dielectric ceramic layer 42 were imaged in a field size of about 4.3 μm×about 3.2 μm in the range of 5 μm in the width (W) direction on both sides of the virtual line OS4, and for each of the regions F1, F2, and F3, the area was measured by image processing for 20 pieces of dielectric particles. Reference numeral 42H in FIG. 24 indicates an imaging region. Then, the equivalent circle diameter was calculated from the measured area and averaged to obtain the average particle size. The average particle size was measured in each of the upper region H1, the center region H2, and the lower region H3, and no significant difference was found in the measured values. Therefore, the average particle size of the center region H2 is regarded as the average particle size of the near intersection region 440.

Test Examples 2-1 to 2-24 shown in Table 3 were prepared as the multilayer ceramic capacitors corresponding to (C) to (I) described above. Furthermore, for Test Examples 2-25 to 2-27, the average particle size of the dielectric particles included in the near intersection region 440 was larger than the average particle size of the dielectric particles included in the first dielectric ceramic layer 20*a*, the average particle size of the dielectric particles included in the second dielectric ceramic layer 20*b*, and the average particle size of the dielectric particles included in the third dielectric ceramic layers 41 and 42. The average particle sizes of Test Examples 2-1 to 2-27 were examined by the measurement method described above.

In Table 3, "first" in the item of comparison of the average particle size refers to the average particle size of the dielectric particles included in the first dielectric ceramic layer; "second" refers to the average particle size of the dielectric particles included in the second dielectric ceramic layer; "third" refers to the average particle size of the dielectric particles included in the third dielectric ceramic layer; and "intersection" refers to the average particle size of the dielectric particles included in the near intersection region.

On the other hand, for the multilayer ceramic capacitors of the Test Examples 2-25 to 2-27, the determination was performed by measuring the resistance value (kΩ) in a state in which voltage of about 6.3 V was applied in an environment with a room temperature of about 150° C., to examine MTTF (mean failure time). MTTF was determined when the resistance value became about 10 kΩ or less, and if MTTF was about 15.3 hours (hr) or less, it was evaluated as fail, if MTTF was up to about 30 hours beyond about 15.3 hours (hr), it is evaluated as good, and if MTTF was beyond about 30 hours, it was evaluated as excellent. The results are listed in Table 3. It should be noted that, when the coverage of the internal electrode layer is less than about 80%, since the capacitance is difficult to be measured, it was evaluated as unmeasurable.

TABLE 3

| OMPARISON OF AVERAGE PARTICLE DIAMETER | TEST EXAMPLE | AVERAGE PARTICLE SIZE OF FIRST DIELECTRIC CERAMIC LAYER (μm) | AVERAGE PARTICLE SIZE OF SECOND DIELECTRIC CERAMIC LAYER (μm) | AVERAGE PARTICLE SIZE OF THIRD DIELECTRIC CERAMIC LAYER (μm) | INTER SECTION | MTTF (hr) | EVALUATION |
|---|---|---|---|---|---|---|---|
| (C) FIRST > SECOND = THIRD > INTERSECTION | TEST EXAMPLE2-1 | 0.42 | 0.32 | 0.33 | 0.15 | 32.1 | EXCELLENT |
| (C) FIRST > SECOND = THIRD > INTERSECTION | TEST EXAMPLE2-2 | 0.65 | 0.33 | 0.32 | 0.13 | 33.9 | EXCELLENT |
| (C) FIRST > SECOND = THIRD > INTERSECTION | TEST EXAMPLE2-3 | 0.71 | 0.31 | 0.33 | 0.14 | 33.1 | EXCELLENT |
| (D) FIRST = SECOND > THIRD > INTERSECTION | TEST EXAMPLE2-4 | 0.42 | 0.41 | 0.32 | 0.12 | 34.1 | EXCELLENT |
| (D) FIRST = SECOND > THIRD > INTERSECTION | TEST EXAMPLE2-5 | 0.65 | 0.66 | 0.33 | 0.11 | 35.2 | EXCELLENT |
| (D) FIRST = SECOND > THIRD > INTERSECTION | TEST EXAMPLE2-6 | 0.71 | 0.72 | 0.35 | 0.13 | 33.8 | EXCELLENT |
| (E) FIRST = THIRD > SECOND > INTERSECTION | TEST EXAMPLE2-7 | 0.42 | 0.32 | 0.41 | 0.15 | 32.1 | EXCELLENT |
| (E) FIRST = THIRD > SECOND > INTERSECTION | TEST EXAMPLE2-8 | 0.65 | 0.33 | 0.66 | 0.11 | 35.1 | EXCELLENT |
| (E) FIRST = THIRD > SECOND > INTERSECTION | TEST EXAMPLE2-9 | 0.71 | 0.35 | 0.72 | 0.14 | 33.1 | EXCELLENT |
| (F) FIRST = SECOND = THIRD > INTERSECTION | TEST EXAMPLE2-10 | 0.42 | 0.43 | 0.42 | 0.11 | 35.6 | EXCELLENT |
| (F) FIRST = SECOND = THIRD > INTERSECTION | TEST EXAMPLE2-11 | 0.65 | 0.66 | 0.64 | 0.13 | 22.9 | EXCELLENT |
| (F) FIRST = SECOND = THIRD > INTERSECTION | TEST EXAMPLE2-13 | 0.71 | 0.72 | 0.71 | 0.12 | 34.0 | EXCELLENT |
| (G) SECOND > FIRST > THIRD > INTERSECTION | TEST EXAMPLE2-13 | 0.42 | 0.51 | 0.35 | 0.15 | 32.1 | EXCELLENT |
| (G) SECOND > FIRST > THIRD > INTERSECTION | TEST EXAMPLE2-14 | 0.65 | 0.73 | 0.57 | 0.16 | 31.6 | EXCELLENT |
| (G) SECOND > FIRST > THIRD > INTERSECTION | TEST EXAMPLE2-15 | 0.71 | 0.85 | 0.66 | 0.13 | 33.7 | EXCELLENT |
| (E) THIRD = FIRST > SECOND > INTERSECTION | TEST EXAMPLE2-16 | 0.42 | 0.32 | 0.43 | 0.14 | 33.1 | EXCELLENT |
| (E) THIRD = FIRST > SECOND > INTERSECTION | TEST EXAMPLE2-17 | 0.65 | 0.56 | 0.66 | 0.12 | 34.2 | EXCELLENT |
| (E) THIRD = FIRST > SECOND > INTERSECTION | TEST EXAMPLE2-18 | 0.71 | 0.65 | 0.72 | 0.13 | 33.8 | EXCELLENT |
| (H) THIRD > FIRST > SECOND > INTERSECTION | TEST EXAMPLE2-19 | 0.52 | 0.42 | 0.33 | 0.16 | 31.6 | EXCELLENT |
| (H) THIRD > FIRST > SECOND > INTERSECTION | TEST EXAMPLE2-20 | 0.72 | 0.66 | 0.62 | 0.12 | 34.3 | EXCELLENT |
| (H) THIRD > FIRST > SECOND > INTERSECTION | TEST EXAMPLE2-21 | 0.86 | 0.7 | 0.75 | 0.14 | 33.1 | EXCELLENT |
| (I) FIRST > INTERSECTION > SECOND or THIRD | TEST EXAMPLE2-22 | 0.41 | 0.31 | 0.25 | 0.24 | 27.6 | GOOD |
| (I) FIRST > INTERSECTION > SECOND or THIRD | TEST EXAMPLE2-23 | 0.65 | 0.45 | 0.32 | 0.33 | 14.6 | FAIL |
| (I) FIRST > INTERSECTION > SECOND or THIRD | TEST EXAMPLE2-24 | 0.73 | 0.55 | 0.44 | 0.43 | 13.1 | FAIL |
| INTERSECTION > THIRD = FIRST = SECOND | TEST EXAMPLE2-25 | 0.42 | 0.41 | 0.42 | 0.91 | 9.1 | FAIL |
| INTERSECTION > THIRD = FIRST = SECOND | TEST EXAMPLE 2-26 | 0.52 | 0.51 | 0.51 | 0.9 | 8.9 | FAIL |
| INTERSECTION > THIRD = FIRST = SECOND | TEST EXAMPLE 2-27 | 0.71 | 0.72 | 0.71 | 0.9 | 8.7 | FAIL |

According to Table 3, it is confirmed that, when the average particle size of the dielectric particles included in the near intersection region was smaller than the average particle size of the dielectric particles included in each of the first dielectric ceramic layer, the second dielectric ceramic layer, and the third dielectric ceramic layer, MTTF was increased, which improved the reliability of the multilayer ceramic capacitor.

(3) Method for Manufacturing with the Addition of a Step of Removing the Side Surface of the Multilayer Body In a non-limiting example of a method for manufacturing the multilayer ceramic capacitor 1 of the present preferred embodiment described above, in order to obtain the green chip 110 which is the unfired multilayer body 10, the method includes the steps of: printing the unfired first internal electrode layer 121 and second internal electrode layer 122 on the unfired first dielectric ceramic layer 120a; forming the unfired second dielectric ceramic layer 120b in a region other than the region of the first dielectric ceramic layer 120a where the first internal electrode layer 121 and the second internal electrode layer 122 are printed; stacking the plurality of first dielectric ceramic layer 120a to form the green chip 110; exposing, by cutting the mother block 104, the first internal electrode layer 121 and the second internal electrode layer 122, the first dielectric ceramic layer 120a, and the second dielectric ceramic layer 120b from the first side surface 113 and the second side surface 114 of the individual green chips 110; and bonding the unfired third dielectric ceramic layer (the side margin portions 41 and 42) to the first side surface 113 and the second side surface 114 of the individual green chips 110. Here, the green chip 110 is an example of a multilayer body. The first dielectric ceramic layer 120a is an example of a dielectric layer. The first internal electrode layer 121 and the second internal electrode layer 122 are examples of internal electrode patterns. The second dielectric ceramic layer 120b is an example of a dielectric pattern. The first side surface 113 and the second side surface 114 are examples of side surfaces. The side margin portions 41 and 42 which are the unfired third dielectric ceramic layer are examples of a dielectric gap layer.

In this manufacturing method, it is possible to add a step of removing a certain thickness of the first side surface 113 and the second side surface 114 after the step of exposing, by cutting the mother block 104, the first internal electrode layer 121 and the second internal electrode layer 122, the first dielectric ceramic layer 120a, and the second dielectric ceramic layer 120b from the first side surface 113 and the second side surface 114 of the green chips 110; and before the step of bonding the third dielectric ceramic layer to the first side surface 113 and the second side surface 114 of the green chips 110. Thus, the side surfaces of the first dielectric ceramic layer 120a, the second dielectric ceramic layer 120b, and the first internal electrode layer 121 and the second internal electrode layer 122 exposed on the first side surface 113 and the second side surface 114 are removed.

Figure 25:
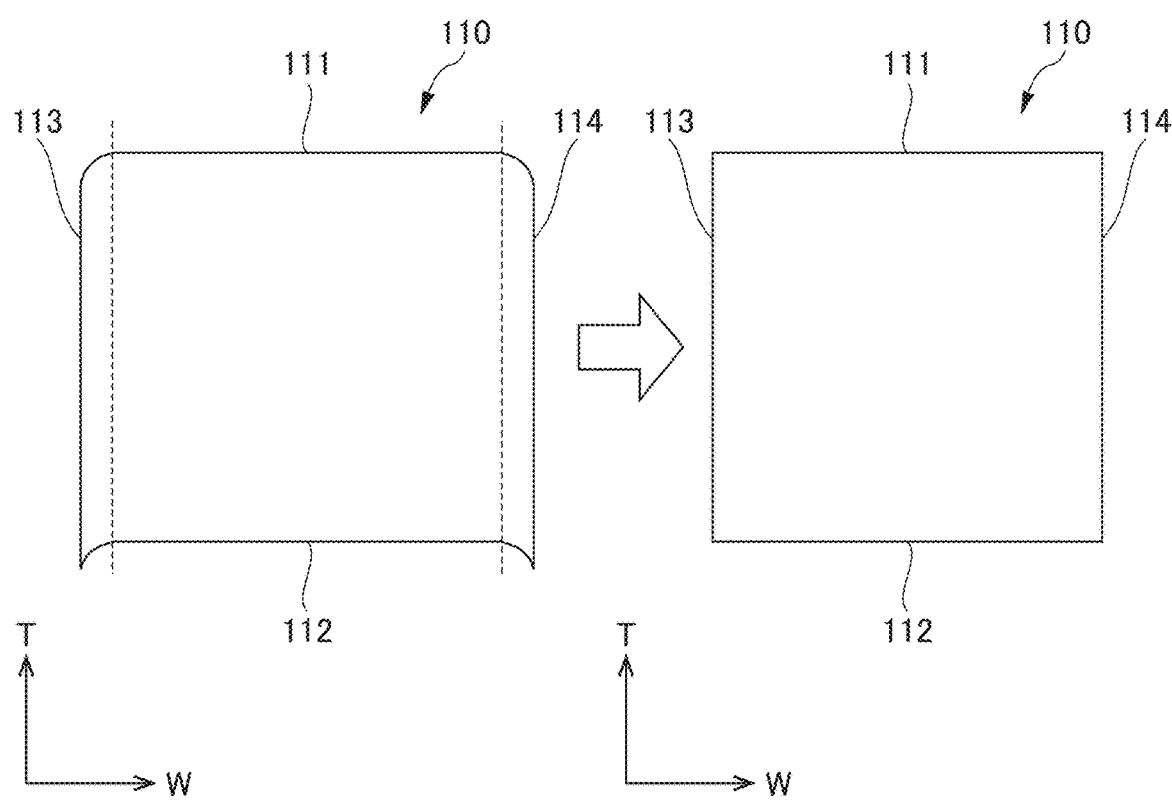
FIG. 25 is a diagram schematically showing a step of removing a side surface of an unfired multilayer body in a method for manufacturing a multilayer ceramic capacitor according to a preferred embodiment of the present invention.

FIG. 25 shows a state in which the first side surface 113 and the second side surface 114 of the green chip 110 are flattened by removing a certain thickness (for example, about 1 µm or less) therefrom. In FIG. 25, the diagram on the left side shows before the step of removing, and the diagram on the right side shows after the step of removing. When obtaining the plurality of green chips 110 by cutting the mother block 104, the side surfaces of the first side surface 113 and second side surface 114 of the green chip 110 may be slightly bent downward, and thus, plastically deformed due to the stress applied to the lower side in the drawing which is a cutting direction, as shown in FIG. 25. In addition, the cut surface may not be sufficiently smooth, or foreign matter may exist in the cut surface. For this reason, the thickness to the extent that the deformed portion is eliminated is removed. Although the method for removing the first side surface 113 and the second side surface 114 is not limited, for example, polishing by an appropriate polishing method, for example, is preferably used.

Figure 26:
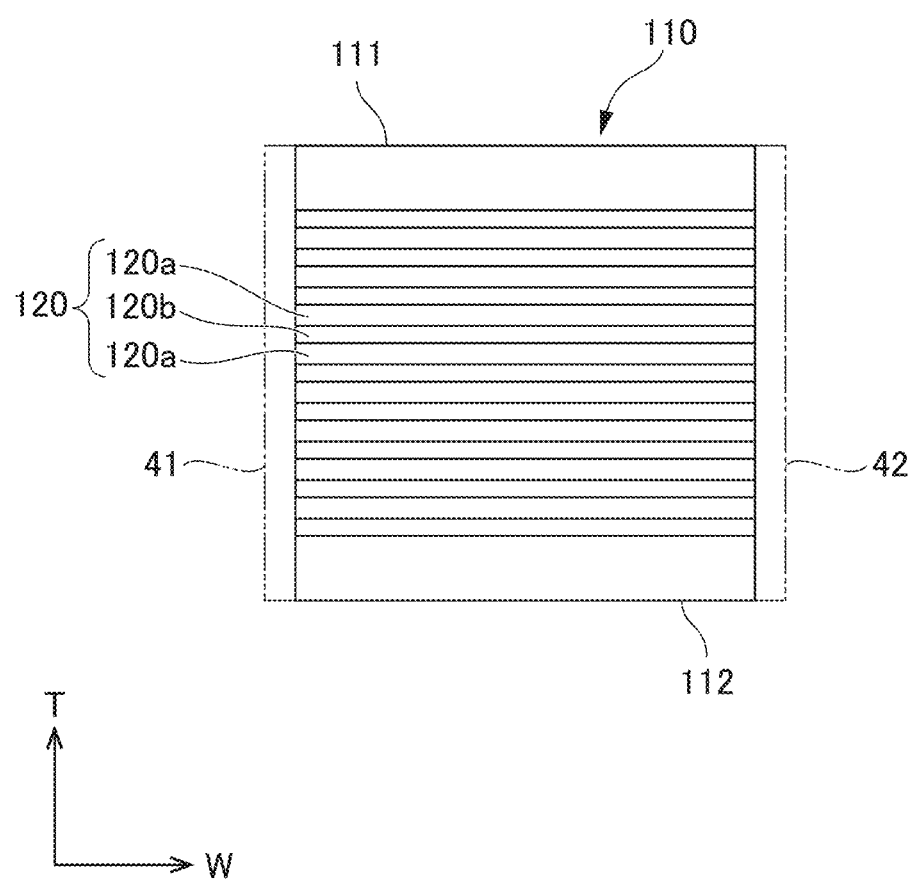
FIG. 26 is a diagram showing an end surface of an unfired multilayer body in which a side surface is removed in a method for manufacturing a multilayer ceramic capacitor according to a preferred embodiment of the present invention.

As shown in FIG. 26, the first side surface 113 and second side surface 114 after the step of removing are formed to be smooth surfaces from which foreign matter is removed. The third dielectric ceramic layer (the side margin portions 41 and 42) is bonded to the first side surface 113 and the second side surface 114 after the step of removing.

In preferred embodiments of the present invention, each of the second dielectric ceramic layer 20b, and the first internal electrode layer 21 and the second internal electrode layer 22 may include a resin. The resin can be included in the material by being added at the time of manufacturing. That is, the resin is included in the dielectric paste in the second dielectric ceramic layer 20b, and the resin is included in the conductive paste in the first internal electrode layer 21 and the second internal electrode layer 22.

The resin included in the dielectric paste and the conductive paste is added for the purpose of defining and functioning as a binder, improving viscosity of the material, and the like. Examples of such resins include polyvinyl acetal resins, such as polyvinyl butyral and polyvinyl acetoacetal, polyvinyl alcohol-based resins, such as polyvinyl alcohol, cellulosic resins such as methylcellulose, ethylcellulose, and cellulose phthalate acetate, (meth)acrylic resins, such as (meth)acrylic acid esters, imide resins such as polyamide-imide and polyimide, ethylene-based resins, such as polyethylene oxide, nitrile resins, such as polyacrylonitrile and polymetallilonitrile, urethane resins, such as polyurethane, vinyl resins, such as polyethylene, polypropylene, and vinyl acetate, and rubber-based resins, such as styrene-butadiene rubber. However, the present invention is not limited thereto.

As the content of the resin, the content included in the second dielectric ceramic layer 20b and the content included in the first dielectric ceramic layer 20a are preferably different from one another. The resin contents of the first dielectric ceramic layer 20a and the second dielectric ceramic layer 20b are preferably about 30 wt % or more and about 50 wt % or less, for example. The resin contents of the first dielectric ceramic layer and the second dielectric ceramic layer 20b are preferably different from each other in this range.

In a non-limiting example of a method for manufacturing a multilayer ceramic capacitor according to a preferred embodiment of the present invention, the thickness of the first dielectric ceramic layer 120a is preferably about 0.4 µm or more and about 0.8 µm or less, for example. In a non-limiting example of a method for manufacturing a multilayer ceramic capacitor according to a preferred embodiment of the present invention, the thickness of the first internal electrode layer 121 and the second internal electrode layer 122 is preferably about 0.4 µm or more and about 0.8 µm or less, for example.

Figure 27:
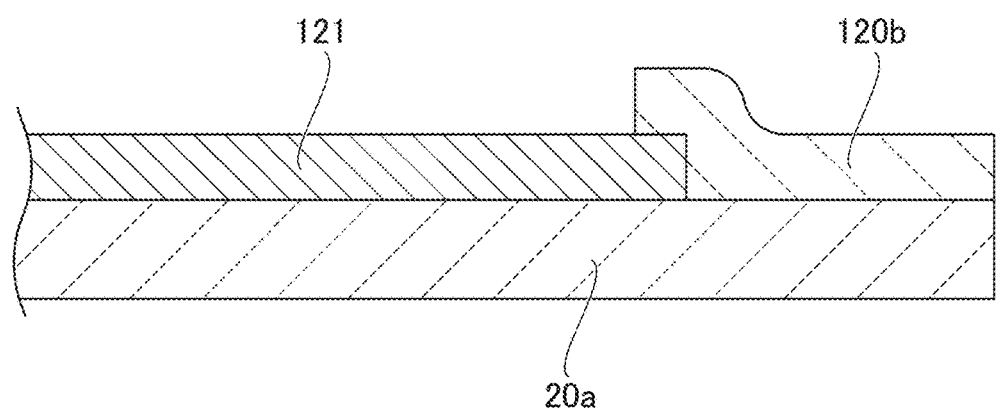
FIG. 27 is a cross-sectional view schematically showing a mode in which an end of the second dielectric ceramic layer is superimposed on an end of the internal electrode layer in a method for manufacturing a multilayer ceramic capacitor according to a preferred embodiment of the present invention.
Figure 27:
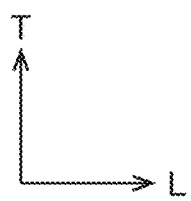

Furthermore, in forming the green chip 110, a portion of the second internal electrode layer 122 may overlap with a portion of the first internal electrode layer 121 and a portion of the second internal electrode layer 122. More specifically, the ends of the second dielectric ceramic layer 120b, and the first internal electrode layer 121 and the second internal electrode layer 122 adjacent to each other in the length (L) direction may be superimposed on each other. For example, as shown in FIG. 27, in the length (L) direction, the end of the second dielectric ceramic layer 120b may be superimposed on the end of the first internal electrode layer 121. Similarly to this, an end of the second dielectric ceramic layer 120b may be superimposed on an end of the second internal electrode layer 122. In the configuration in which the ends of the length (L) direction are superimposed on each other, the end of the first internal electrode layer 121 and the end of the second dielectric ceramic layer 120b may be superimposed on the end of the second dielectric ceramic layer 120b.

A non-limiting example of a method for manufacturing a multilayer ceramic capacitor according to a preferred embodiment of the present invention includes removing a certain thickness of the first side surface 113 and the second side surface 114 of the green chip 110 which is the unfired multilayer body 10, following by pasting the unfired third dielectric ceramic layer to the first side surface 113 and the second side surface 114. Thus, it is possible to form the unfired third dielectric ceramic layer with respect to the first side surface 113 and the second side surface 114 in a smooth and clean state.

In the non-limiting example of a method for manufacturing a multilayer ceramic capacitor according to a preferred embodiment of the present invention, by removing the first side surface 113 and the second side surface 114 by polishing, it is possible to remove the first side surface 113 and the second side surface 114 easily and accurately by a removal amount with a predetermined thickness.

In a non-limiting example of a method for manufacturing a multilayer ceramic capacitor according to a preferred embodiment of the present invention, the second dielectric ceramic layer 120b includes a resin, and the amount of the resin is preferably larger than the amount of the resin included in the first internal electrode layer 121 and the second internal electrode layer 122. Thus, the viscosity of the second dielectric ceramic layer 120b is relatively increased, and it is possible to reduce or prevent the occurrence of defects, such as cracks and chips, in the cut surface of the second dielectric ceramic layer 20b when cutting the mother block 104.

In addition, in a non-limiting example of a method for manufacturing a multilayer ceramic capacitor according to a preferred embodiment of the present invention, the thickness of the first dielectric ceramic layer 120a is preferably about 0.4 μm or more and about 0.8 μm or less, for example, and the thickness of the first internal electrode layer 121 and the second internal electrode layer 122 is preferably about 0.4 μm or more and about 0.8 μm or less, for example. By the unfired dielectric layer and the internal electrode layer having such a thickness, it is possible to allow the first dielectric ceramic layer 20a, the first internal electrode layer 21, and the second internal electrode layer 22 after firing to be formed to have a suitable thickness.

Moreover, a non-limiting example of a method for manufacturing a multilayer ceramic capacitor according to a preferred embodiment of the present invention, a portion of the second internal electrode layer 122 may overlap the first internal electrode layer 121 and the second internal electrode layer 122. Thus, after firing, it is possible to form the second dielectric ceramic layer 20b with a sufficient thickness without any gap.

(4) Defect Portion in the Second Dielectric Ceramic Layer

Figure 28:
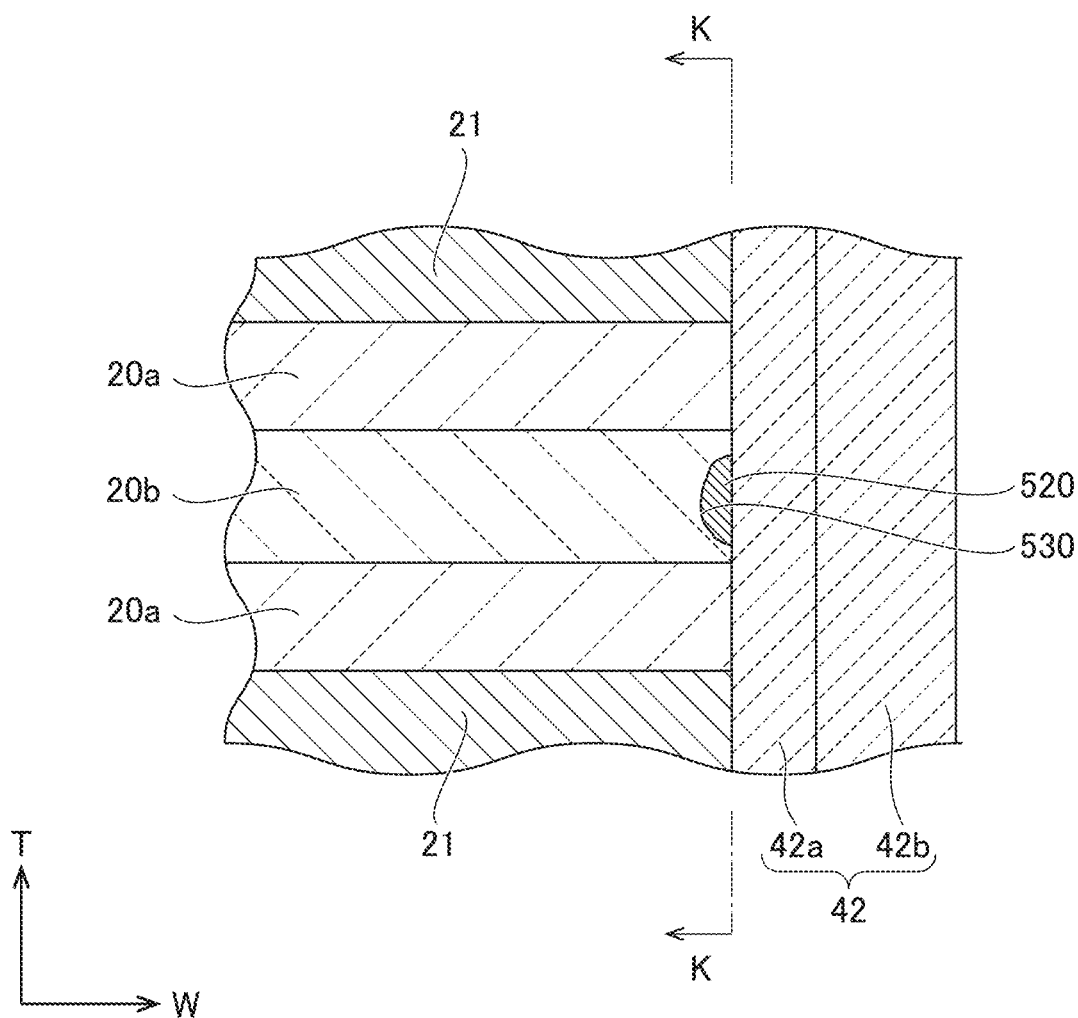
FIG. 28 shows a portion of a WT cross-section of a multilayer ceramic capacitor according to a preferred embodiment of the present invention, and is a diagram schematically showing a defect portion of the second dielectric ceramic layer.
Figure 29:
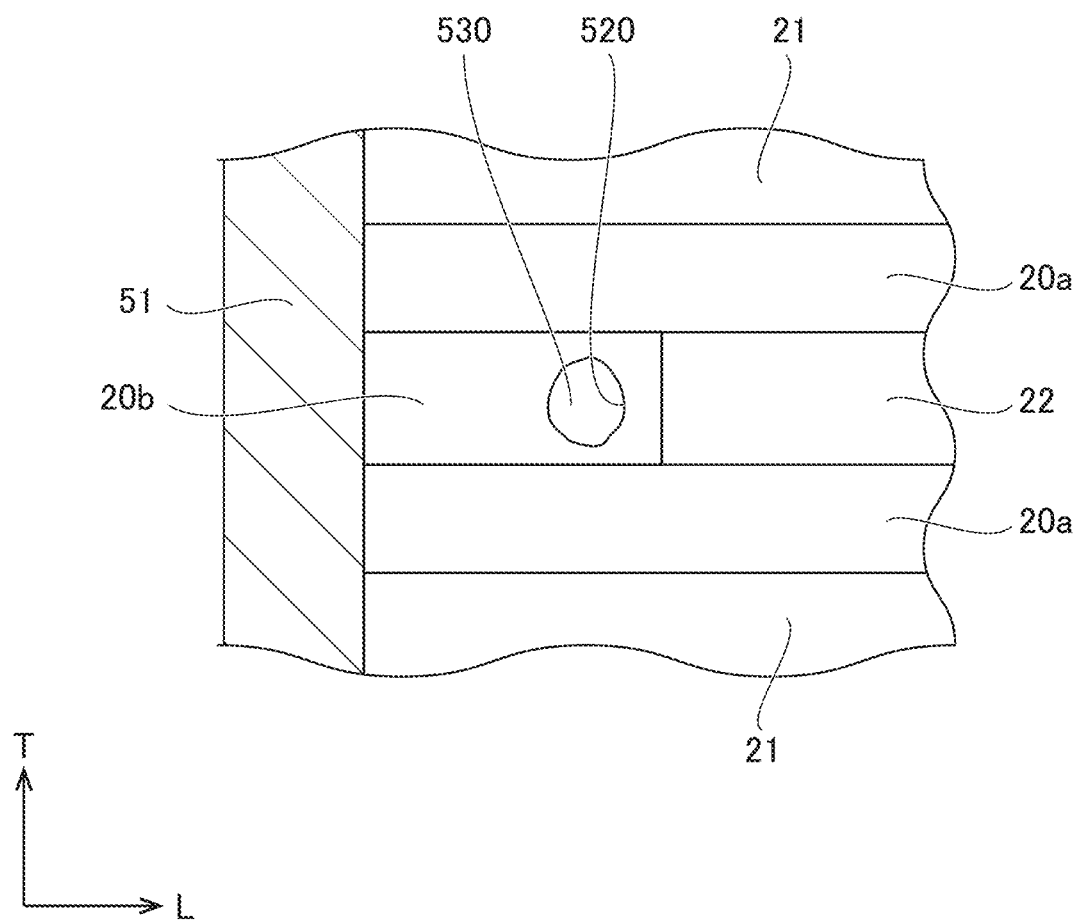
FIG. 29 is a cross-sectional view taken along line K-K in FIG. 28.

In the multilayer ceramic capacitor 1 of the present preferred embodiment, as shown in FIGS. 28 and 29, there is a defect portion 520 provided by being partially missing in the second dielectric ceramic layer 20b between at least one second dielectric ceramic layer 20b and one third dielectric ceramic layer 42. Furthermore, similarly to this, there is a defect portion 520 provided by being partially missing in the second dielectric ceramic layer 20b between the at least one second dielectric ceramic layer 20b and the other third dielectric ceramic layer 41.

In the region where the second dielectric ceramic layer 20b is disposed, i.e. in at least one of the region between the end of the first internal electrode layer 21 which is not connected to the second external electrode 52 and the second external electrode 52 and the region between the end of the second internal electrode layer 22 which is not connected to the first external electrode 51 and the first external electrode 51 in the length (L) direction of the multilayer body 10, the defect portion 520 is included between the first dielectric ceramic layers 20a at the position in the stacking (T) direction on the plane including the stacking (T) direction and the width (W) direction, and is included between the second dielectric ceramic layer 20b and the third dielectric ceramic layer 41 or 42 at the position in the width (W) direction.

When fabricating the green chip 110 which is the unfired multilayer body 10, the side surface of the unfired second dielectric ceramic layer 120b is subjected to processing followed by firing, to obtain the multilayer body 10 having the defect portion 520 on the side surface of the second dielectric ceramic layer 20b. Any method can be used as the processing method for obtaining the defective portion 520, and for example, the defect portion 520 can be formed by drilling with a suitable tool or the like.

Furthermore, in "Method for manufacturing with the addition of a step of removing the side surface of the multilayer body" described above, when the first side surface 113 or the second side surface 114 of the unfired green chip 110 is removed by polishing or the like, a portion of the side surface of the second dielectric ceramic layer 20b may be missing, and a fine hole may be formed. If such a hole occurs, the hole may be a defect portion 520. The defect portion 520 may not be formed on the side surface of all the second internal electrode layer 22, and it suffices if one or more of the defect portions 520 is formed on each of the first side surface 13 side and the second side surface 14 side at both ends of the length (L) direction.

Furthermore, as shown in FIGS. 28 and 29, a segregation 530 of Si may be disposed in the defect portion 520. The segregation 530 of Si is a segregation of Si added to the second dielectric ceramic layer 20b as an additive.

The size of the segregation 530 of Si when viewed in the diameter of the equivalent circle diameter is preferably, for example, larger than about ⅓ of the thickness of the second dielectric ceramic layer 20b. Furthermore, the size may preferably be about 100 nm or more and about 600 nm or less, for example.

The defect portion 520 is preferably disposed close to the first internal electrode layer 21 or the second internal electrode layer 22. In FIG. 29, the defect portion 520 is disposed close to the end of the second internal electrode layer 22 in the length (L) direction. Similarly to this, the defect portion 520 is preferably disposed close to the end of the first internal electrode layer 21 in the length (L) direction.

The dimension of the segregation 530 of Si is preferably about 0.1% or more and about 5% or less, for example, of the dimensions of the third dielectric ceramic layers 41 and 42 in the width (W) direction.

In the region where the second dielectric ceramic layer 20b is disposed, i.e. in at least one region in the length (L) direction of the multilayer body 10 between the end of the first internal electrode layer 21 which is not connected to the second external electrode 52 and the second external electrode 52 and the region between the end of the second internal electrode layer 22 which is not connected to the first external electrode 51 and the first external electrode 51, the multilayer ceramic capacitor 1 includes the defect portion 520 which is between the first dielectric ceramic layers 20a at the position in the stacking (T) direction on the plane including the stacking (T) direction and the width (W) direction, and is between the second dielectric ceramic layer 20b and the third dielectric ceramic layer 41 or 42 at the position in the width (W) direction.

Thus, it is possible to alleviate the stress generated in the second dielectric ceramic layer 20b at the time of firing by the defect portion 520. As a result, it is possible to reduce or prevent cracking or chipping from occurring in the second dielectric ceramic layer 20b.

In the multilayer ceramic capacitor 1, the segregation 530 of Si may be disposed at the defect portion 520. If the segregation 530 exists in the defect portion 520, entry of moisture is reduced or prevented by the segregation 530. Due to the segregation 530 being present in the defect portion 520, the humidity resistance of the multilayer ceramic capacitor 1 is improved. The segregation 530 may be present in all of the defect portions 520 or may be present in a portion of the defect portion 520. With the defect portion 520 in which the segregation 530 is present, it is possible to reduce or prevent cracking or chipping from occurring in the second dielectric ceramic layer 20b, and the humidity resistance of the multilayer ceramic capacitor 1 can be improved.

In the multilayer ceramic capacitor 1 of the present preferred embodiment, the segregation 530 of Si is preferably about ⅓ or more (or less than about ⅓) of the thickness of the second dielectric ceramic layer 20b.

In the multilayer ceramic capacitor 1, the defect portion 520 is disposed close to the first internal electrode layer 21 and the second internal electrode layer 22. The region close to the first internal electrode layer 21 and the second internal electrode layer 22 receives a relatively large stress generated at the time of firing. However, the stress is alleviated by the defect portion 520, and as a result of which the occurrence of cracking or chipping can be effectively reduced or prevented.

In the multilayer ceramic capacitor 1, in the width direction, the dimension of the segregation 530 of Si is preferably about 0.1% or more and about 5% or less, for example, of the dimensions of the third dielectric ceramic layers 41 and 42. When the segregation 530 of Si is present in the defect portion 520, it is possible to effectively reduce or prevent the occurrence of cracking and chipping, and it is also possible to improve the humidity resistance of the multilayer ceramic capacitor 1.

Figure 30:
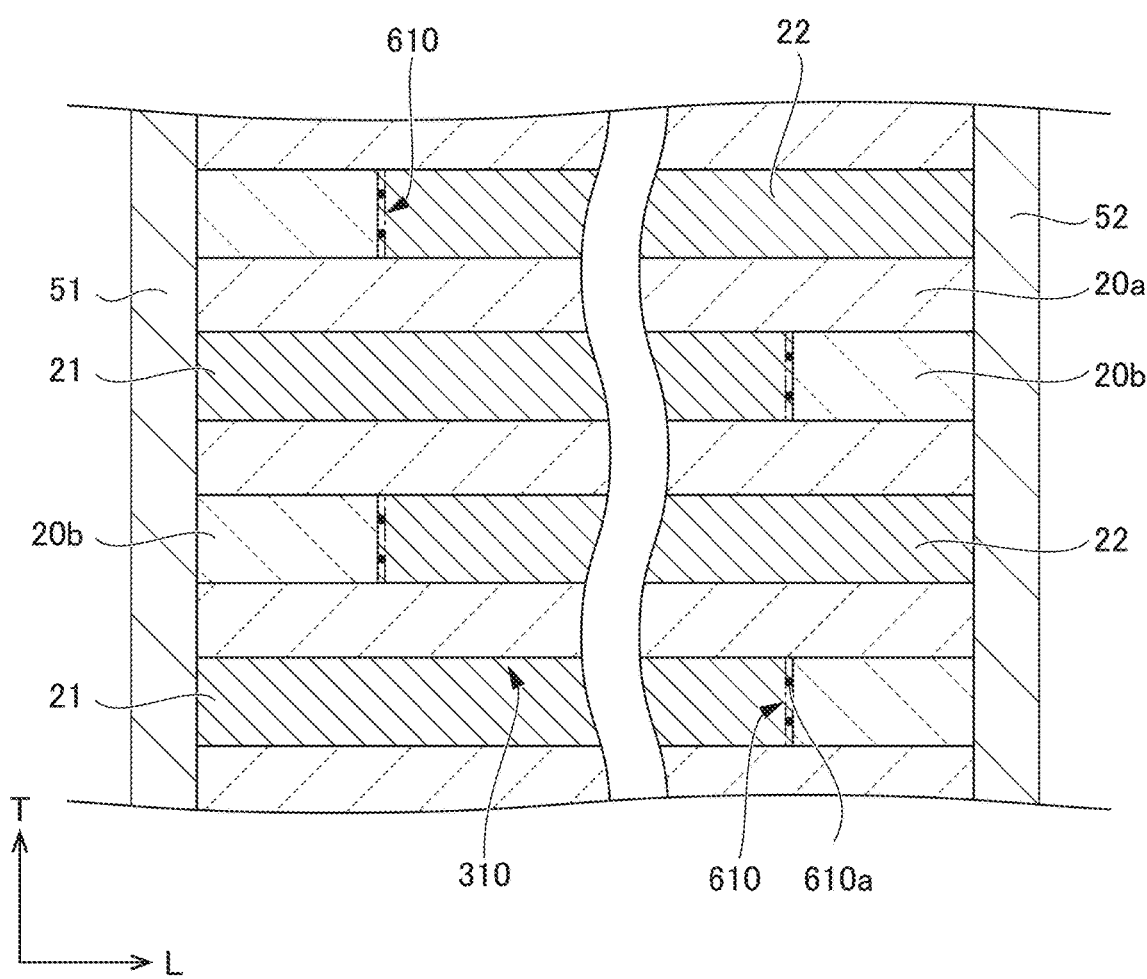
FIG. 30 shows a portion of a LT cross-section of a multilayer ceramic capacitor according to a preferred embodiment of the present invention, and is a diagram schematically showing a first segregation.

(5) Segregation at the End of the Internal Electrode Layer Side of the Second Dielectric Ceramic Layer As shown in FIG. 30, in the multilayer ceramic capacitor 1 of the present preferred embodiment, a first segregation 610 may be present at the end in the length (L) direction of the first internal electrode layer 21 which is not connected to the second external electrode 52. In addition, the first segregation 610 may be present at the end in the length (L) direction of the second internal electrode layer 22 which is not connected to the first external electrode 51.

Figure 31:
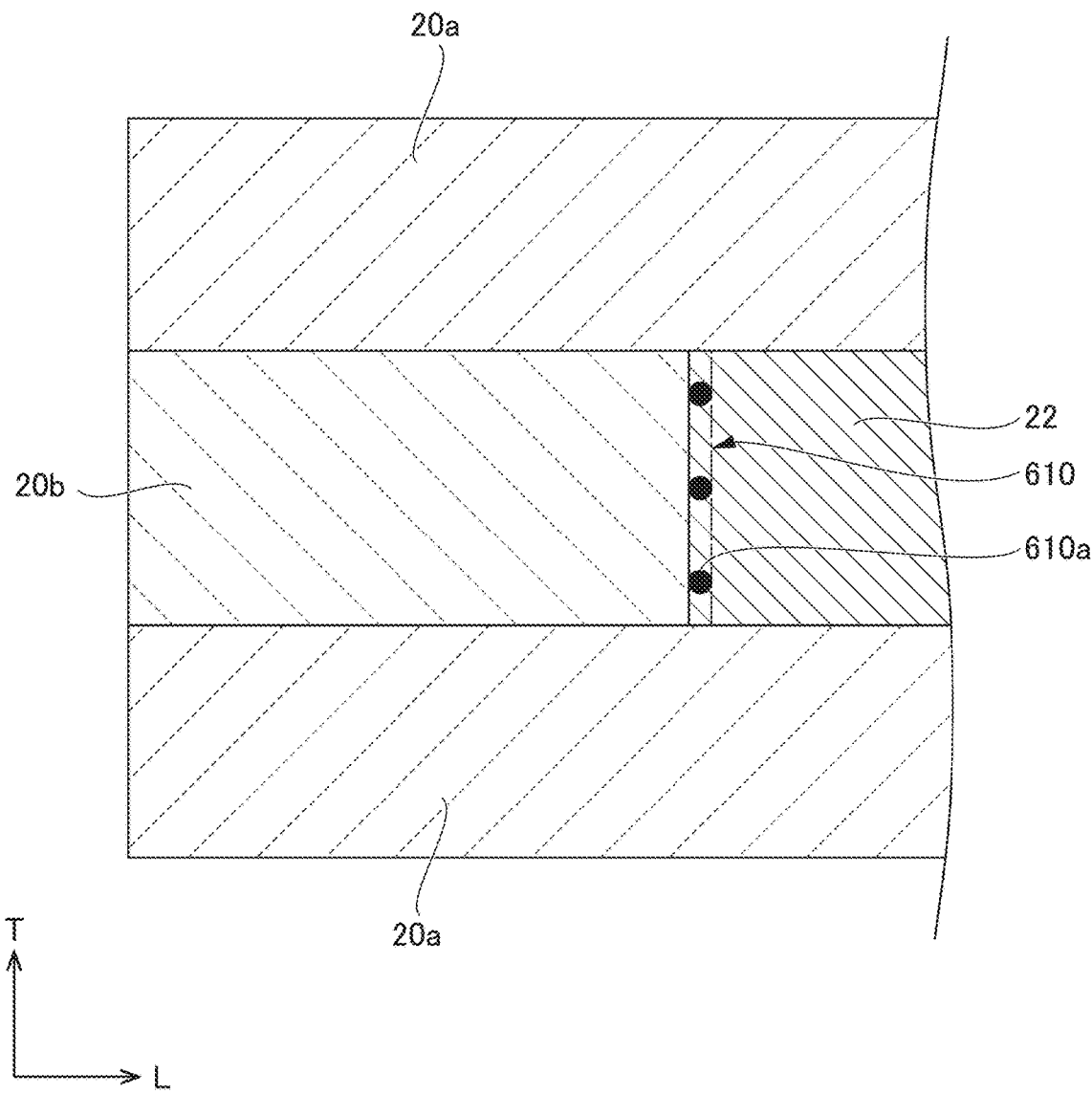
FIG. 31 is a partially enlarged view of FIG. 30.

As shown in FIG. 31, the first segregation 610 is generated due to a metal element 610a originating from the second dielectric ceramic layer 20b being segregated in a layered structure. Examples of the metal element 610a include at least one among Mg, Mn, and Si. The segregation 610 due to the metal element 610a occurs when the metal element included in the second dielectric ceramic layer 20b migrates to the first internal electrode layer 21 and the second internal electrode layer 22 during firing of the second dielectric ceramic layer 20b.

Figure 32:
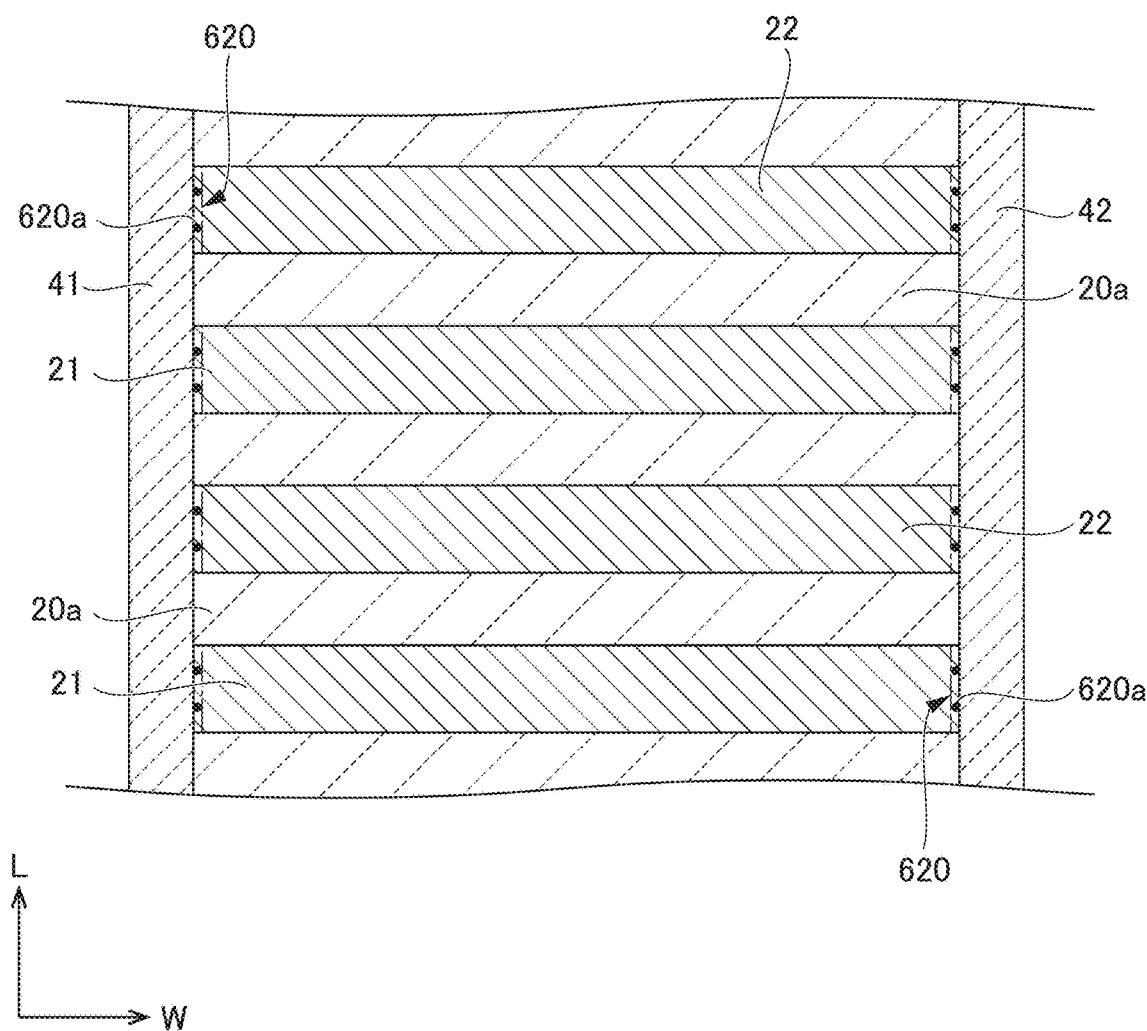
FIG. 32 shows a portion of a WT cross-section of a multilayer ceramic capacitor according to a preferred embodiment of the present invention, and is a diagram schematically showing a second segregation.

On the other hand, as shown in FIG. 32, a second segregation 620 may be present at the end of the first internal electrode layer 21 in the width (W) direction. Furthermore, the second segregation 620 may be present at the end of the second internal electrode layer 22 in the width (W) direction.

The second segregation 620 is generated due to a metal element 620a originating from the third dielectric ceramic layers 41 and 42 in contact with the first internal electrode layer 21 and the second internal electrode layer 22 being segregated in a layered form. Similarly to the first segregation 610, examples of the metal element 620a include at least one among Mg, Mn, and Si. The segregation 620 due to the metal element 620a is generated is due to the metal element included in the third dielectric ceramic layers 41 and 42 migrating to the first internal electrode layer 21 and the second internal electrode layer 22 during firing of the third dielectric ceramic layers 41 and 42.

In the multilayer ceramic capacitor 1, the first segregation 610 segregated in the first internal electrode layer 21, the first segregation 610 segregated in the second internal electrode layer 22, the second segregation 620 segregated in the first internal electrode layer 21, and the second segregation 620 segregated in the second internal electrode layer 22 are preferably different from one another in the metal element included in at least one set of segregations therein.

When the first dielectric ceramic layer 20a includes $BaTiO_3$ as a main component, the content of the metal element included in the first segregation 610 with respect to the first internal electrode layer 21 and the second internal electrode layer 22 is preferably, for example, about 0.3 mol % or more with respect to 100 moles of Ti. Similarly to this, the content of the metal element included in the second segregation 620 with respect to the first internal electrode layer 21 and the second internal electrode layer 22 is preferably, for example, about 0.3 mol % or more with respect to 100 moles of Ti.

In a preferred embodiment of the present invention, the length along the length (L) direction of the region in which the first segregation 610 is present in the first internal electrode layer 21 is preferably about 0.1 μm or more, for example. Furthermore, the length along the length (L) direction of the region in which the first segregation 610 is present in the second internal electrode layer 22 is preferably about 0.1 μm or more, for example. Furthermore, the length along the width (W) direction of the region in which the second segregation 620 is present in the first internal electrode layer 21 is preferably about 0.1 μm or more, for example. Furthermore, the length along the width (W) direction in the region in which the second segregation 620 is present in the second internal electrode layer 22 is preferably about 0.1 μm or more, for example. By having these lengths, electric field concentration can be reduced or prevented, and thus it is possible to reliably obtain the advantageous effect of improving the reliability.

With regard to the length of the first segregation 610 and the second segregation 620, when a length becomes below the above length, it is difficult to reduce the electric field concentration. Furthermore, in the first segregation 610, if it exceeds about 0.5% of the length (L) direction, or in the second segregation 620, if it exceeds about 1.0% of the width (W) direction, the metal element to be segregated (at least one of Mg, Mn, and Si, for example) becomes excessive, and the function of storing the charge of the internal electrode layer is degraded.

The length of the first segregation 610 in the length (L) direction can be controlled by adjusting the content of the metal element 610a included in the second dielectric ceramic layer 20b and migrating to the first internal electrode layer 21 and the second internal electrode layer 22 to be segregated. Furthermore, the length of the second segregation 620 in the width (W) direction can be controlled by adjusting the content of the metal element 620a included in the third dielectric ceramic layers 41 and 42, and migrating to the first internal electrode layer 21 and the second internal electrode layer 22 to be segregated.

In the multilayer ceramic capacitor 1, the first segregation 610 by at least one metal element selected from the group consisting of Mg, Mn, and Si, for example, is present in each of the end in the length (L) direction which is not connected to the second external electrode 52 in the first internal electrode layer 21, and the end in the length (L) direction which is not connected to the first external electrode 51 in the second internal electrode layer 22.

The electric field is likely to be concentrated at the end in the length (L) direction of each of the first internal electrode layer 21 and the second internal electrode layer 22 in contact with the second dielectric ceramic layer 20b, and when the electric field concentration occurs, the reliability of a multilayer ceramic capacitor may be reduced. However, in the multilayer ceramic capacitor 1 of the present preferred embodiment, the electric field concentration is reduced or prevented by the first segregation 610, and thus it is possible to improve the reliability.

In the multilayer ceramic capacitor 1, the second segregation 620 by at least one metal element selected from the group consisting of Mg, Mn, and Si, for example, is present in each of the end in the width (W) direction of the first internal electrode layer 21, and the end in the width (W) direction of the second internal electrode layer 22.

The electric field is likely to be concentrated at the end in the width (W) direction of each of the first internal electrode layer 21 and the second internal electrode layer 22 in contact with the third dielectric ceramic layers 41 and 42, and when the electric field concentration occurs, the reliability of a multilayer ceramic capacitor may be reduced. However, in the multilayer ceramic capacitor 1 of the present preferred embodiment, since the electric field concentration is reduced or prevented by the second segregation 620, it is possible to improve the reliability.

In the multilayer ceramic capacitor 1, the first segregation 610 segregated in the first internal electrode layer 21, the first segregation 610 segregated in the second internal electrode layer 22, the second segregation 620 segregated in the first internal electrode layer 21, and the second segregation 620 segregated in the second internal electrode layer 22 are different from one another in the metal element included in at least one set of segregations therein.

As a result, it is possible to provide an optimal metal element according to the position where the first segregation 610 and the second segregation 620 are provided, and thus it is possible to improve reliability.

In the multilayer ceramic capacitor 1 of the present preferred embodiment, the first dielectric ceramic layer 20a includes Ba and Ti, and the content of each of the metal element 610a included in the first segregation 610 and the metal element 620a included in the second segregation 620 with respect to the internal electrode layer is preferably about 0.3 mol % or more, for example, with respect to 100 moles of Ti.

Thus, the electric field concentration described above can be effectively reduced or prevented, and the reliability can be further improved.

In the multilayer ceramic capacitor 1 of the present preferred embodiment, the region where the first segregation 610 is present in the first internal electrode layer 21 is preferably about 0.3 μm or more, for example, in the length (L) direction; the region where the first segregation 610 is present in the second internal electrode layer 22 is preferably about 0.3 μm or more, for example, in the length (L) direction; the region where the second segregation 620 is present in the first segregation 610 is preferably about 0.3 μm or more, for example, in the width (W) direction; and the region where the second segregation 620 is present in the second segregation 620 is preferably about 0.3 μm or more, for example, in the width (W) direction.

Thus, the electric field concentration is reduced or prevented by the segregation, and thus the advantageous effect of improving the reliability is reliably obtained.

Test Example 3

Next, Test Example 3 will be described which verifies the advantageous effects of the first segregation 610 and the second segregation 620 in the multilayer ceramic capacitor 1 of the present preferred embodiment.

As shown in Table 4, Test Examples 3-1 to 3-18 were prepared for the multilayer ceramic capacitor including the second dielectric ceramic layer 20b including any one of the elements of Mg, Mn, Si and the third dielectric ceramic layers 41 and 42. Then, for each Test Example, the concentration of the element, and the length in the length (L) direction and the length in the width (W) direction of the first segregation generated at the end in the length (L) direction of the first internal electrode layer 21 and the second internal electrode layer 22 were examined. The concentrations of the metal elements of the first segregation and the second segregation were examined by using the same method as for the concentration of the second alloy portion and the concentration of the third alloy portion in "Test Example 1" described above. Furthermore, the length of each of the first segregation and the second segregation was measured by EDX analysis.

For the multilayer ceramic capacitors of Test Examples 3-1 to 3-18, the determination was performed by measuring, after being cooled to room temperature after being heated for about 1 hour in an environment with a room temperature of about 150° C., the resistance value (kΩ) in a state in which a voltage of about 6.3 V was applied, to examine MTTF (mean failure time). In addition, whether or not the capacitance was reduced was examined by an LCR meter (E4980 available from Keysight Technologies). When the decrease in the capacitance was about 3% or more, or MTTF was about 15.3 hours or less, it was evaluated as fail, when the decrease of the capacitance was less than about 3%, and MTTF was more than about 15.3 hours and less than about 30 hours, it was evaluated as good, and when the decrease in the capacitance was less than about 3% and MTTF was more than about 30 hours, it was evaluated as excellent. The results are listed in Table 4.

TABLE 4

| ELEMENT | CONCENTRATION (MOLE %) | LENGTH IN LENGTH DIRECTION (μm) | LENGTH IN WIDTH DIRECTION (μm) | MTTF (hr) | CAPACITANCE DECREASE | EVALUATION |
|---|---|---|---|---|---|---|
| TEST EXAMPLE 3-1 | Si | 0.2 | 0.08 | 0.07 | 14.1 | 0.1% DECREASED | FAIL |
| TEST EXAMPLE 3-2 | Si | 0.3 | 0.1 | 0.12 | 29.7 | 0.13% DECREASED | GOOD |
| TEST EXAMPLE 3-3 | Si | 0.5 | 0.3 | 0.27 | 30.8 | 0.38% DECREASED | EXCELLENT |
| TEST EXAMPLE 3-4 | Si | 0.55 | 0.4 | 0.34 | 31.5 | 0.45% DECREASED | EXCELLENT |
| TEST EXAMPLE 3-5 | Si | 0.6 | 0.45 | 0.42 | 32.3 | 0.5% DECREASED | EXCELLENT |
| TEST EXAMPLE 3-6 | Si | 0.7 | 2.1 | 3.2 | 38.9 | 3.5% DECREASED | FAIL |
| TEST EXAMPLE 3-7 | Mg | 0.2 | 0.07 | 0.05 | 13.5 | 0.11% DECREASED | FAIL |
| TEST EXAMPLE 3-8 | Mg | 0.3 | 0.1 | 0.13 | 29.7 | 0.13% DECREASED | GOOD |
| TEST EXAMPLE 3-9 | Mg | 0.5 | 0.3 | 0.29 | 30.8 | 0.38% DECREASED | EXCELLENT |
| TEST EXAMPLE 3-10 | Mg | 0.55 | 0.4 | 0.42 | 31.5 | 0.45% DECREASED | EXCELLENT |
| TEST EXAMPLE 3-11 | Mg | 0.6 | 0.45 | 0.51 | 32.3 | 0.5% DECREASED | EXCELLENT |
| TEST EXAMPLE 3-12 | Mg | 0.7 | 2.3 | 3.0 | 38.9 | 3.2% DECREASED | FAIL |
| TEST EXAMPLE 3-13 | Mn | 0.2 | 0.07 | 0.02 | 14.9 | 0.15% DECREASED | FAIL |
| TEST EXAMPLE 3-14 | Mn | 0.3 | 0.1 | 0.05 | 29.7 | 0.13% DECREASED | GOOD |
| TEST EXAMPLE 3-15 | Mn | 0.5 | 0.3 | 0.26 | 30.8 | 0.38% DECREASED | EXCELLENT |
| TEST EXAMPLE 3-16 | Mn | 0.55 | 0.4 | 0.42 | 31.5 | 0.45% DECREASED | EXCELLENT |
| TEST EXAMPLE 3-17 | Mn | 0.6 | 0.45 | 0.42 | 32.3 | 0.5% DECREASED | EXCELLENT |
| TEST EXAMPLE 3-18 | Mn | 0.7 | 1.9 | 2.5 | 33.5 | 3.2% DECREASED | FAIL |

By allowing the second dielectric layer to include Mg, Mn, and Si, so as to produce a segregated portion at the end in the length direction and the width direction of the internal electrode, it is possible to eliminate the reliability degradation factor which is likely to occur at the end thereof. However, if the content is too large, the region which defines and functions as a metal of the internal electrode becomes narrow, resulting in a decrease in capacitance.

Figure 33:
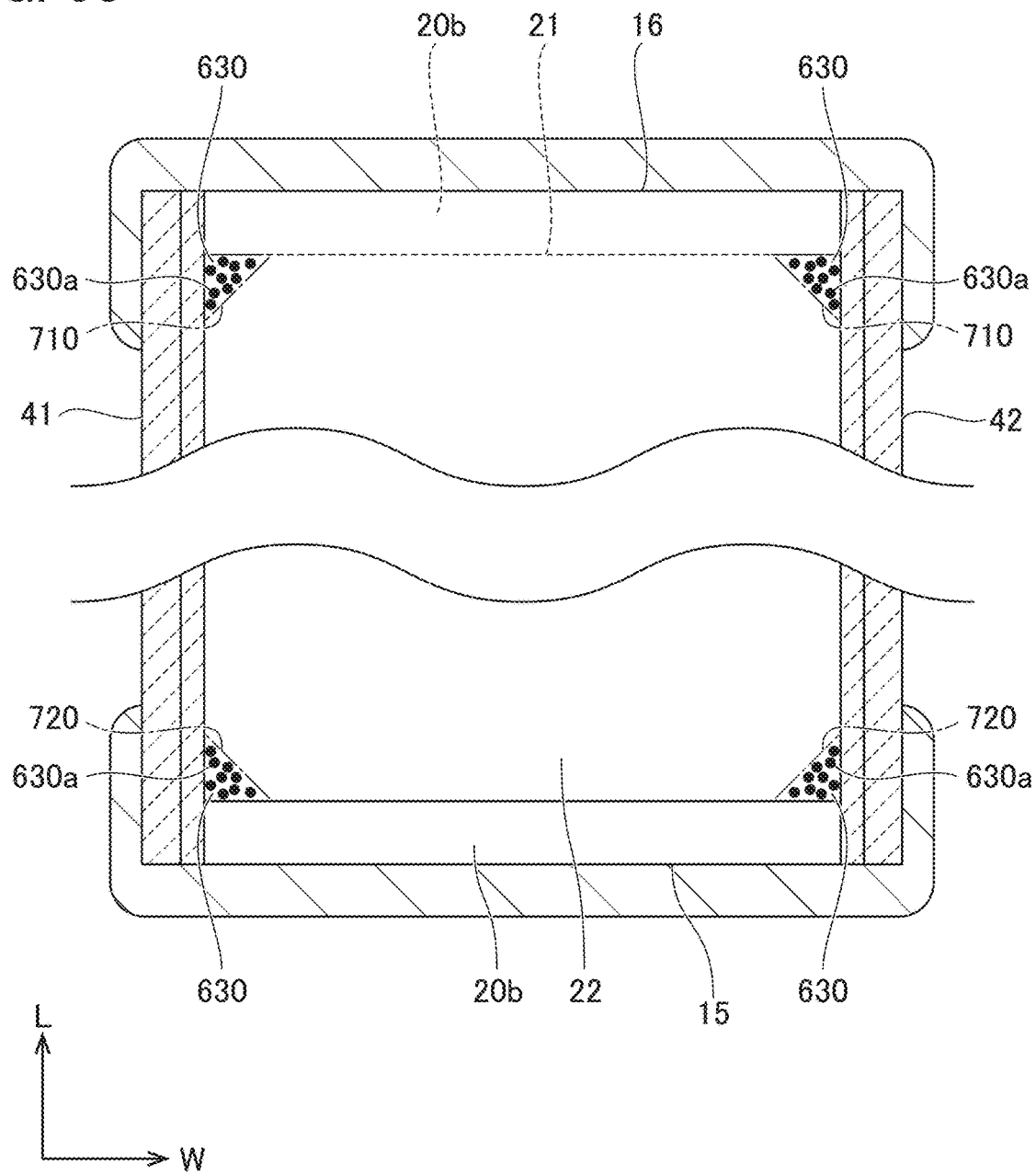
FIG. 33 shows a portion of a LW cross-section of a multilayer ceramic capacitor according to a preferred embodiment of the present invention, and is a diagram showing a third segregation which segregates in a first corner region and a second corner region.

(6) Segregation Formed in the Corner Region of the Internal Electrode Layer Side of the Second Dielectric Ceramic Layer When the first segregation 610 and the second segregation 620 described above are included, a third segregation 630 is preferably present as shown in FIG. 33. The third segregation 630 is present in each of a first corner region 710 and a second corner region 720.

The first corner region 710 is a region in which the length (L) direction in which the first segregation 610 exists overlaps the width (W) direction in which the second segregation 620 exists, in the first internal electrode layer 21. Furthermore, the second corner region 720 is a region in which the length (L) direction in which the first segregation 610 exists overlaps the width (W) direction in which the second segregation 620 exists, in the second internal electrode layer 22. The third segregation 630 is generated by the segregation of the metal element 610*a* of the first segregation 610 and the metal element 620*a* of the second segregation 620.

In a preferred embodiment of the present invention, it is preferable for the metal element 610*a* included in the first segregation 610 and the metal element 620*a* included in the second segregation 620 to be different from each other, and the metal element 630a of the third segregation 630 include both the metal element 610a included in the first segregation 610 and the metal element 620a included in the second segregation 620.

Furthermore, in a preferred embodiment of the present invention, the region where the first segregation 610 exists is preferably about 0.1 μm or more, for example, in the length (L) direction, and the region where the second segregation 620 exists is preferably about 0.1 μm or more, for example, in the width (W) direction.

FIG. 33 shows a plane including the length (L) direction and the width (W) direction in the multilayer ceramic capacitor 1. The third segregation 630 is preferably segregated in a substantially right-angled triangular shape so that the region where the third segregation 630 exists becomes larger as approaching the end in the length (L) direction in the plane including the length (L) direction and the width (W) direction. A portion or all of the third segregation 630 is included in the near intersection region 440 in FIG. 19.

Figure 34:
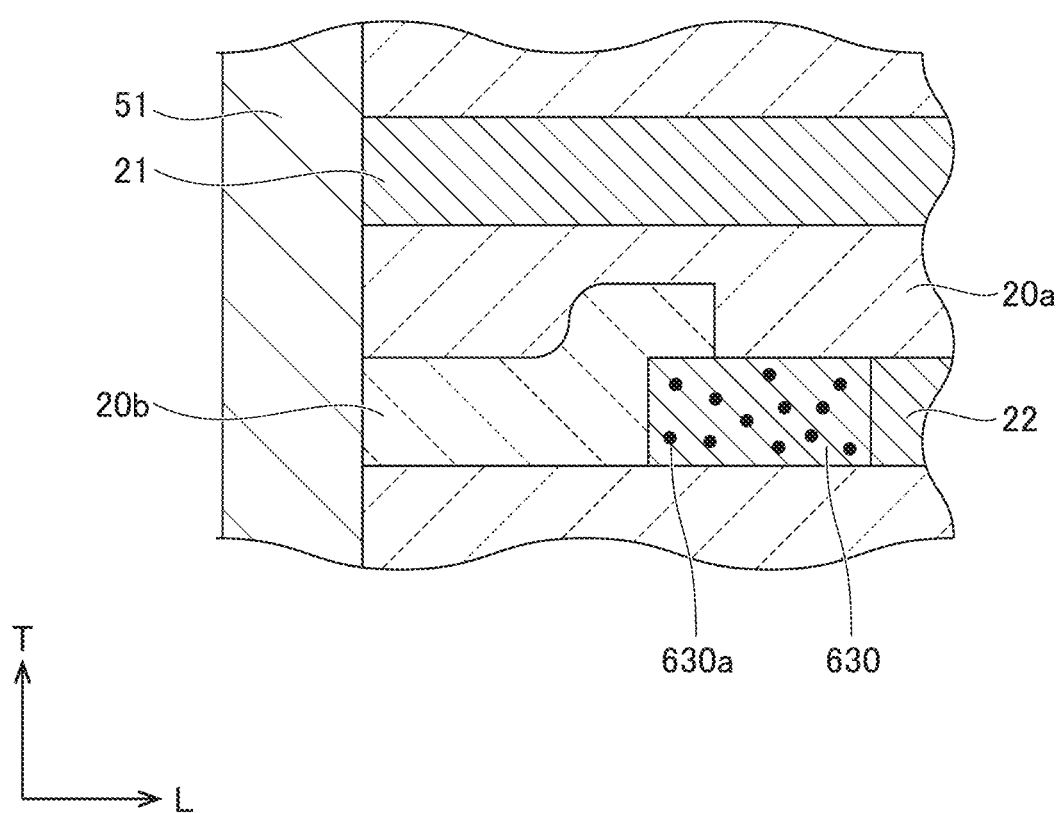
FIG. 34 is a cross-sectional view schematically showing a mode in which an end of the second dielectric ceramic layer is superimposed on the third segregation in a multilayer ceramic capacitor according to a preferred embodiment of the present invention.

Furthermore, in the multilayer ceramic capacitor 1, it is preferable for the second dielectric ceramic layer 20b to be arranged with respect to the first internal electrode layer 21 and the second internal electrode layer 22 so that a portion thereof is superimposed on the region where the third segregation 630 exists in the stacking (T) direction. More specifically, for example, as shown in FIG. 34, the end of the second dielectric ceramic layer 20b is superimposed, in the length (L) direction, on the end of the second internal electrode layer 22 in the region including the third segregation 630. Similarly to this, the end of the second dielectric ceramic layer 20b may be superimposed on the end of the first internal electrode layer 21. In such a mode in which the end in the length (L) direction is superimposed thereon, the end of the first internal electrode layer 21 or the end of the second dielectric ceramic layer 20b may be superimposed on the end of the second dielectric ceramic layer 20b.

In the multilayer ceramic capacitor 1, the first segregation 610 by at least one metal element selected from the group consisting of Mg, Mn, and Si is present in each of the end of the first internal electrode layer 21 in the length (L) direction which is not connected to the second external electrode 52, and the end of the second internal electrode layer 22 in the length (L) direction which is not connected to the first external electrode 51; the second segregation 620 by at least one metal element selected from the group consisting of Mg, Mn, and Si is present in each of the end of the first internal electrode layer 21 in the width (W) direction, and the end of the second internal electrode layer 22 in the width (W) direction; and the third segregation 630 by the respective metal elements of the first segregation 610 and second segregation 620 is present in each of the first corner region 710 where the end in the length (L) direction in which the first segregation 610 exists in the first internal electrode layer 21 overlaps the width (W) direction in which the second segregation 620 exists in the first internal electrode layer 21, and the second corner region 720 where the end in the length (L) direction in which the first segregation 610 exists in the second internal electrode layer 22 overlaps the width (W) direction in which the second segregation 620 exists.

The electric field is likely to be concentrated at the first corner region 710 and the second corner region 720, and when the electric field concentration occurs, the reliability of a multilayer ceramic capacitor may be degraded. However, in the multilayer ceramic capacitor 1 of the present preferred embodiment, since the electric field concentration to the first corner region 710 and the second corner region 720 is reduced or prevented by the third segregation 630, the reliability can be improved.

In the multilayer ceramic capacitor 1 of the present preferred embodiment, the metal element 610a included in the first segregation 610 and the metal element 620a included in the second segregation 620 are different from each other, and the metal element included in the third segregation 630 includes both the metal element 610a included in the first segregation 610 and the metal element 620a included in the second segregation 620.

As a result, it is possible for the third segregation 630 to reduce or prevent the electric field concentration to the first corner region 710 and the second corner region 720, thus improving the reliability.

It should be noted that, in the third segregation 630, Mg is preferably used as the metal element disposed on the side close to the third dielectric ceramic layers 41 and 42. On the other hand, in the third segregation 630, Si is preferably used as the metal element disposed on the side close to the second dielectric ceramic layer 20b, from the viewpoint of the possibility of improving moisture resistance. Therefore, it is preferable for both Mg and Si to be segregated in the first corner region 710 and the second corner region 720. In addition, there is a possibility that the short-circuit recovery is performed due to the first segregation 610 at the ends in the width (W) direction of the first internal electrode layer 21 and the second internal electrode layer 22. Furthermore, it is more preferable for Sn to be a solid solution in the first internal electrode layer 21 and the second internal electrode layer 22.

In the multilayer ceramic capacitor 1 of the present preferred embodiment, preferably, the region where the first segregation 610 exists is about 0.1 μm or more in the length (L) direction, and the region where the second segregation 620 exists is about 0.1 μm or more in the width (W) direction, for example. Thus, the electric field concentration is reduced or prevented by segregation, and the advantageous effect of improving the reliability is reliably obtained.

In the multilayer ceramic capacitor 1 of the present preferred embodiment, the region where the third segregation 630 exists becomes larger approaching the end in the length (L) direction in a plane including the length (L) direction and the width (W) direction.

Thus, the area of the third segregation 630 in the portion of the end of the second dielectric ceramic layer 20b in the length (L) direction where the electric field concentration is likely to occur increases, and reduction or prevention of the electric field concentration by the third segregation 630 is achieved more effectively, thus making it possible to further improve the reliability.

In the multilayer ceramic capacitor 1 of the present preferred embodiment, the second dielectric ceramic layer 20b is arranged with respect to the first internal electrode layer 21 and the second internal electrode layer 22 so that a portion thereof is superimposed on the region where the third segregation 630 exists in the stacking (T) direction.

Thus, the region where the third segregation 630 exists is likely to become larger approaching the end in the length (L) direction in the plane including the length (L) direction and the width (W) direction.

Test Example 4

Next, Test Example 4 will be described which verifies the advantageous effects of the third segregation 630 in the multilayer ceramic capacitor 1.

As shown in Table 5, Test Examples 4-1 to 4-18 were prepared for the multilayer ceramic capacitors each including the second dielectric ceramic layer including any one of the metal elements of Mg, Mn, and Si, and the third dielectric ceramic layer including any one of Mg, Mn, and Si. Then, the concentration of the metal element included in the third segregation occurring in the first corner region and the second corner region of each of the multilayer ceramic capacitor, the length of the length (L) direction and the length of the width (W) direction were examined. The concentration of the metal element of the third segregation was examined by using the same method as the concentration of the second alloy portion and the concentration of the third alloy portion in "Test Example 1" described above. Also, the respective lengths of the third segregation were measured by EDX analysis.

For the multilayer ceramic capacitors of Test Examples 4-1 to 4-14, the determination was performed by measuring the resistance value (kΩ) in a state in which a voltage of about 6.3 V was applied in an environment with a room temperature of about 150° C., to examine MTTF (mean failure time). MTTF was determined when the resistance value became about 10 kΩ or less, and if MTTF was about 15.3 hours (hr) or less, it was evaluated as fail, if MTTF was up to about 30 hours beyond about 15.3 hours (hr), it is evaluated as good, and if MTTF was beyond about 30 hours, it was evaluated as excellent. The results are listed in Table 5. In addition, whether or not the capacitance was reduced was examined by an LCR meter (E4980 available from Keysight Technologies), and those showing the reduction of capacitance of about 3% or more were evaluated as fail. It should be noted that, when the coverage of the internal electrode layer is less than about 80%, since the capacitance is difficult to be measured, it was evaluated as unmeasurable.

TABLE 5

| | ELEMENT | CONCENTRATION (MOLE %) | SEGREGATION LENGTH IN WIDTH DIRECTION | SEGREGATION LENGTH IN LENGTH DIRECTION (μm) | MTTF (hr) | EVALUATION |
|---|---|---|---|---|---|---|
| TEST EXAMPLE 4-1 | Si | 0.2 | 0.07 | 0.05 | 15.2 | FALL |
| TEST EXAMPLE 4-2 | Si | 0.3 | 0.1 | 0.1 | 27.3 | GOOD |
| TEST EXAMPLE 4-3 | Si | 0.5 | 1.1 | 1.1 | 32.1 | EXCELLENT |
| TEST EXAMPLE 4-4 | Si | 0.55 | 1.3 | 1.3 | 33.4 | EXCELLENT |
| TEST EXAMPLE 4-5 | Si | 0.6 | 1.5 | 1.5 | 35.6 | EXCELLENT |
| TEST EXAMPLE 4-6 | Si | 0.7 | 2.12 | 2.12 | 38.9 | FAIL CAPACITANCE DECREASED 3% |
| TEST EXAMPLE 4-7 | Mg | 0.2 | 0.08 | 0.07 | 14.8 | FALL |
| TEST EXAMPLE 4-8 | Mg | 0.3 | 0.1 | 0.1 | 27.3 | GOOD |
| TEST EXAMPLE 4-9 | Mg | 0.5 | 1.1 | 1.1 | 32.1 | EXCELLENT |
| TEST EXAMPLE 4-10 | Mg | 0.55 | 1.3 | 1.3 | 33.4 | EXCELLENT |
| TEST EXAMPLE 4-11 | Mg | 0.6 | 1.5 | 1.5 | 35.6 | EXCELLENT |
| TEST EXAMPLE 4-12 | Mg | 0.7 | 2.11 | 2.11 | 38.9 | FAIL CAPACITANCE DECREASED 3% |
| TEST EXAMPLE 4-13 | Mn | 0.2 | 0.06 | 0.07 | 13.5 | FALL |
| TEST EXAMPLE 4-14 | Mn | 0.3 | 0.1 | 0.1 | 27.3 | GOOD |
| TEST EXAMPLE 4-15 | Mn | 0.5 | 1.1 | 1.1 | 32.1 | EXCELLENT |
| TEST EXAMPLE 4-16 | Mn | 0.55 | 1.3 | 1.3 | 33.4 | EXCELLENT |
| TEST EXAMPLE 4-17 | Mn | 0.6 | 1.5 | 1.5 | 35.6 | EXCELLENT |
| TEST EXAMPLE 4-18 | Mn | 0.7 | 1.7 | 1.6 | 42.5 | FAIL CAPACITANCE DECREASED 3% |

By allowing the second ceramic dielectric layer and the third ceramic dielectric layer to include Si, Mg, and Mn, it is possible to produce many segregation regions in the corners. In particular, electric field concentration occurs in the corner, which tends to degrade the reliability. However, it is possible to improve the reliability by producing a segregated region. However, if the content is too large, the region which functions as a metal of the internal electrode becomes narrow, resulting in a reduction in capacitance.

(7) Thickness of the Second Dielectric Ceramic Layer

Figure 35:
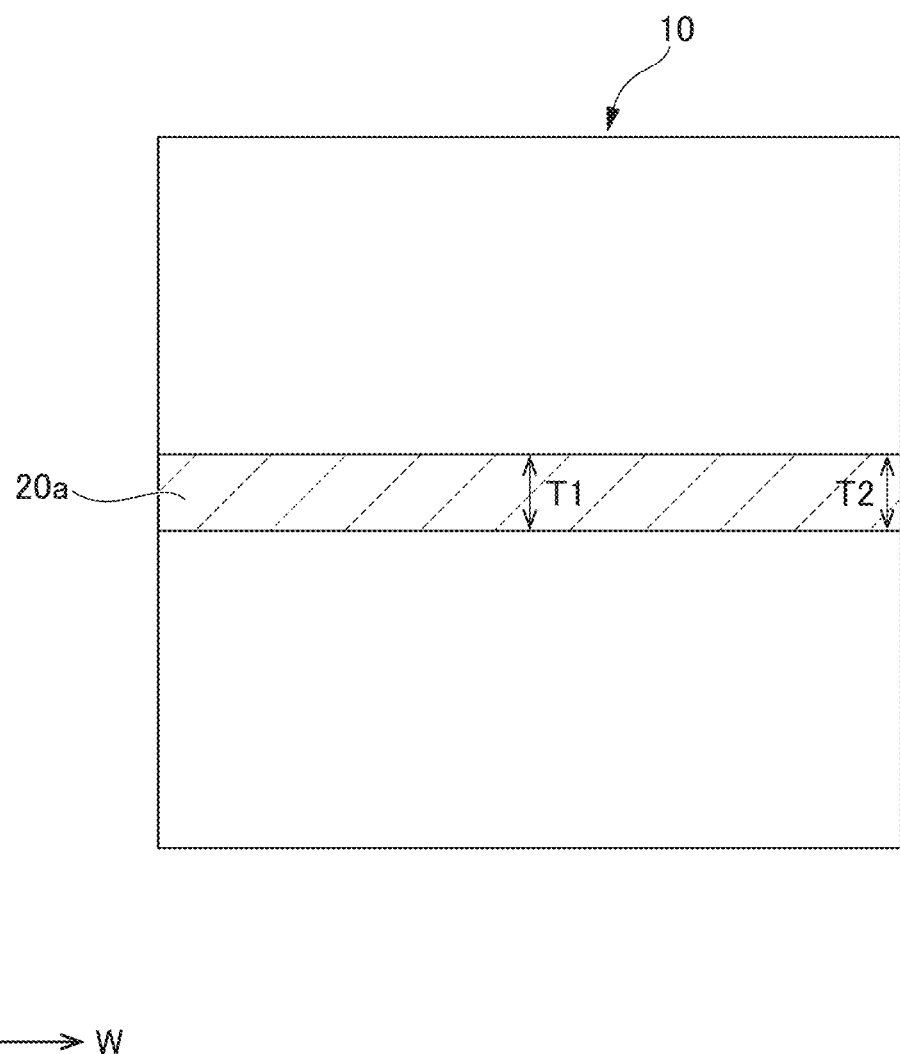
FIG. 35 is a diagram showing the thickness of the first dielectric ceramic layer at the central portion in the length (L) direction of a multilayer ceramic capacitor according to a preferred embodiment of the present invention.

FIG. 35 schematically shows the WT cross-section at the central portion in the length (L) direction of the multilayer body 10 in the multilayer ceramic capacitor 1, and respectively shows, in this cross-section, the thickness of the first dielectric ceramic layer 20a as T1 and the thickness at the end in the width (W) direction as T2.

Figure 36:
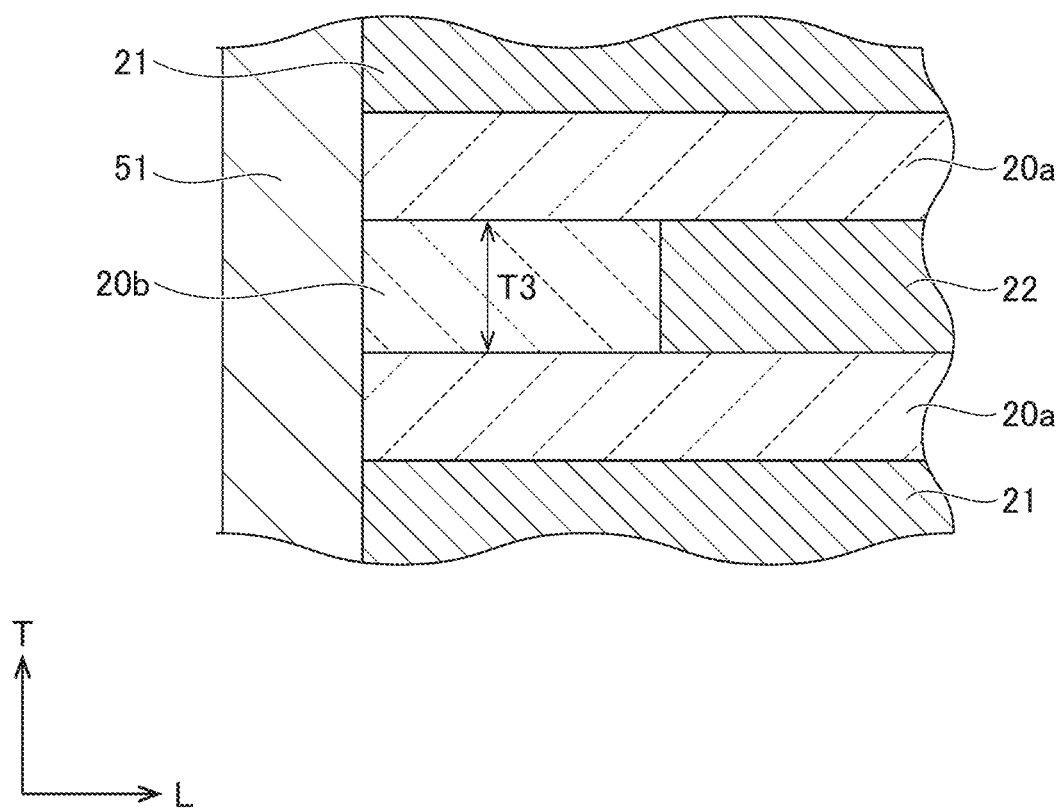
FIG. 36 is a diagram showing the thickness of the second dielectric ceramic layer of a multilayer ceramic capacitor according to a preferred embodiment of the present invention.

Furthermore, FIG. 36 shows a portion of the LT cross-section of the multilayer ceramic capacitor 1 of the present preferred embodiment, and T3 refers to the thickness of the second dielectric ceramic layer 20b. Although FIG. 36 shows the second dielectric ceramic layer 20b in contact with the second internal electrode layer 22, the thickness of the second dielectric ceramic layer 20b in contact with the first internal electrode layer 21 is also regarded as T3. In other words, the thickness T3 of the second dielectric ceramic layer 20b refers to each of the thicknesses between the end of the first internal electrode layer 21 in the length (L) direction which is not connected to the second external electrode 52, and the second external electrode 52, and between the end of the second internal electrode layer 22 in the length (L) direction which is not connected to the first external electrode 51 and the second external electrode 52.

In a preferred embodiment of the present invention, the difference in thickness between T1 and T2 is relatively small and is within about 10% of T1. In contrast, the thickness of T3 is larger than T1 and T2, and the difference is preferably, for example, about 10% or more of T1 and T2.

The method of increasing the thickness T3 of the second dielectric ceramic layer 20b more than the thicknesses T1 and T2 of the first dielectric ceramic layer 20a is not limited to the method described above and, for example, a method is also possible by causing the end of the unfired second dielectric ceramic layer 120b in the length (L) direction to be superimposed on the ends of the unfired first internal electrode layer 121 and the unfired second internal electrode layer 122 in the length (L) direction, when fabricating the green chip 110 before firing, following which the green chip 110 is fired.

Among T1, T2, and T3, the thickness T1 of the central portion of the first dielectric ceramic layer 20a is preferably about 0.7 μm or less, for example. The thickness T3 of the second dielectric ceramic layer 20b is preferably about 0.4 μm or more, for example.

In the multilayer ceramic capacitor 1, in a plane including the center portion in the length (L) direction, and the stacking (T) direction and the width (W) direction of the first dielectric ceramic layer 20a, when the thickness at the center portion in the stacking (T) direction is defined as T1, the thickness at the end of the first dielectric ceramic layer 20a in the width (W) direction is defined as T2, and the respective thicknesses between the end of the first internal electrode layer 21 in the length (L) direction which is not connected to the second external electrode 52 and between the end of the second internal electrode layer 22 in the length (L) direction which is not connected to the first external electrode 51, and the first external electrode 51 is defined as T3, the difference in thickness between T1 and T2 is within 10% of T1, the thickness of T3 is greater than T1 and T2, and the difference thereof is preferably, for example, about 10% or more of T1 and T2.

Thus, the element thickness by the second dielectric ceramic layer 20b disposed for the purpose of level difference elimination is provided sufficiently between the first dielectric ceramic layer 20a sandwiching the first internal electrode layer 21 and the second internal electrode layer 22, a result of which it is possible to improve the reliability.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
    a multilayer body including a dielectric ceramic layer and an internal electrode layer stacked in a stacking direction; and
    an external electrode connected to the internal electrode layer; wherein
    the multilayer body includes a first main surface and a second main surface on opposite sides in the stacking direction, a first side surface and a second side surface on opposite sides in a width direction orthogonal or substantially orthogonal to the stacking direction, and a first end surface and a second end surface on opposite sides in a length direction orthogonal or substantially orthogonal to the stacking direction and the width direction;
    the internal electrode layer includes a first internal electrode layer that extends to the first end surface, and a second internal electrode layer that extends to the second end surface;
    the second internal electrode layer is opposed to the first internal electrode layer with the dielectric ceramic layer interposed therebetween;
    the external electrode includes a first external electrode that is disposed on the first end surface and is connected to the first internal electrode layer, and a second external electrode that is disposed on the second end surface and is connected to the second internal electrode layer;
    the dielectric ceramic layer includes first dielectric ceramic layers and a second dielectric ceramic layer;
    the first dielectric ceramic layers include Ba and Ti, and at least one of the first dielectric ceramic layers is disposed between the first internal electrode layer and the second internal electrode layer;
    the second dielectric ceramic layer includes a region between two of the first dielectric ceramic layers opposite to each other with the internal electrode layer interposed therebetween, and in which the internal electrode layer is not disposed, and such that a portion of the second dielectric ceramic layer overlaps the two first dielectric ceramic layers in the stacking direction;
    the multilayer body includes an inner layer portion in which the first internal electrode layer and the second internal electrode layer are alternately stacked with the dielectric ceramic layer interposed therebetween, an outer layer portion sandwiching the inner layer portion in the stacking direction and including a ceramic material, and a third dielectric ceramic layer sandwiching the inner layer portion and the outer layer portion in the width direction and including a dielectric ceramic material;

a first alloy portion including the one metal element, and one or more metal elements among the metal group is provided between the first dielectric ceramic layers and the first internal electrode layer and between the first dielectric ceramic layers and the second internal electrode layer, respectively;

a second alloy portion including one metal element provided in a greatest amount among metal elements of the internal electrode layer, and one or more metal elements among a metal group including Sn, In, Ga, Zn, Bi, Pb, Cu, Ag, Pd, Pt, Ph, Ir, Ru, Os, Fe, V, and Y is provided between the second dielectric ceramic layer and the first internal electrode layer, and between the second dielectric ceramic layer and the second internal electrode layer, respectively; and the second alloy portion has a higher molar ratio than the first alloy portion, relative to 100 moles of Ti in content of the metal group.

2. The multilayer ceramic capacitor according to claim 1, wherein
the first internal electrode layer includes a first interspersed internal electrode interspersed discontinuously in the length direction at an end in the length direction which is not connected to the second external electrode;
the second internal electrode layer includes a second interspersed internal electrode interspersed discontinuously in the length direction at an end in the length direction which is not connected to the first external electrode; and
a fourth alloy portion including the one metal element and one or more metal elements among the metal group is provided around each of the first interspersed internal electrode and the second interspersed internal electrode.

3. The multilayer ceramic capacitor according to claim 2, wherein each of the first interspersed internal electrode and the second interspersed internal electrode is provided within the second dielectric ceramic layer.

4. The multilayer ceramic capacitor according to claim 1, wherein a third alloy portion including the one metal element and one or more metal elements among the metal group is provided between the third dielectric ceramic layer and the first internal electrode layer, and between the third dielectric ceramic layer and the second internal electrode layer, respectively.

5. The multilayer ceramic capacitor according to claim 1, wherein each of the first external electrode and the second external electrode includes a metal and a ceramic material.

6. The multilayer ceramic capacitor according to claim 1, wherein each of the first external electrode and the second external electrode includes a Ni layer, a first plated layer, and a second plated layer.

7. The multilayer ceramic capacitor according to claim 6, wherein each of the first external electrode and the second external electrode further includes a Cu layer.

8. The multilayer ceramic capacitor according to claim 1, wherein the outer layer portion includes a plurality of dielectric ceramic layers.

9. The multilayer ceramic capacitor according to claim 1, wherein the dielectric ceramic layer includes ceramic grains.

10. The multilayer ceramic capacitor according to claim 1, wherein a thickness of the outer layer portion is about 15 µm or more and about 40 µm or less.

11. The multilayer ceramic capacitor according to claim 1, wherein the dielectric ceramic layer includes a rare earth element in an amount of about 0.2 mol % or more and about 5 mol % or less with respect to 100 moles of Ti.

12. The multilayer ceramic capacitor according to claim 1, wherein the dielectric ceramic layer has a perovskite structure as a main component.

13. The multilayer ceramic capacitor according to claim 1, wherein a thickness of each of the first internal electrode layer and the second internal electrode layer is about 0.25 µm or more and about 0.4 µm or less.

14. The multilayer ceramic capacitor according to claim 1, wherein a thickness of each of the first dielectric ceramic layers and the second dielectric ceramic layer is about 0.4 µm or more and about 0.55 µm or less.

15. A multilayer ceramic capacitor comprising:
a multilayer body including a dielectric ceramic layer and an internal electrode layer stacked in a stacking direction; and
an external electrode connected to the internal electrode layer; wherein
the multilayer body includes a first main surface and a second main surface on opposite sides in the stacking direction, a first side surface and a second side surface on opposite sides in a width direction orthogonal or substantially orthogonal to the stacking direction, and a first end surface and a second end surface on opposite sides in a length direction orthogonal or substantially orthogonal to the stacking direction and the width direction;
the internal electrode layer includes a first internal electrode layer that extends to the first end surface, and a second internal electrode layer that extends to the second end surface;
the second internal electrode layer is opposed to the first internal electrode layer with the dielectric ceramic layer interposed therebetween;
the external electrode includes a first external electrode that is disposed on the first end surface and is connected to the first internal electrode layer, and a second external electrode that is disposed on the second end surface and is connected to the second internal electrode layer;
the dielectric ceramic layer includes first dielectric ceramic layers and a second dielectric ceramic layer;
at least one of the first dielectric ceramic layers is disposed between the first internal electrode layer and the second internal electrode layer;
the second dielectric ceramic layer includes a region between two of the first dielectric ceramic layers opposite to each other with the internal electrode layer interposed therebetween, and in which the internal electrode layer is not disposed, and such that a portion of the second dielectric ceramic layer overlaps the two first dielectric ceramic layers in the stacking direction;
the multilayer body includes an inner layer portion in which the first internal electrode layer and the second internal electrode layer are alternately stacked with the dielectric ceramic layer interposed therebetween, an outer layer portion sandwiching the inner layer portion in the stacking direction and including a ceramic material, and a third dielectric ceramic layer sandwiching the inner layer portion and the outer layer portion in the width direction and including a dielectric ceramic material;
a second alloy portion including one metal element provided in a greatest amount among metal elements of the internal electrode layer, and one or more metal elements among a metal group including Sn, In, Ga, Zn, Bi, Pb, Cu, Ag, Pd, Pt, Ph, Ir, Ru, Os, Fe, V, and Y is provided between the second dielectric ceramic layer and the first internal electrode layer, and between the second dielectric ceramic layer and the second internal electrode layer, respectively; and the external electrode includes Ni, and a fifth alloy portion in which one or more metal elements among the metal group is segregated in the Ni is provided.

16. A multilayer ceramic capacitor comprising:

a multilayer body including a dielectric ceramic layer and an internal electrode layer stacked in a stacking direction; and an external electrode connected to the internal electrode layer; wherein the multilayer body includes a first main surface and a second main surface on opposite sides in the stacking direction, a first side surface and a second side surface on opposite sides in a width direction orthogonal or substantially orthogonal to the stacking direction, and a first end surface and a second end surface on opposite sides in a length direction orthogonal or substantially orthogonal to the stacking direction and the width direction;

the internal electrode layer includes a first internal electrode layer that extends to the first end surface, and a second internal electrode layer that extends to the second end surface;

the second internal electrode layer is opposed to the first internal electrode layer with the dielectric ceramic layer interposed therebetween;

the external electrode includes a first external electrode that is disposed on the first end surface and is connected to the first internal electrode layer, and a second external electrode that is disposed on the second end surface and is connected to the second internal electrode layer;

the dielectric ceramic layer includes first dielectric ceramic layers and a second dielectric ceramic layer;

the first dielectric ceramic layers include Mg, and at least one of the first dielectric ceramic layers is disposed between the first internal electrode layer and the second internal electrode layer;

the second dielectric ceramic layer includes Sn and a region between two of the first dielectric ceramic layers opposite to each other with the internal electrode layer interposed therebetween, and in which the internal electrode layer is not disposed, and such that a portion of the second dielectric ceramic layer overlaps the two first dielectric ceramic layers in the stacking direction; and the third dielectric ceramic layer includes at least one metal element selected from a group consisting of Mg, Mn, and Si.

* * * * *